US012602586B2

(12) United States Patent
Galvin

(10) Patent No.: US 12,602,586 B2
(45) Date of Patent: Apr. 14, 2026

(54) SUPERVISORY NEURON FOR CONTINUOUSLY ADAPTIVE NEURAL NETWORK

(71) Applicant: AtomBeam Technologies Inc., Moraga, CA (US)

(72) Inventor: Brian Galvin, Silverdale, WA (US)

(73) Assignee: ATOMBEAM TECHNOLGIES INC., Moraga, CA (US)

( * ) Notice: Subject to any disclaimer, the term of this patent is extended or adjusted under 35 U.S.C. 154(b) by 0 days.

(21) Appl. No.: 18/919,417

(22) Filed: Oct. 17, 2024

(65) Prior Publication Data

US 2025/0363347 A1     Nov. 27, 2025

Related U.S. Application Data

(63) Continuation-in-part of application No. 18/918,077, filed on Oct. 17, 2024, which is a continuation-in-part (Continued)

(51) Int. Cl.
*G06N 3/08*          (2023.01)
*G06N 3/045*        (2023.01)

(52) U.S. Cl.
CPC .............. *G06N 3/08* (2013.01); *G06N 3/045* (2023.01)

(58) Field of Classification Search
CPC ................................. G06N 3/08; G06N 3/045
See application file for complete search history.

(56) References Cited

U.S. PATENT DOCUMENTS 4,780,718 A     10/1988  Hudson et al.
5,708,436 A      1/1998  Loiz et al.
(Continued)

FOREIGN PATENT DOCUMENTS

EP          3364212 A1     8/2018
GB          2620921 A      1/2024
WO       2020104416 A1     5/2020

OTHER PUBLICATIONS

Guo et al. ("MSMC-TTS: Multi-stage multi-codebook VQ-VAE based neural TTS." IEEE/ACM Transactions on Audio, Speech, and Language Processing 31 (2023): 1811-1824) (Year: 2023).*

(Continued)

*Primary Examiner* — Michelle T Bechtold
*Assistant Examiner* — Moriam Mosunmola Godo
(74) *Attorney, Agent, or Firm* — GALVIN PATENT LAW LLC; Brian R. Galvin; Erin L. Johnston

(57)          ABSTRACT

A system and method for real-time time series forecasting using a compound large codeword model with integrated supervisory neurons. The system processes diverse inputs through adaptive codebook generation and codeword allocation. A projection network fuses different data types, creating unified representations for a latent transformer-based machine learning core. The core contains local neural network regions of interconnected operational neurons, monitored by supervisory neurons. These supervisory neurons receive activation data from operational neurons, perform real-time statistical analysis, determine necessary structural modifications, and initiate their implementation during operation. This architecture enables efficient handling of multi-modal data, capturing complex relationships between different input types. The combination of adaptive codebook generation and the supervisory neuron system ensures responsiveness to evolving data patterns and task requirements. This approach provides more accurate and timely forecasts by leveraging diverse data types in a sophisticated, integrated manner, while continuously adapting its structure to maintain optimal performance.

12 Claims, 46 Drawing Sheets

Related U.S. Application Data of application No. 18/737,906, filed on Jun. 7, 2024, and a continuation-in-part of application No. 18/736,498, filed on Jun. 6, 2024.

(60) Provisional application No. 63/651,359, filed on May 23, 2024.

(56) References Cited

U.S. PATENT DOCUMENTS

| | | | |
|---|---|---|---|
| 7,411,540 | B1 | 8/2008 | Lopez et al. |
| 7,629,922 | B2 | 12/2009 | Winstead et al. |
| 7,876,257 | B2 | 1/2011 | Vetro et al. |
| 9,524,392 | B2 | 12/2016 | Naehrig et al. |
| 11,451,242 | B2 | 9/2022 | Choi et al. |
| 11,656,353 | B2 | 5/2023 | Li et al. |
| 2004/0017307 | A1 | 1/2004 | Cirillo et al. |
| 2004/0160353 | A1 | 8/2004 | Cirillo et al. |
| 2008/0231504 | A1 | 9/2008 | Sartor et al. |
| 2011/0012778 | A1 | 1/2011 | Nguyen et al. |
| 2015/0054678 | A1 | 2/2015 | Wakayama |
| 2017/0048537 | A1 | 2/2017 | Boufounos et al. |
| 2018/0196609 | A1 | 7/2018 | Niesen |
| 2020/0258296 | A1 | 8/2020 | Pennings et al. |
| 2020/0395955 | A1 | 12/2020 | Choi et al. |
| 2021/0012210 | A1* | 1/2021 | Sikka ..................... G06N 3/084 |
| 2022/0156631 | A1 | 5/2022 | Kanso et al. |
| 2022/0404490 | A1 | 12/2022 | Evans et al. |
| 2023/0131694 | A1 | 4/2023 | Saber et al. |
| 2023/0169623 | A1 | 6/2023 | Chen et al. |
| 2023/0184927 | A1 | 6/2023 | Chen et al. |
| 2024/0185037 | A1 | 6/2024 | Park et al. |
| 2024/0195438 | A1 | 6/2024 | Isik et al. |

OTHER PUBLICATIONS

Cheng et al. ("Advancing time series classification with multimodal language modeling." arXiv:2403.12371v1 [cs.LG] Mar. 19, 2024) (Year: 2024).*

Balaneshin-Kordan, Saeid et al., "Deep ueral Architecture for Multi-Modal Retrieval based on Joint Embedding Space for Text and Images," Association for Computing Machinery, Feb. 5-9, 2018, pp. 1-9, Marina Del Rey, CA, USA.

Kahn, Abdul Rafae et al., "Coding Textual Inputs Boosts the Accuracy of Neural Networks," 2020 Conference on Empirical Methods in Natural Language Processing, Nov. 16-20, 2020, pp. 1350-1360.

Messina, Nicola et al., "Towards Efficient Cross-Modal Visual Textual Retrieval using Transformer-Encoder Deep Features," 2021 International Conference on Content-Based Multimedia Indexing, 2021, pp. 1-6, United States.

Seo, Beomseok et al., "How Does A Transformer Learn Compression? An Attention Study on Huffman and LZ4," Department of Electronic and Electrical Engineering, Dec. 12, 2023, pp. 1-10, vol. 11, Seoul, South Korea.

Vaswani, Ashish et al., "Attention is All You Need," 31st Conference on Neural Information Processing Systems, 2017, pp. 1-11, Long Beach, CA, USA.

Wang, Tianming et al., "T-CVAE: Transformer-Based Conditioned Variational Autoencoder for Story Completion," Proceedings of the Twenty-Eigth Joint Conference on Artificial Intelligence, pp. 5233-5239.

Wieting, John et al., "A Bilingual Generative Transformer for Semantic Sentence Embedding," Nov. 19, 2020, pp. 1-14.

* cited by examiner

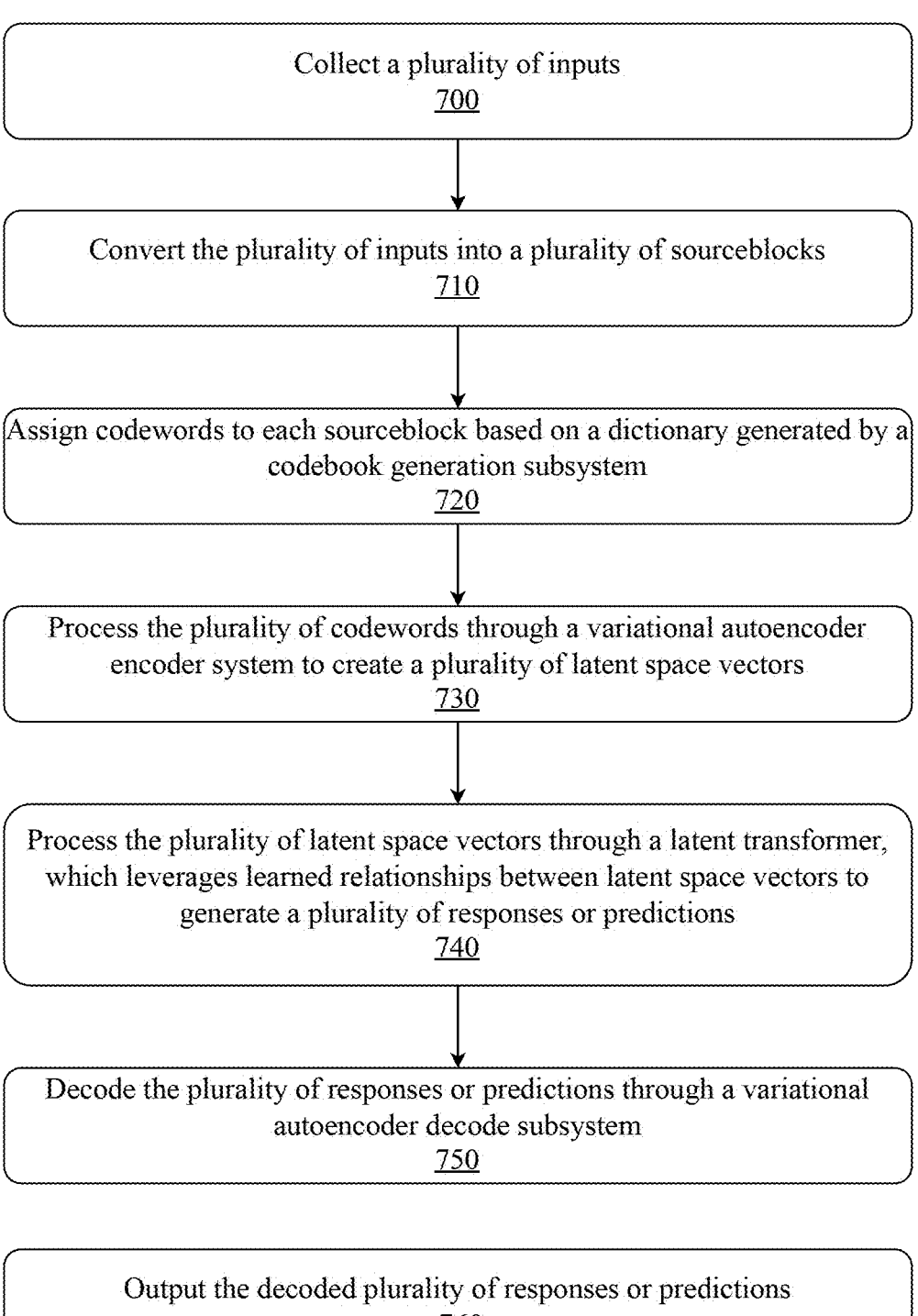

Collect a plurality of inputs
700

Convert the plurality of inputs into a plurality of sourceblocks
710

Assign codewords to each sourceblock based on a dictionary generated by a
codebook generation subsystem
720

Process the plurality of codewords through a variational autoencoder
encoder system to create a plurality of latent space vectors
730

Process the plurality of latent space vectors through a latent transformer,
which leverages learned relationships between latent space vectors to
generate a plurality of responses or predictions
740

Decode the plurality of responses or predictions through a variational
autoencoder decode subsystem
750

Output the decoded plurality of responses or predictions
760

FIG. 7

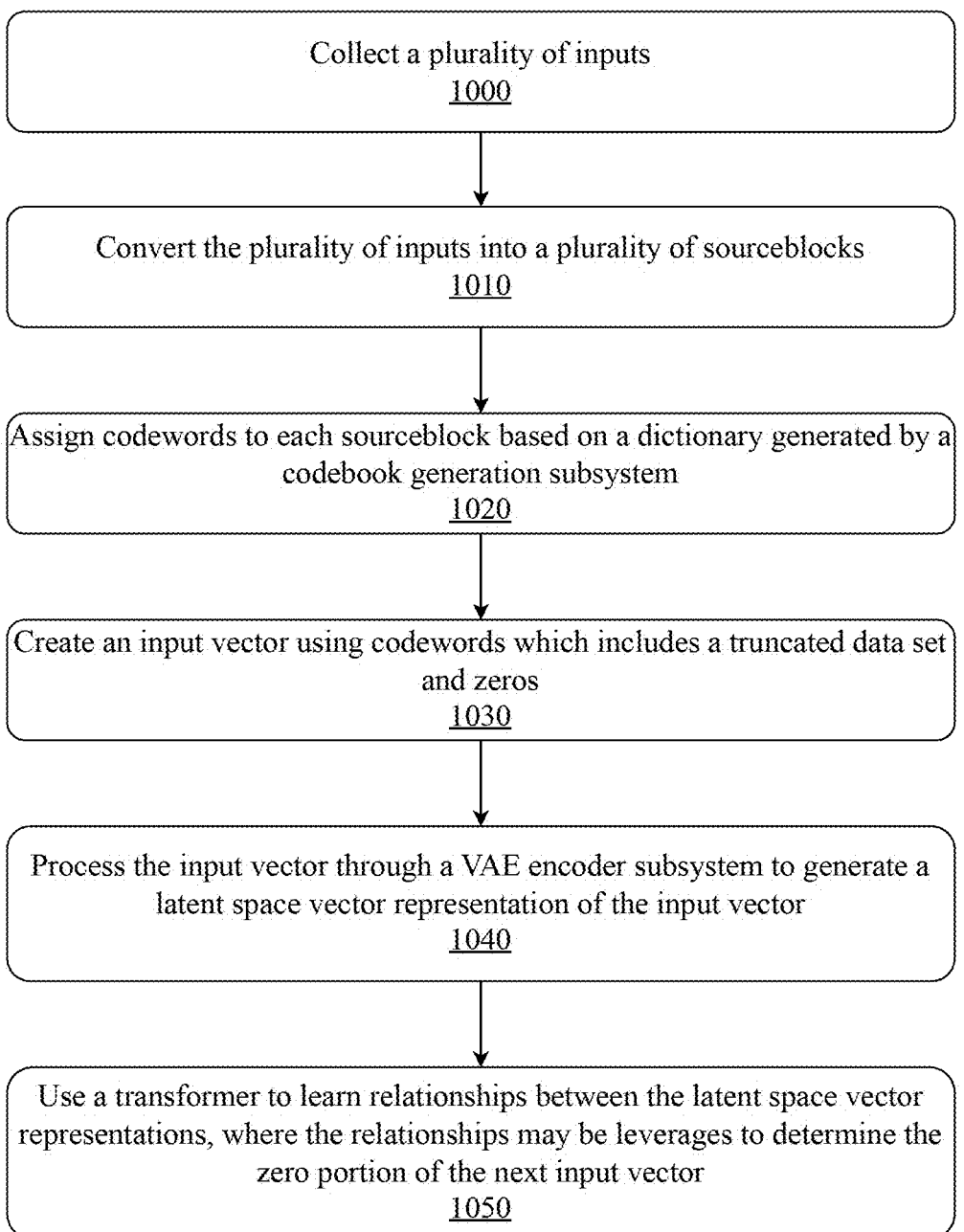

Collect a plurality of inputs
1000

Convert the plurality of inputs into a plurality of sourceblocks
1010

Assign codewords to each sourceblock based on a dictionary generated by a codebook generation subsystem
1020

Create an input vector using codewords which includes a truncated data set and zeros
1030

Process the input vector through a VAE encoder subsystem to generate a latent space vector representation of the input vector
1040

Use a transformer to learn relationships between the latent space vector representations, where the relationships may be leverages to determine the zero portion of the next input vector
1050

FIG. 10

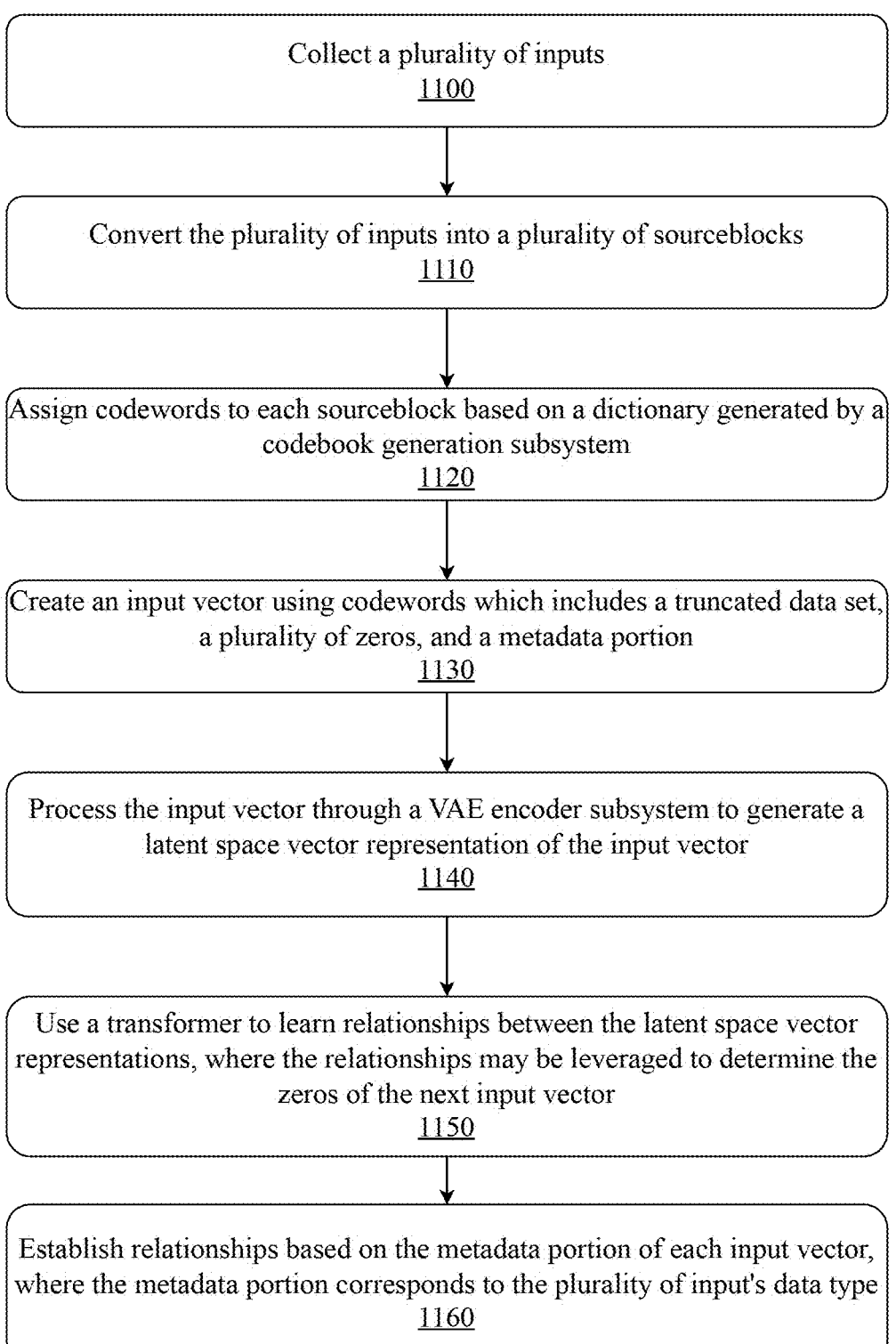

Collect a plurality of inputs
1100

Convert the plurality of inputs into a plurality of sourceblocks
1110

Assign codewords to each sourceblock based on a dictionary generated by a codebook generation subsystem
1120

Create an input vector using codewords which includes a truncated data set, a plurality of zeros, and a metadata portion
1130

Process the input vector through a VAE encoder subsystem to generate a latent space vector representation of the input vector
1140

Use a transformer to learn relationships between the latent space vector representations, where the relationships may be leveraged to determine the zeros of the next input vector
1150

Establish relationships based on the metadata portion of each input vector, where the metadata portion corresponds to the plurality of input's data type
1160

FIG. 11

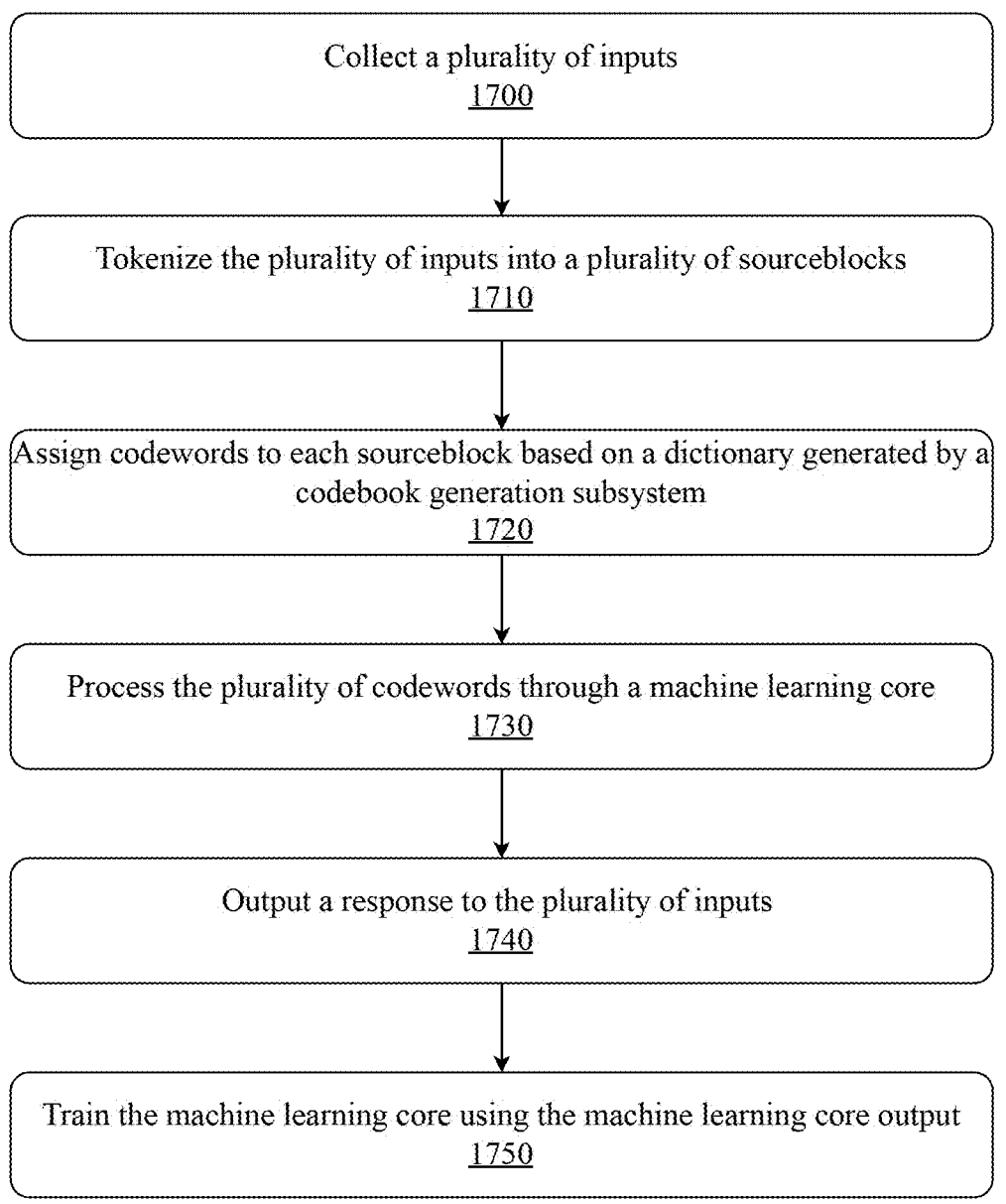

Collect a plurality of inputs
1700

Tokenize the plurality of inputs into a plurality of sourceblocks
1710

Assign codewords to each sourceblock based on a dictionary generated by a codebook generation subsystem
1720

Process the plurality of codewords through a machine learning core
1730

Output a response to the plurality of inputs
1740

Train the machine learning core using the machine learning core output
1750

FIG. 17

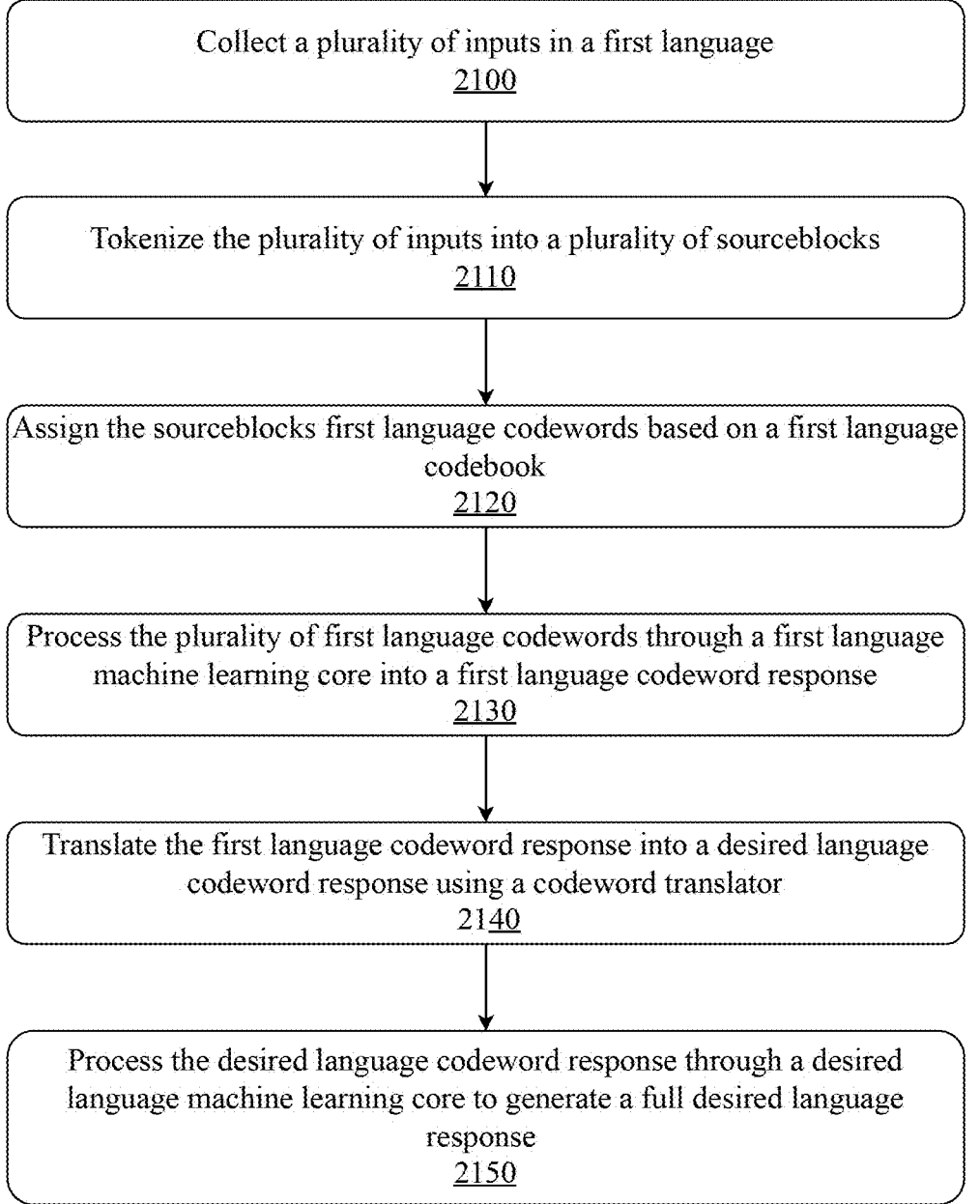

Collect a plurality of inputs in a first language
2100

Tokenize the plurality of inputs into a plurality of sourceblocks
2110

Assign the sourceblocks first language codewords based on a first language codebook
2120

Process the plurality of first language codewords through a first language machine learning core into a first language codeword response
2130

Translate the first language codeword response into a desired language codeword response using a codeword translator
2140

Process the desired language codeword response through a desired language machine learning core to generate a full desired language response
2150

FIG. 21

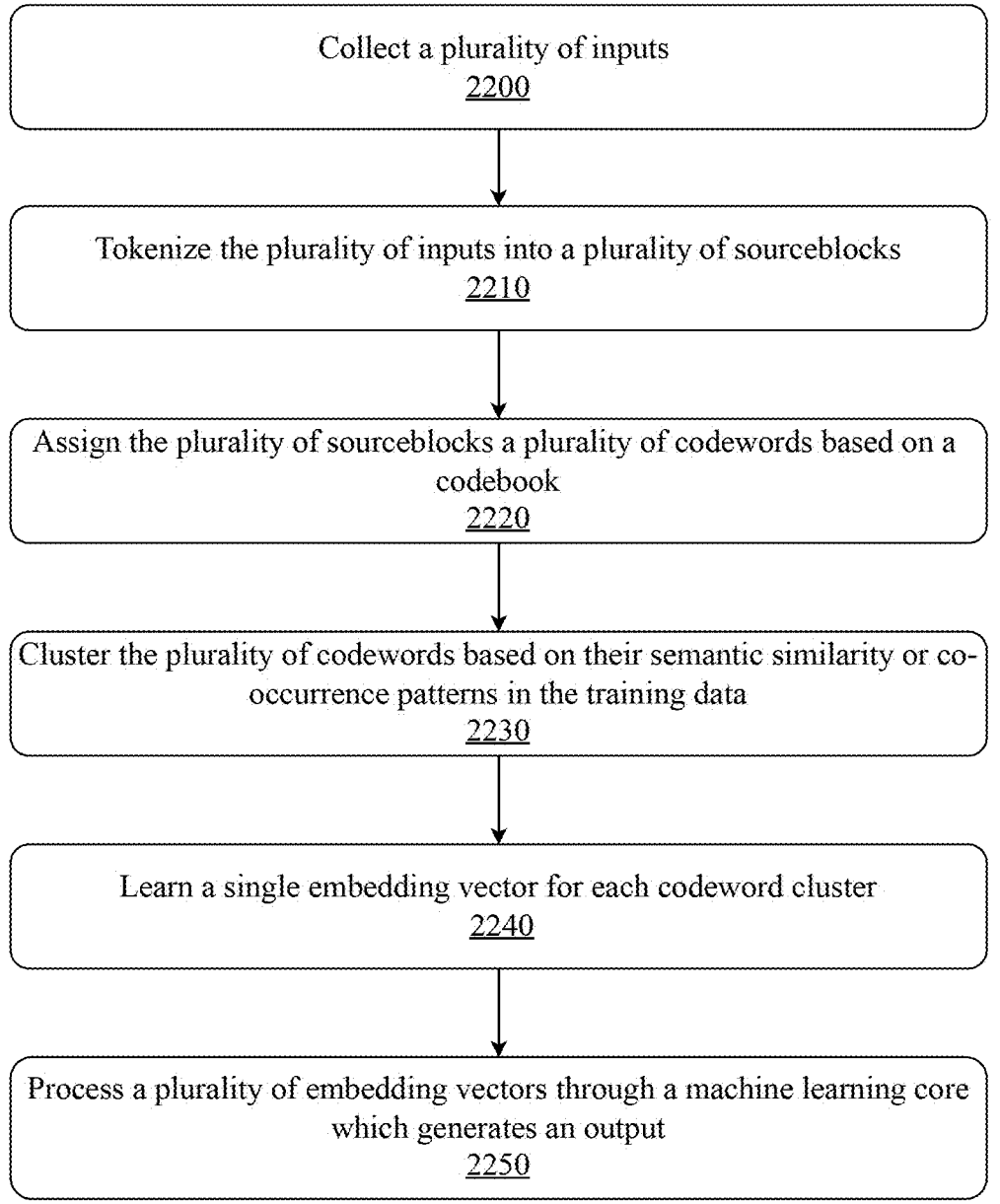

Collect a plurality of inputs
2200

Tokenize the plurality of inputs into a plurality of sourceblocks
2210

Assign the plurality of sourceblocks a plurality of codewords based on a codebook
2220

Cluster the plurality of codewords based on their semantic similarity or co-occurrence patterns in the training data
2230

Learn a single embedding vector for each codeword cluster
2240

Process a plurality of embedding vectors through a machine learning core which generates an output
2250

FIG. 22

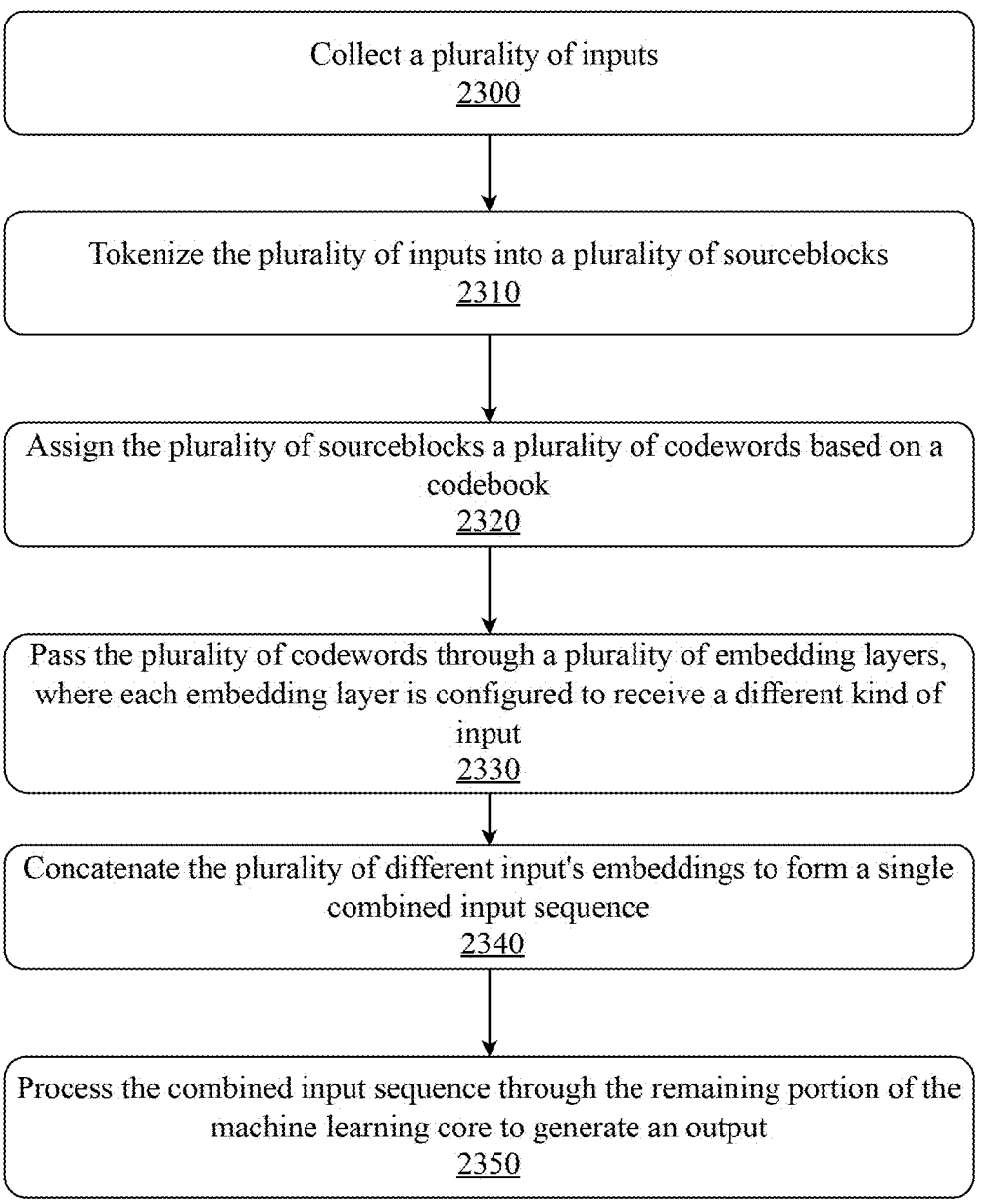

Collect a plurality of inputs
2300

Tokenize the plurality of inputs into a plurality of sourceblocks
2310

Assign the plurality of sourceblocks a plurality of codewords based on a codebook
2320

Pass the plurality of codewords through a plurality of embedding layers, where each embedding layer is configured to receive a different kind of input
2330

Concatenate the plurality of different input's embeddings to form a single combined input sequence
2340

Process the combined input sequence through the remaining portion of the machine learning core to generate an output
2350

FIG. 23

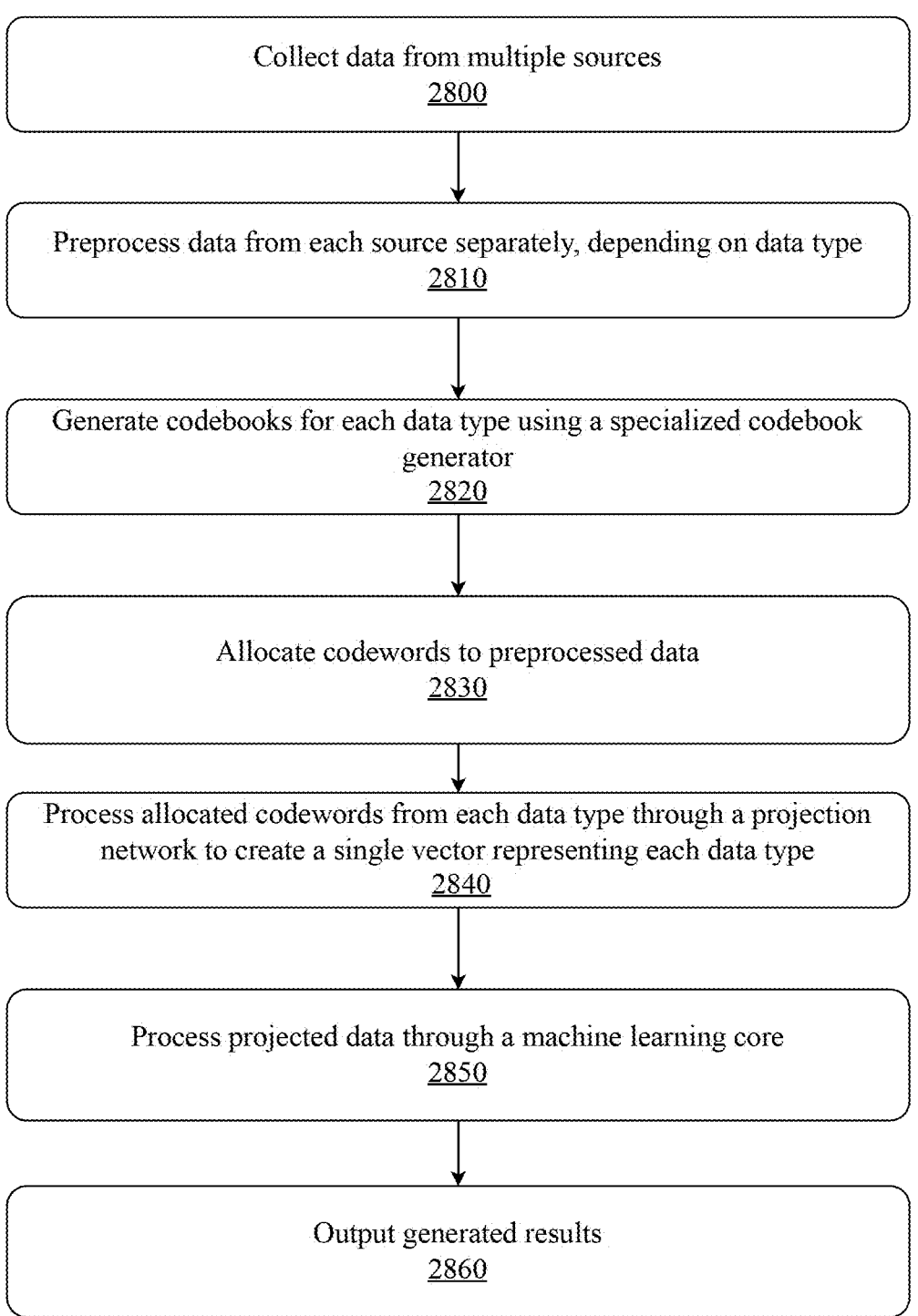

Collect data from multiple sources
2800

Preprocess data from each source separately, depending on data type
2810

Generate codebooks for each data type using a specialized codebook generator
2820

Allocate codewords to preprocessed data
2830

Process allocated codewords from each data type through a projection network to create a single vector representing each data type
2840

Process projected data through a machine learning core
2850

Output generated results
2860

FIG. 28

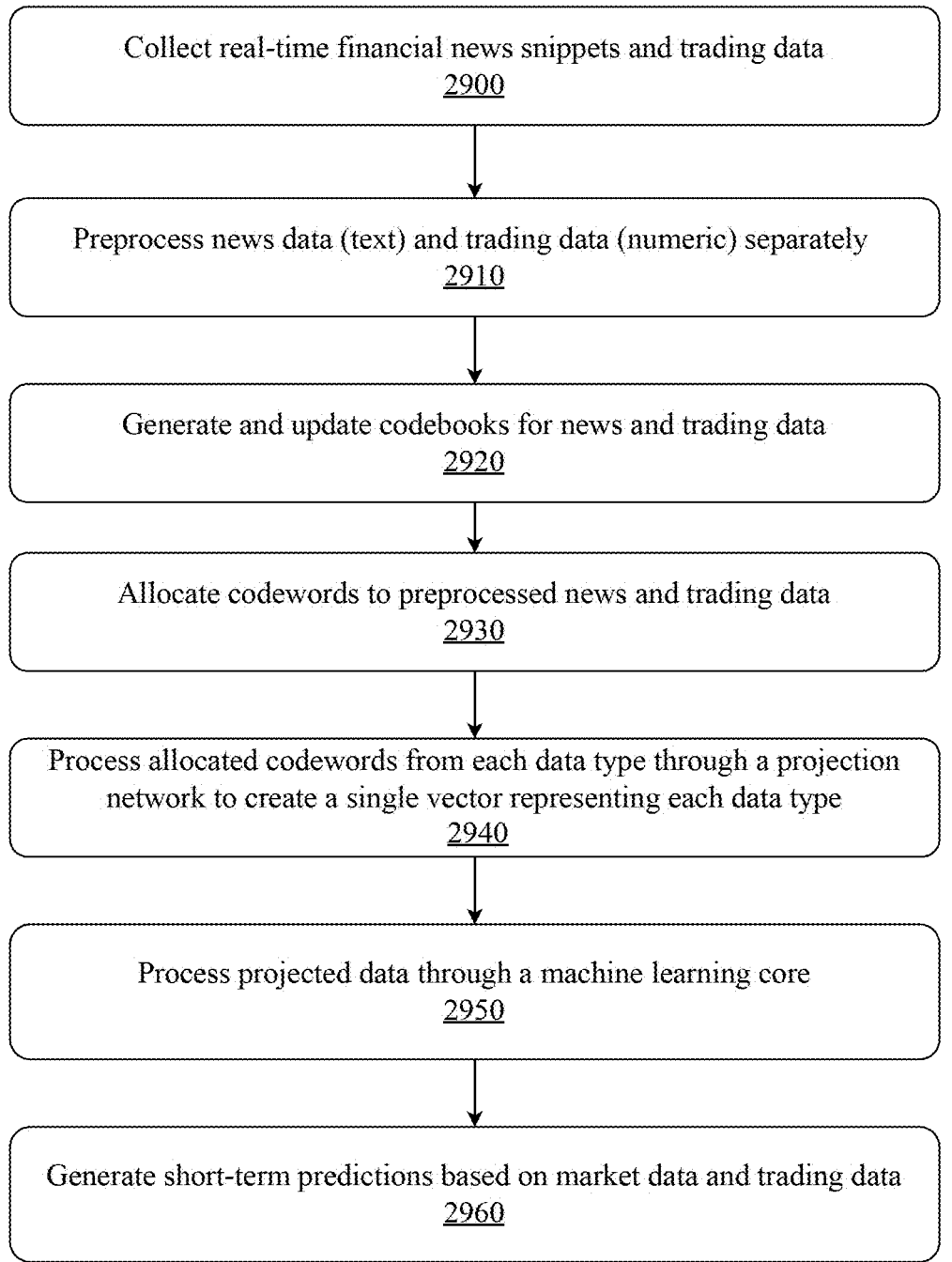

Collect real-time financial news snippets and trading data
2900

Preprocess news data (text) and trading data (numeric) separately
2910

Generate and update codebooks for news and trading data
2920

Allocate codewords to preprocessed news and trading data
2930

Process allocated codewords from each data type through a projection network to create a single vector representing each data type
2940

Process projected data through a machine learning core
2950

Generate short-term predictions based on market data and trading data
2960

FIG. 29

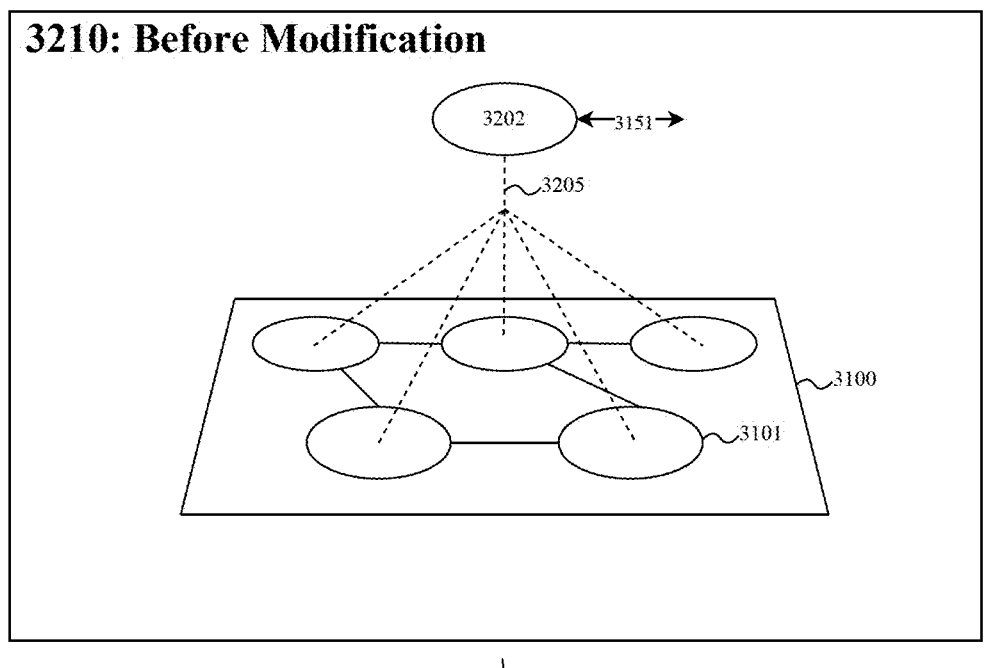
Structural Modification Process
3200
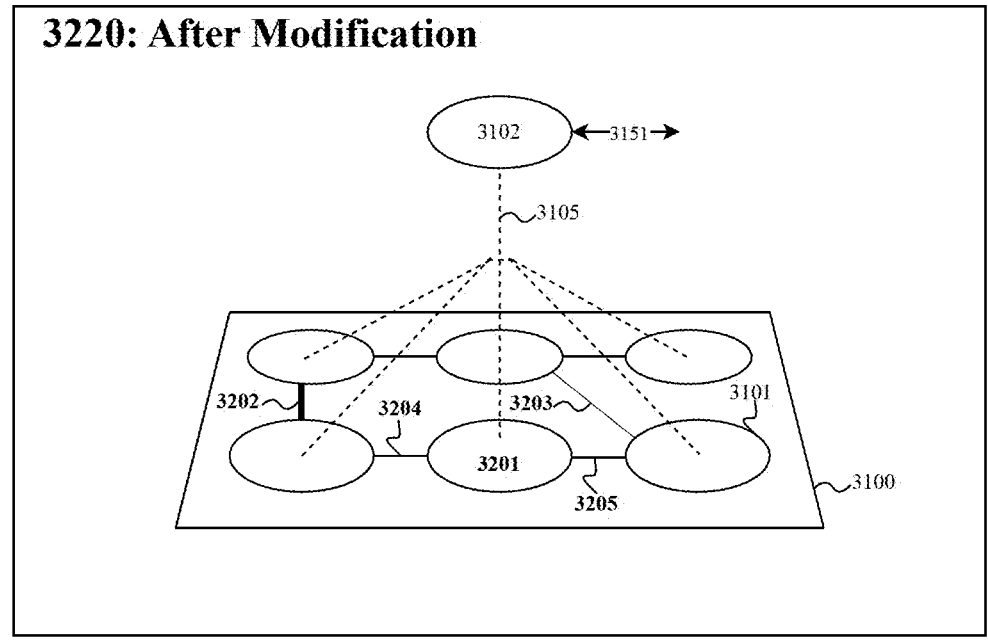
FIG. 32

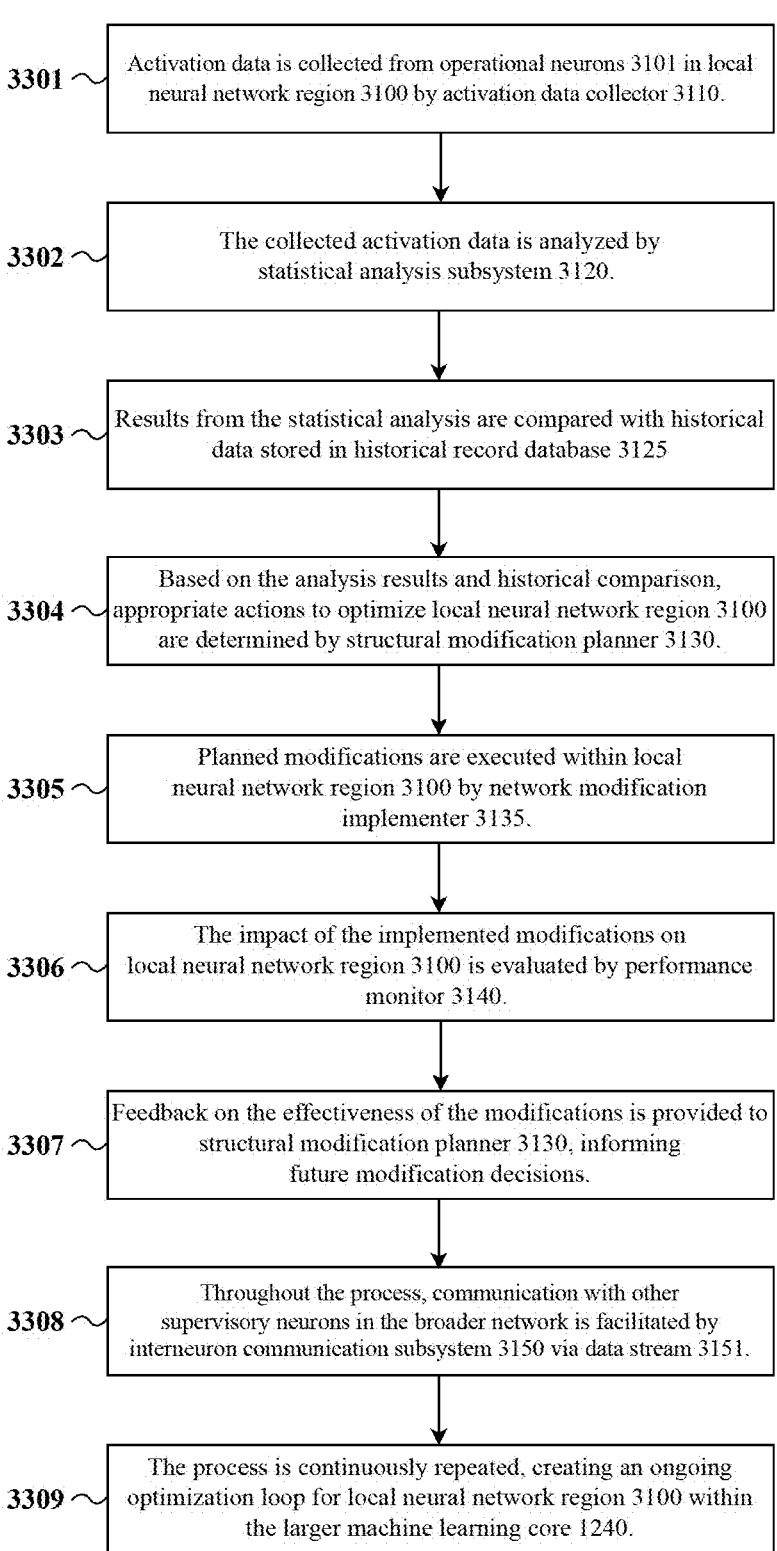

3301 — Activation data is collected from operational neurons 3101 in local neural network region 3100 by activation data collector 3110.

3302 — The collected activation data is analyzed by statistical analysis subsystem 3120.

3303 — Results from the statistical analysis are compared with historical data stored in historical record database 3125

3304 — Based on the analysis results and historical comparison, appropriate actions to optimize local neural network region 3100 are determined by structural modification planner 3130.

3305 — Planned modifications are executed within local neural network region 3100 by network modification implementer 3135.

3306 — The impact of the implemented modifications on local neural network region 3100 is evaluated by performance monitor 3140.

3307 — Feedback on the effectiveness of the modifications is provided to structural modification planner 3130, informing future modification decisions.

3308 — Throughout the process, communication with other supervisory neurons in the broader network is facilitated by interneuron communication subsystem 3150 via data stream 3151.

3309 — The process is continuously repeated, creating an ongoing optimization loop for local neural network region 3100 within the larger machine learning core 1240.

FIG. 33

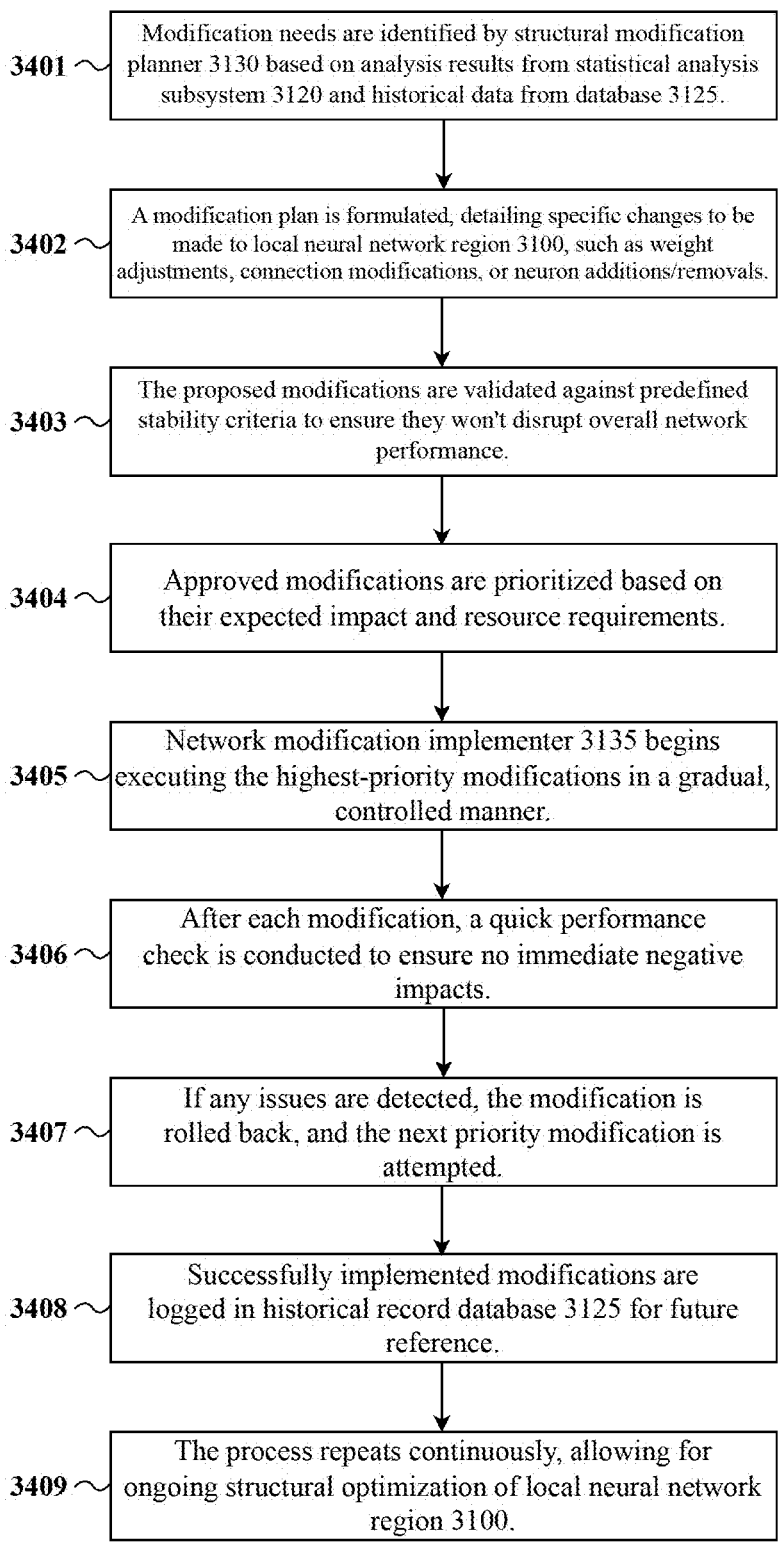

3401 — Modification needs are identified by structural modification planner 3130 based on analysis results from statistical analysis subsystem 3120 and historical data from database 3125.

3402 — A modification plan is formulated, detailing specific changes to be made to local neural network region 3100, such as weight adjustments, connection modifications, or neuron additions/removals.

3403 — The proposed modifications are validated against predefined stability criteria to ensure they won't disrupt overall network performance.

3404 — Approved modifications are prioritized based on their expected impact and resource requirements.

3405 — Network modification implementer 3135 begins executing the highest-priority modifications in a gradual, controlled manner.

3406 — After each modification, a quick performance check is conducted to ensure no immediate negative impacts.

3407 — If any issues are detected, the modification is rolled back, and the next priority modification is attempted.

3408 — Successfully implemented modifications are logged in historical record database 3125 for future reference.

3409 — The process repeats continuously, allowing for ongoing structural optimization of local neural network region 3100.

FIG. 34

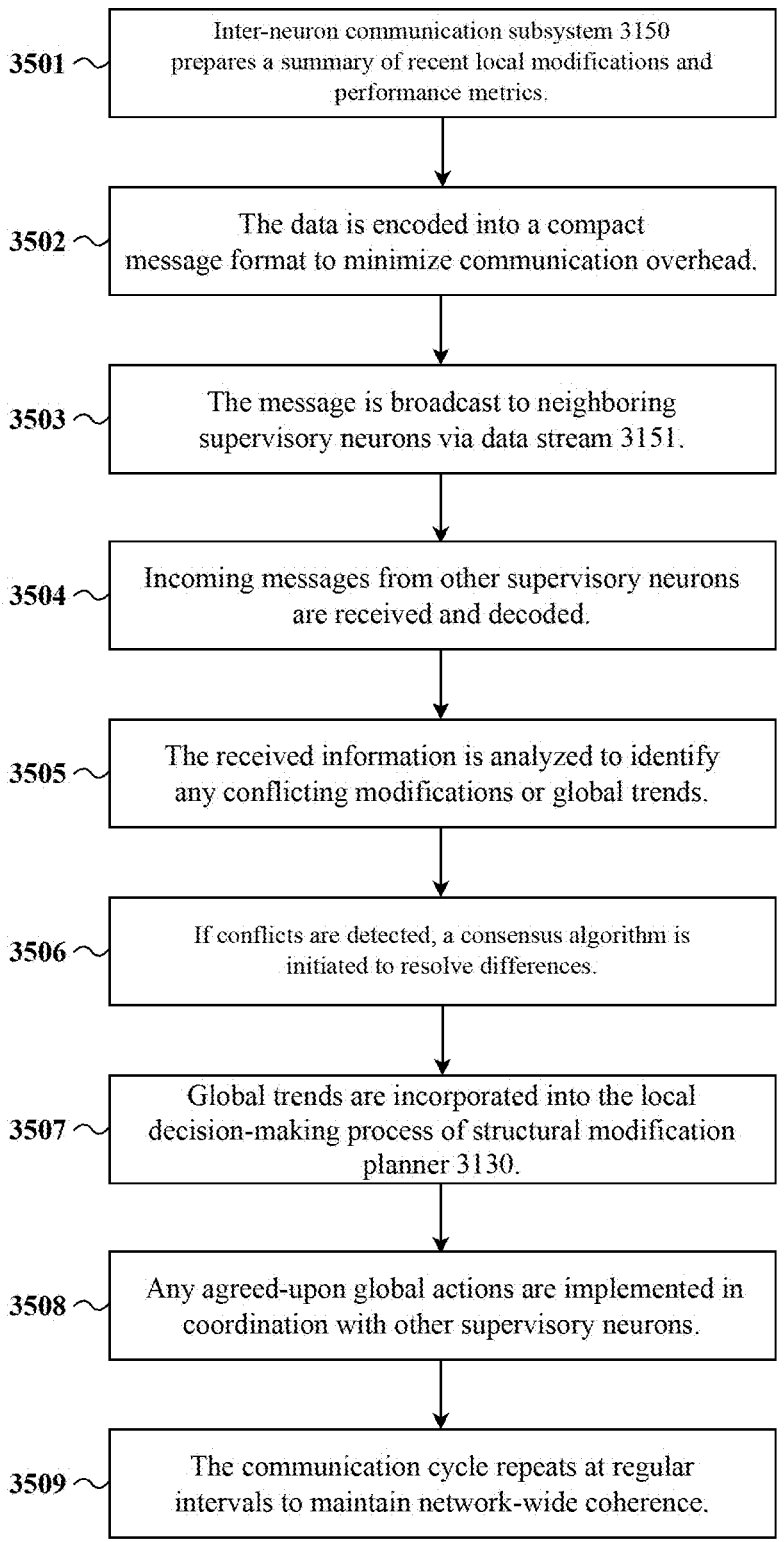

3501 — Inter-neuron communication subsystem 3150 prepares a summary of recent local modifications and performance metrics.

3502 — The data is encoded into a compact message format to minimize communication overhead.

3503 — The message is broadcast to neighboring supervisory neurons via data stream 3151.

3504 — Incoming messages from other supervisory neurons are received and decoded.

3505 — The received information is analyzed to identify any conflicting modifications or global trends.

3506 — If conflicts are detected, a consensus algorithm is initiated to resolve differences.

3507 — Global trends are incorporated into the local decision-making process of structural modification planner 3130.

3508 — Any agreed-upon global actions are implemented in coordination with other supervisory neurons.

3509 — The communication cycle repeats at regular intervals to maintain network-wide coherence.

FIG. 35

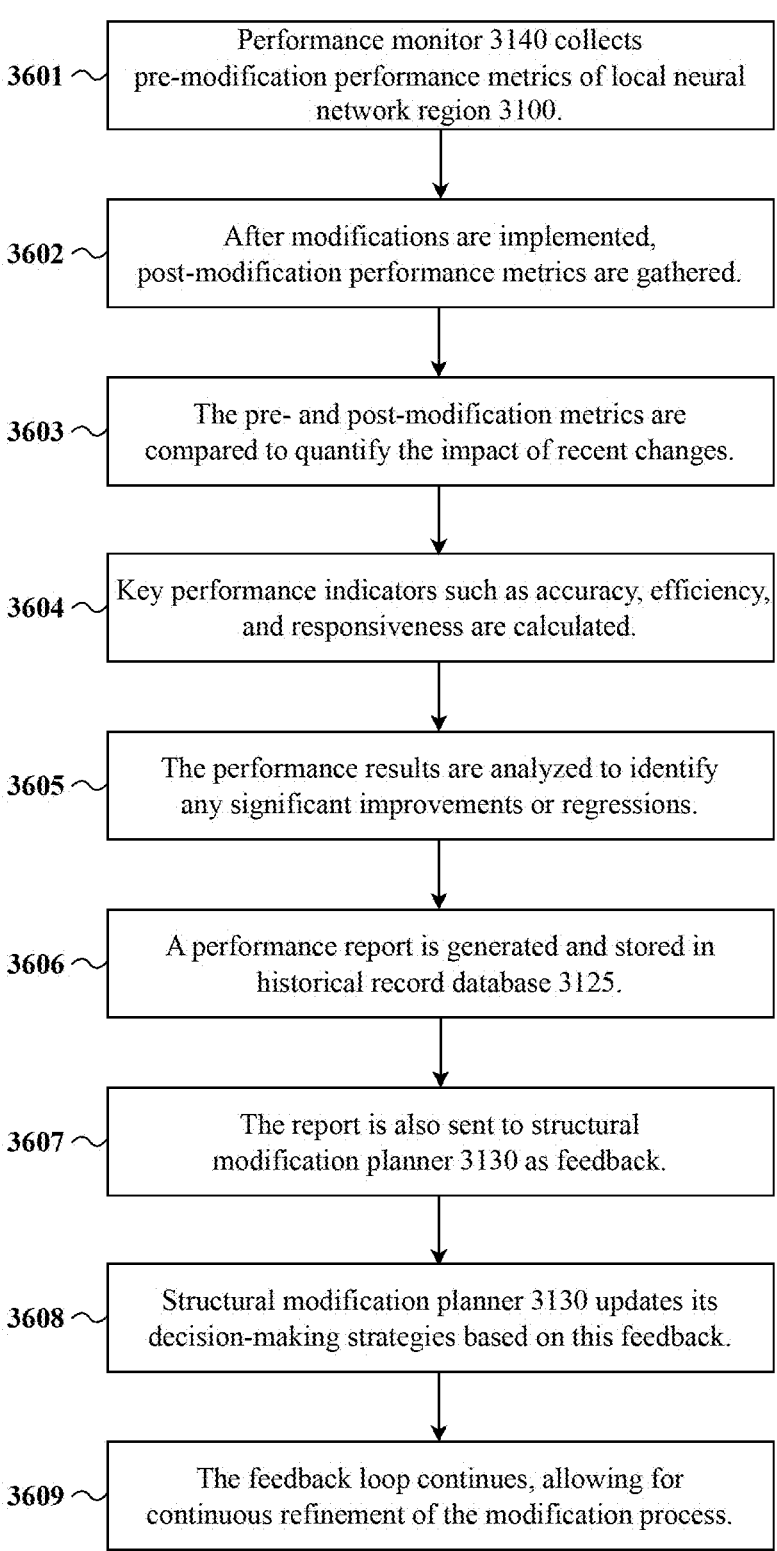

3601 — Performance monitor 3140 collects pre-modification performance metrics of local neural network region 3100.

3602 — After modifications are implemented, post-modification performance metrics are gathered.

3603 — The pre- and post-modification metrics are compared to quantify the impact of recent changes.

3604 — Key performance indicators such as accuracy, efficiency, and responsiveness are calculated.

3605 — The performance results are analyzed to identify any significant improvements or regressions.

3606 — A performance report is generated and stored in historical record database 3125.

3607 — The report is also sent to structural modification planner 3130 as feedback.

3608 — Structural modification planner 3130 updates its decision-making strategies based on this feedback.

3609 — The feedback loop continues, allowing for continuous refinement of the modification process.

FIG. 36

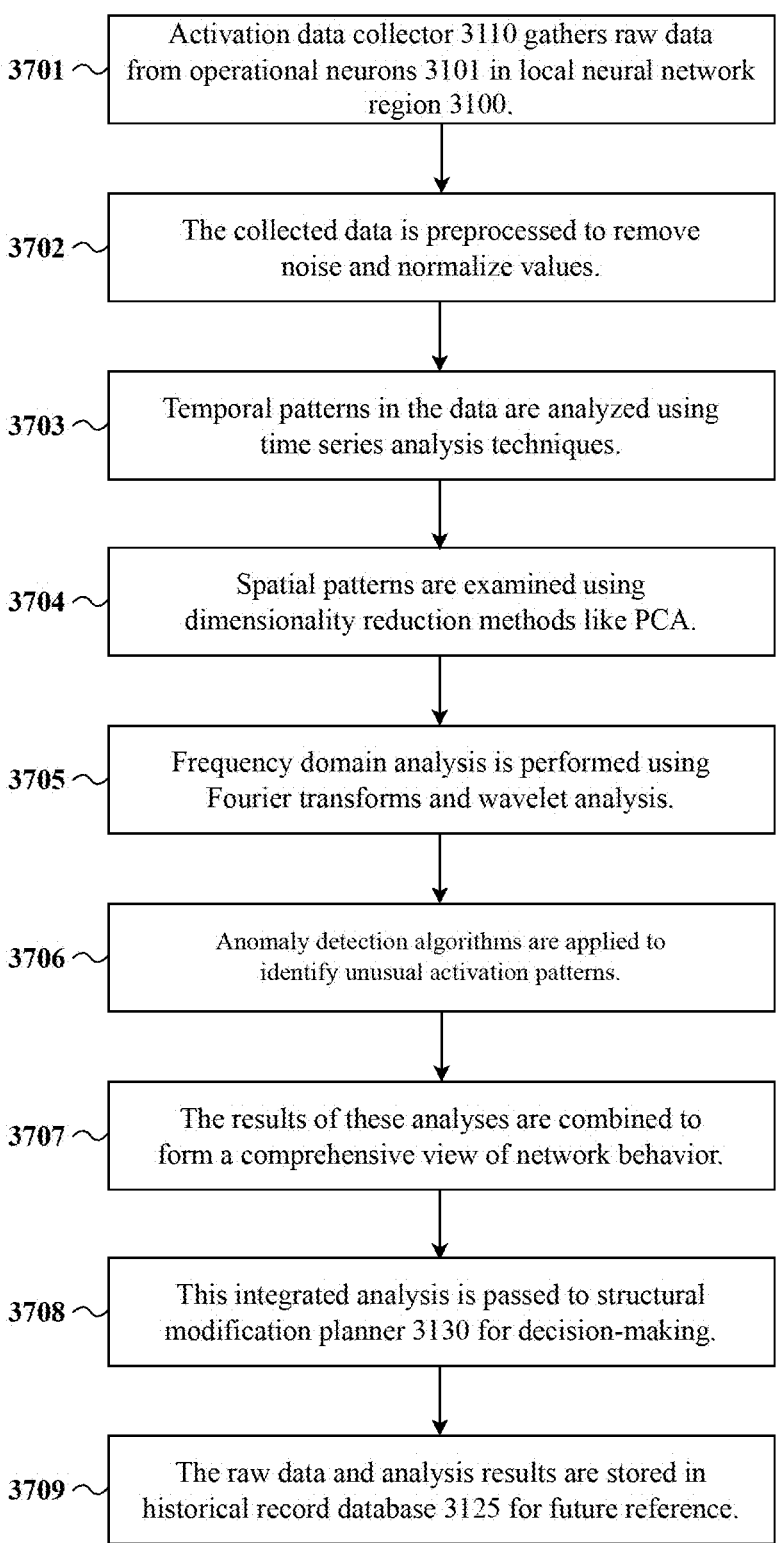

3701 — Activation data collector 3110 gathers raw data from operational neurons 3101 in local neural network region 3100.

3702 — The collected data is preprocessed to remove noise and normalize values.

3703 — Temporal patterns in the data are analyzed using time series analysis techniques.

3704 — Spatial patterns are examined using dimensionality reduction methods like PCA.

3705 — Frequency domain analysis is performed using Fourier transforms and wavelet analysis.

3706 — Anomaly detection algorithms are applied to identify unusual activation patterns.

3707 — The results of these analyses are combined to form a comprehensive view of network behavior.

3708 — This integrated analysis is passed to structural modification planner 3130 for decision-making.

3709 — The raw data and analysis results are stored in historical record database 3125 for future reference.

FIG. 37

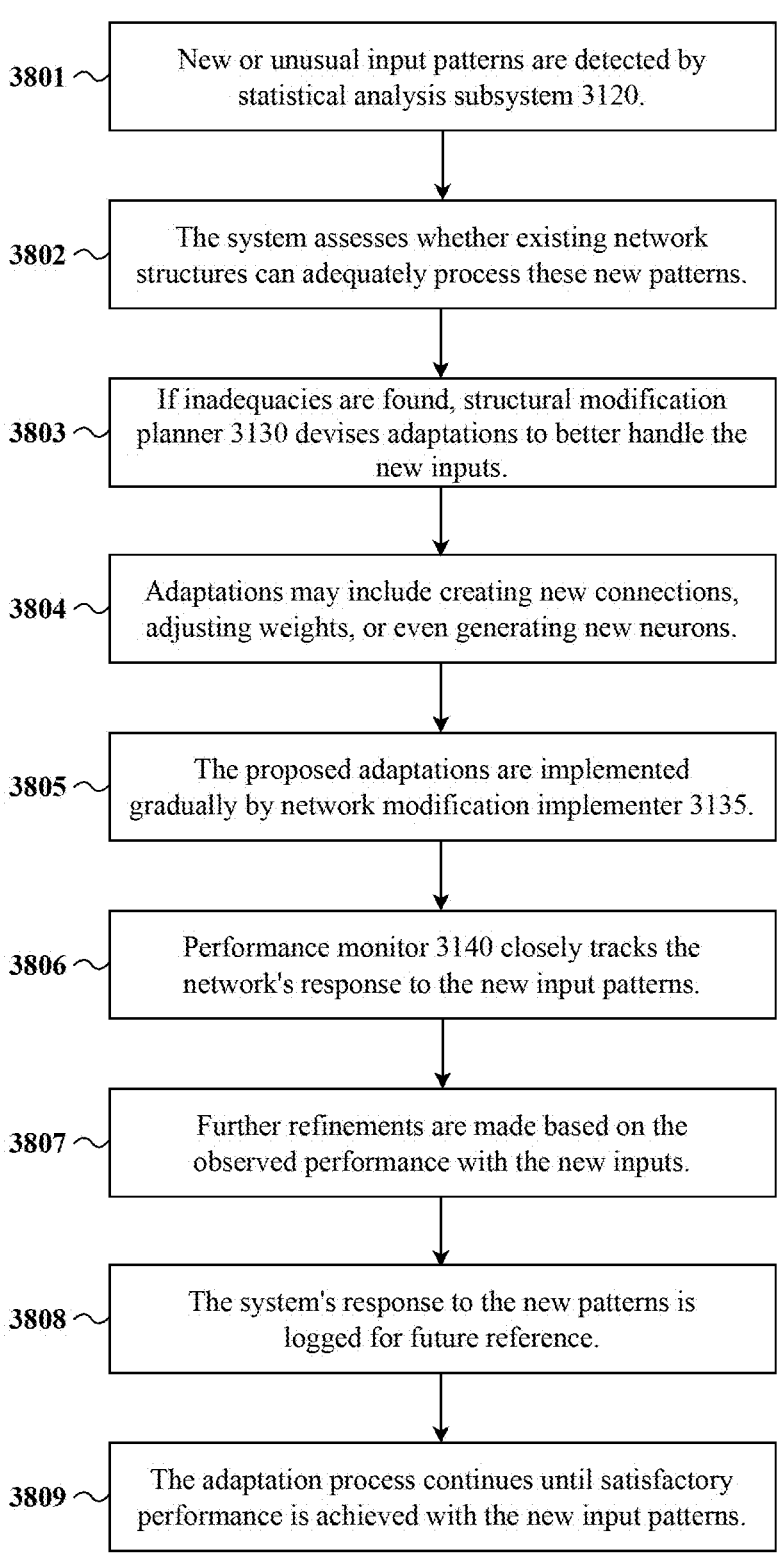

3801 — New or unusual input patterns are detected by statistical analysis subsystem 3120.

3802 — The system assesses whether existing network structures can adequately process these new patterns.

3803 — If inadequacies are found, structural modification planner 3130 devises adaptations to better handle the new inputs.

3804 — Adaptations may include creating new connections, adjusting weights, or even generating new neurons.

3805 — The proposed adaptations are implemented gradually by network modification implementer 3135.

3806 — Performance monitor 3140 closely tracks the network's response to the new input patterns.

3807 — Further refinements are made based on the observed performance with the new inputs.

3808 — The system's response to the new patterns is logged for future reference.

3809 — The adaptation process continues until satisfactory performance is achieved with the new input patterns.

FIG. 38

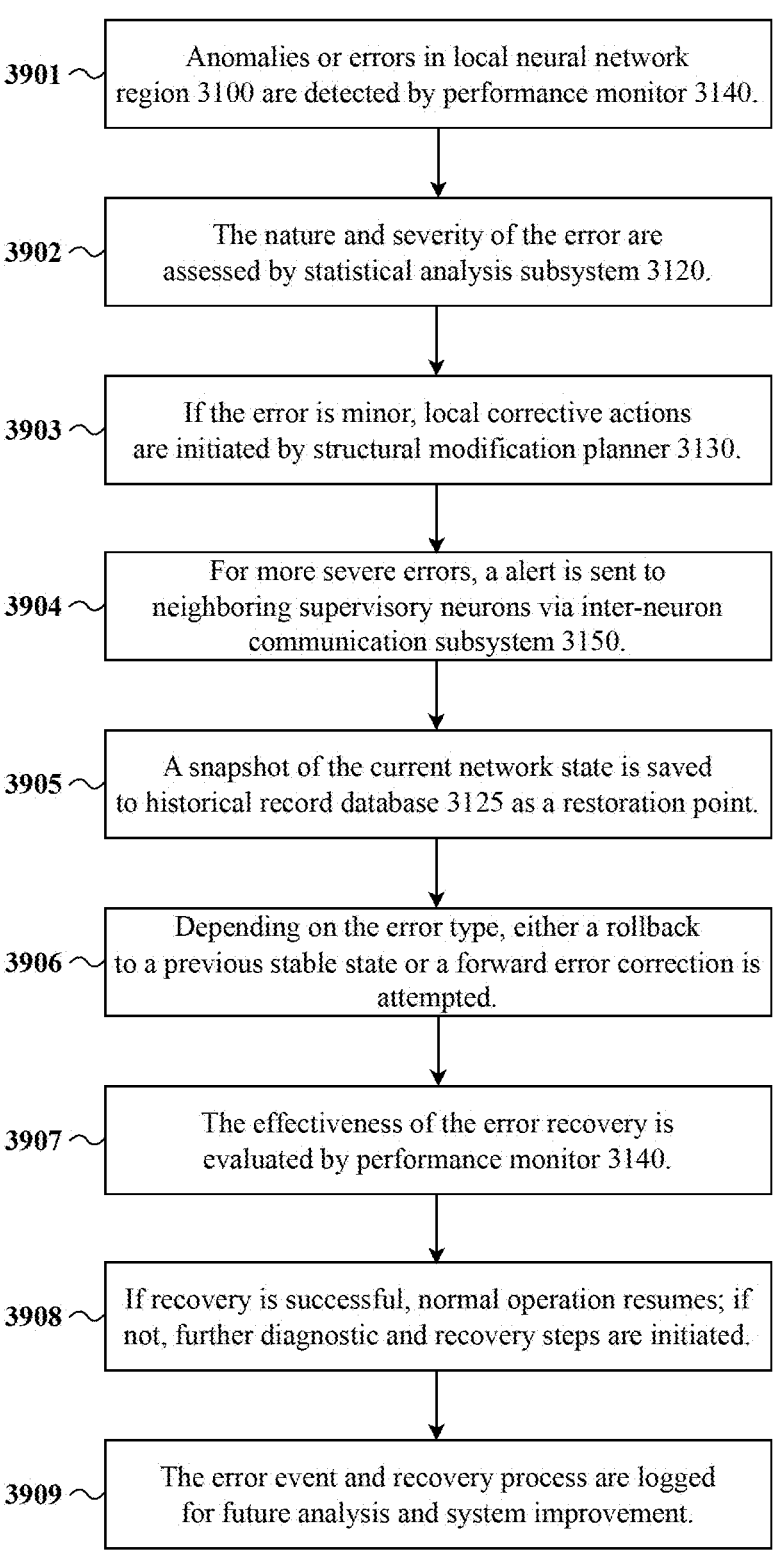

3901 — Anomalies or errors in local neural network region 3100 are detected by performance monitor 3140.

3902 — The nature and severity of the error are assessed by statistical analysis subsystem 3120.

3903 — If the error is minor, local corrective actions are initiated by structural modification planner 3130.

3904 — For more severe errors, a alert is sent to neighboring supervisory neurons via inter-neuron communication subsystem 3150.

3905 — A snapshot of the current network state is saved to historical record database 3125 as a restoration point.

3906 — Depending on the error type, either a rollback to a previous stable state or a forward error correction is attempted.

3907 — The effectiveness of the error recovery is evaluated by performance monitor 3140.

3908 — If recovery is successful, normal operation resumes; if not, further diagnostic and recovery steps are initiated.

3909 — The error event and recovery process are logged for future analysis and system improvement.

FIG. 39

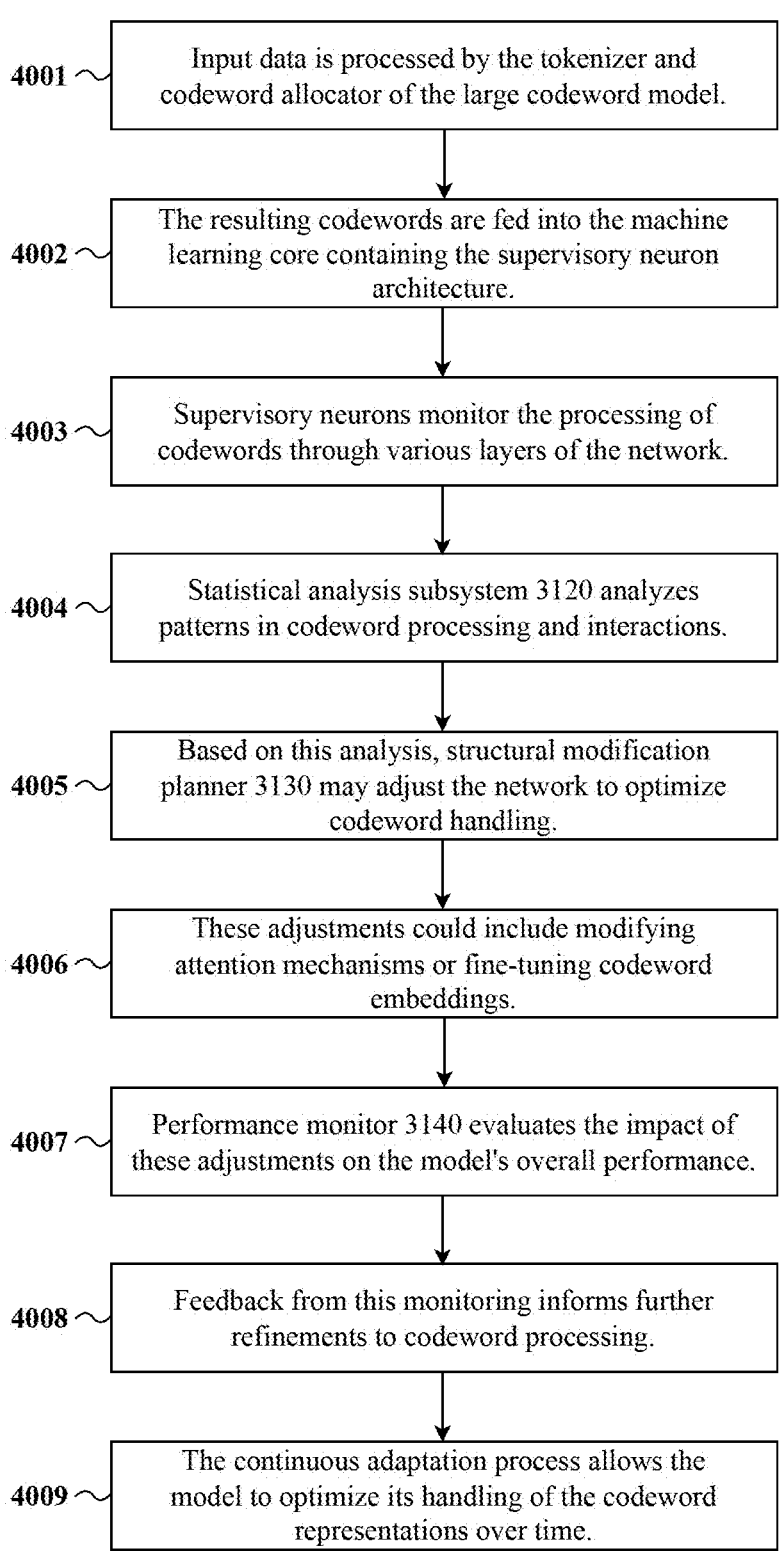

4001 — Input data is processed by the tokenizer and codeword allocator of the large codeword model.

4002 — The resulting codewords are fed into the machine learning core containing the supervisory neuron architecture.

4003 — Supervisory neurons monitor the processing of codewords through various layers of the network.

4004 — Statistical analysis subsystem 3120 analyzes patterns in codeword processing and interactions.

4005 — Based on this analysis, structural modification planner 3130 may adjust the network to optimize codeword handling.

4006 — These adjustments could include modifying attention mechanisms or fine-tuning codeword embeddings.

4007 — Performance monitor 3140 evaluates the impact of these adjustments on the model's overall performance.

4008 — Feedback from this monitoring informs further refinements to codeword processing.

4009 — The continuous adaptation process allows the model to optimize its handling of the codeword representations over time.

FIG. 40

SUPERVISORY NEURON FOR CONTINUOUSLY ADAPTIVE NEURAL NETWORK

CROSS-REFERENCE TO RELATED APPLICATIONS

Priority is claimed in the application data sheet to the following patents or patent applications, each of which is expressly incorporated herein by reference in its entirety:
Ser. No. 18/918,077
Ser. No. 18/737,906
Ser. No. 18/736,498
63/651,359

BACKGROUND OF THE INVENTION

Field of the Art

The present invention relates to the field of artificial intelligence and machine learning, specifically to deep learning models for processing and generating data across various domains, including but not limited to language, time series, images, and audio.

Discussion of the State of the Art

In recent years, deep learning models have achieved remarkable success in numerous fields, such as natural language processing (NLP), computer vision, and speech recognition. One of the most prominent architectures is the Transformer. Transformers have become the foundation for state-of-the-art language models like BERT and GPT. Transformers typically process input data, such as text, by first converting tokens into dense vector representations using an embedding layer. Positional encoding is then added to preserve the order of the tokens. The embedded inputs are processed through self-attention mechanisms and feed-forward layers to capture dependencies and generate outputs.

However, the reliance on embedding and positional encoding layers limits the flexibility of Transformers in handling diverse data types beyond language. Moreover, the use of dense vector representations can be computationally intensive and memory-inefficient, especially for large-scale models.

What is needed is a new neural network model that can operate at a higher level of abstraction, using more compact and expressive representations that can efficiently capture the underlying patterns in the data. By removing the embedding and positional encoding layers from a Transformer, deep learning models can more efficiently process vast amounts of diverse information. The modified Transformer system should be flexible enough to handle various data modalities beyond just text and should enable seamless transfer learning across different languages and domains.

SUMMARY OF THE INVENTION

Accordingly, the inventor has conceived and reduced to practice a system and method for real-time time series forecasting using a compound large codeword model. The Latent Transformer LCM system introduces an approach to data processing and generation by combining the power of Variational Autoencoders (VAEs) and Transformers. The system consists of several key components: a codeword allocator, which prepares and converts the input data into codewords; a codebook generation subsystem, which creates and maintains a codebook mapping the input data to codewords; a VAE encode subsystem, which compresses the codewords into a lower-dimensional latent space representation; a Latent Transformer subsystem, which processes the latent space vectors using a modified Transformer architecture without embedding and positional encoding layers; and a VAE decode subsystem which reconstructs or generates data from the processed latent vectors. By leveraging the compressed latent space representation and the attention mechanism of the Transformer, the Latent Transformer LCM system can efficiently process and generate data across multiple modalities, opening up new possibilities for various applications. By operating directly on input vectors and input latent space vectors, the Latent Transformer LCM system allows for the removal of the embedding layer and positional encoding layer found in traditional transformer systems.

The system further incorporates supervisory neurons operatively connected to local neural network regions within the machine learning core. These supervisory neurons are configured to receive activation data from operational neurons, perform statistical analysis on the received data, determine structural modifications based on this analysis, and initiate implementation of these modifications during operation of the local neural network region. This adaptive mechanism allows for real-time optimization of the neural network structure, potentially improving performance and efficiency.

According to a preferred embodiment, a deep learning system for real-time time series forecasting using a compound large codeword model, comprising one or more computers with executable instructions that, when executed, cause the deep learning system to: receive a variety of data inputs, which may include by a plurality of data types; allocate codewords to each data input, wherein codewords are mapped to a corresponding codebook; fuse codewords of dissimilar data types together into a single codeword representation; process the single codeword representation through a machine learning core; generate an output based on a plurality of single codeword representations, is disclosed.

According to another preferred embodiment, a method for real-time time series forecasting using a compound large codeword model comprising the steps of: receiving a variety of data inputs, which may include by a plurality of data types; allocating codewords to each data input, wherein codewords are mapped to a corresponding codebook; fusing codewords of dissimilar data types together into a single codeword representation; processing the single codeword representation through a machine learning core; generating an output based on a plurality of single codeword representations, is disclosed.

According to an aspect of an embodiment, the machine learning core uses a transformer-based architecture.

According to an aspect of an embodiment, the machine learning core uses a latent transformer-based architecture.

According to an aspect of an embodiment, the variety of data inputs include real-time time series data.

According to an aspect of an embodiment, the machine learning core processes fused codeword representations of the real-time time series data into short-term forecasts for the time series data.

According to an aspect of an embodiment, the codewords and their corresponding codebooks may be adaptively updated to reflect incoming data inputs.

According to an aspect of an embodiment, the system includes supervisory neurons that monitor activation data from operational neurons in local neural network regions, perform statistical analysis on this data, and implement structural modifications to the network during operation.

According to an aspect of an embodiment, the structural modifications implemented by supervisory neurons may include neuron addition, neuron removal, connection creation, connection removal, and connection weight adjustment.

According to an aspect of an embodiment, the supervisory neurons maintain historical records of activation patterns and determine structural modifications based on identified changes in these patterns over time.

BRIEF DESCRIPTION OF THE DRAWING FIGURES

FIG. 7 is a flow diagram illustrating an exemplary method for a Latent Transformer core for a Large Codeword Model.

FIG. 10 is a flow diagram illustrating an exemplary method for the truncation of vectors for time series prediction.

FIG. 11 is a flow diagram illustrating an exemplary method appending metadata to the incoming data stream using a codeword allocator.

FIG. 17 is a flow diagram illustrating an exemplary method for a large codeword model for deep learning.

FIG. 21 is a flow diagram illustrating an exemplary method for language translation using a large codeword model for deep learning.

FIG. 22 is a flow diagram illustrating an exemplary method for codeword clustering using a large codeword model.

FIG. 23 is a flow diagram illustrating an exemplary method for a large codeword model for deep learning using a dual embedding layer.

FIG. 28 is a flow diagram illustrating an exemplary method for a compound large codeword model.

FIG. 29 is a flow diagram illustrating an exemplary method for a compound large codeword model that processes financial data.

FIG. 32 is a block diagram depicting exemplary architecture of structural modification process.

FIG. 33 is a method diagram illustrating the use of supervisory neuron architecture.

FIG. 34 is a method diagram illustrating the structural modification process of supervisory neuron architecture.

FIG. 35 is a method diagram illustrating inter-neuron communication process of supervisory neuron architecture.

FIG. 36 is a method diagram illustrating performance monitoring and feedback loop of supervisory neuron architecture.

FIG. 37 is a method diagram illustrating data collection and analysis workflow of supervisory neuron architecture.

FIG. 38 is a method diagram illustrating the adaptation to new input patterns process of supervisory neuron architecture.

FIG. 39 is a method diagram illustrating error handling and recovery process of supervisory neuron architecture.

FIG. 40 is a method diagram illustrating integration of supervisory neuron architecture 3100 with Large Codeword Model.

Figure 41:
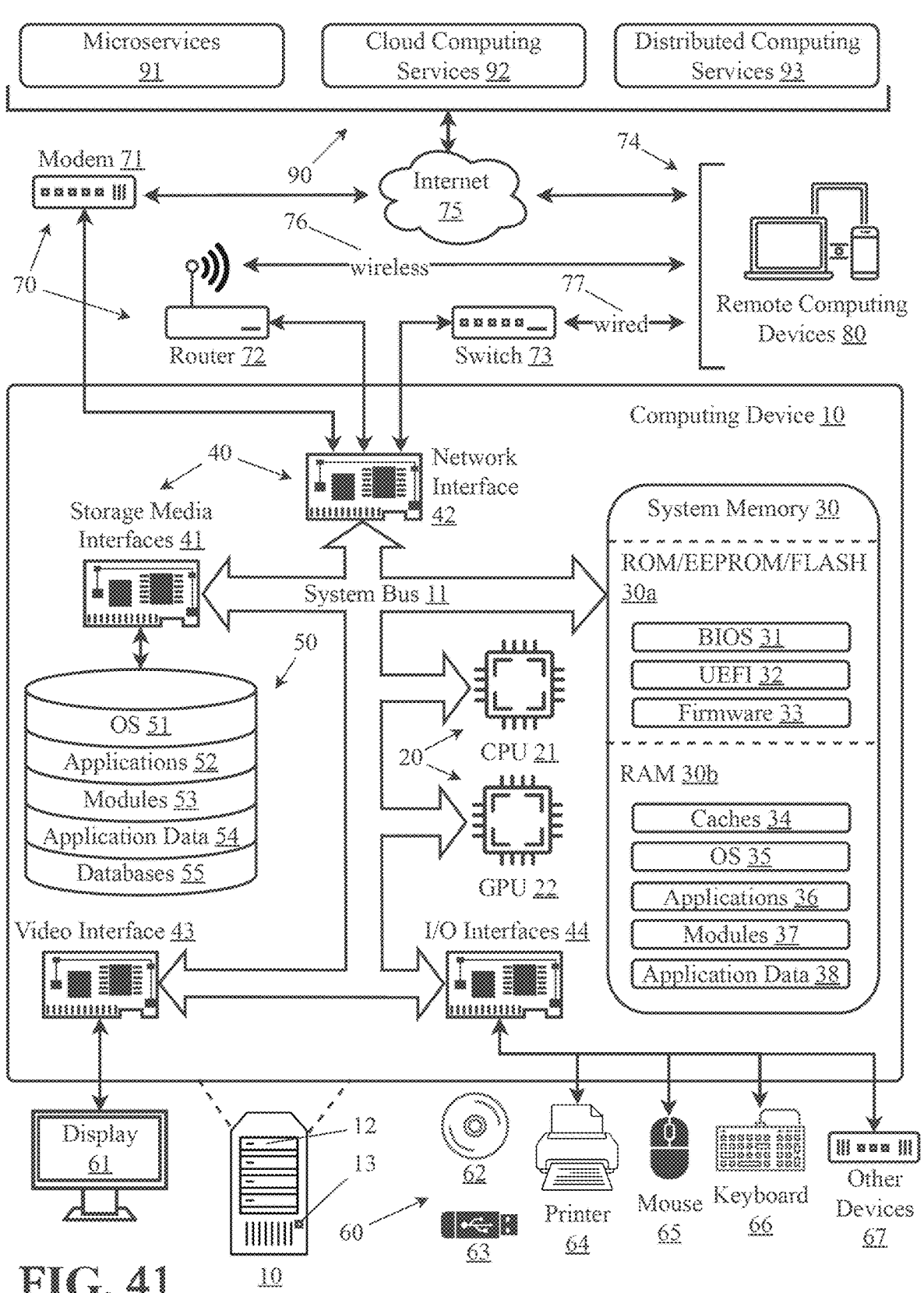

FIG. 41 illustrates an exemplary computing environment on which an embodiment described herein may be implemented.

DETAILED DESCRIPTION OF THE
INVENTION

The inventor has conceived, and reduced to practice, real-time time series forecasting using a compound large codeword model. The Latent Transformer Large Codeword Model (LCM) system for processing, analyzing, and generating data across various domains, including time series, text, images, and more. At its core, the system utilizes a combination of codeword allocation, Variational Autoencoder (VAE) encoding, and transformer-based learning to capture and leverage the underlying patterns, dependencies, and relationships within the data. The system begins by collecting a plurality of inputs and converting them into sourceblocks, which are discrete units of information that capture the essential characteristics of the data. These sourceblocks are then assigned codewords based on a codebook generated by a dedicated subsystem, creating a compressed and efficient representation of the input data. The codewords are further processed to create input vectors, which include a truncated data set, a sequence of zeros, and optionally, a metadata portion that provides additional context about the data type and characteristics.

The input vectors are then passed through a VAE encoder subsystem, which maps them into a lower-dimensional latent space, capturing the essential features and patterns in a compact representation. The latent space vectors serve as the input to a transformer-based learning component, which leverages self-attention mechanisms to uncover and learn the complex relationships and dependencies between the vectors. By analyzing the relationships in the latent space, the transformer can generate accurate predictions or outputs, particularly for tasks involving sequential or time-dependent data. The system can also incorporate metadata information to establish more targeted and context-aware relationships, enhancing the quality and accuracy of the generated results. Through iterative processing and learning, the Latent Transformer LCM system becomes a powerful tool for various data-driven applications, enabling efficient compression, analysis, prediction, and generation of data across multiple domains.

In addition to these core components, the system incorporates an innovative adaptive mechanism in the form of supervisory neurons. These supervisory neurons are operatively connected to local neural network regions within the machine learning core, specifically the transformer-based component. Each supervisory neuron is designed to monitor and modify the structure and behavior of a group of operational neurons in real-time, during the inference process.

The supervisory neurons continuously receive activation data from the operational neurons in their assigned local network region. This data includes information such as neuron activation levels, activation frequencies, and inter-neuron correlation patterns. The supervisory neurons then perform statistical analysis on this received data, employing techniques to identify trends, anomalies, or suboptimal configurations in the local network structure.

Based on this analysis, the supervisory neurons determine appropriate structural modifications to the local neural network region. These modifications can include neuron addition (analogous to biological neurogenesis), neuron removal (pruning), creation or removal of connections between neurons, and adjustment of connection weights. The supervisory neurons are capable of initiating the implementation of these determined structural modifications during the operation of the local neural network region, allowing for real-time adaptation of the network structure.

To ensure the effectiveness of these modifications, the supervisory neurons maintain historical records of activation patterns in their local network regions. By comparing current activation patterns to this historical record, the supervisory neurons can identify changes in activation patterns over time and make informed decisions about necessary structural modifications. This capability allows the system to adapt to changing input patterns or task requirements without the need for explicit retraining.

Furthermore, supervisory neurons are designed to monitor the performance of their local neural network region before and after implementing structural modifications. If a modification does not lead to improved performance, the supervisory neuron has the capability to revert the change, ensuring that only beneficial adaptations are retained.

In the context of the larger neural network, these local supervisory neurons can communicate with each other and with higher-level supervisory components. This hierarchical structure allows for coordinated adaptations across the entire network, balancing local optimizations with global performance requirements.

This adaptive mechanism, enabled by the supervisory neurons, enhances the Latent Transformer LCM system's ability to maintain high performance in dynamic environments, potentially mitigating issues such as catastrophic forgetting and improving the system's overall efficiency and adaptability. By allowing for continuous, localized adaptations during inference, the system can better handle evolving data patterns and changing task requirements, making it particularly well-suited for real-time applications such as time series forecasting.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "sourceblock" refers to a semantically meaningful unit of text that is derived from the input data through a process called syntactic splitting. Syntactic splitting involves breaking down the input text into smaller chunks along syntactic boundaries, such as those between words or tokens. These resulting chunks, or sourceblocks, serve as the basic units of representation in LCMs, replacing the traditional word or subword tokens used in Large Language Models (LLMs). Each sourceblock is then assigned a unique codeword from a codebook, which allows for efficient compression and processing of the text data. By preserving syntactic and semantic information within sourceblocks, LCMs aim to capture the inherent structure and meaning of the language more effectively while achieving higher compression ratios compared to LLMs.

As used herein, "machine learning core" refers to the central component responsible for processing and learning from the codeword representations derived from the input data. This core can consist of one or more machine learning architectures, working individually or in combination, to capture the patterns, relationships, and semantics within the codeword sequences. Some common architectures that can be employed in the machine learning core of LCMs include but are not limited to transformers, variational autoencoders (VAEs), recurrent neural networks (RNNs), convolutional neural networks (CNNs), and attention mechanisms. These architectures can be adapted to operate directly on the codeword representations, with or without the need for traditional dense embedding layers. The machine learning core learns to map input codeword sequences to output codeword sequences, enabling tasks such as language modeling, text generation, and classification. By leveraging the compressed and semantically rich codeword representations, the machine learning core of LCMs can potentially achieve more efficient and effective learning compared to traditional token-based models. The specific choice and configuration of the machine learning architectures in the core can be tailored to the characteristics of the input data and the desired output tasks, allowing for flexibility and adaptability in the design of LCMs.

As used herein, "codeword" refers to a discrete and compressed representation of a sourceblock, which is a meaningful unit of information derived from the input data. Codewords are assigned to sourceblocks based on a codebook generated by a codebook generation system. The codebook contains a mapping between the sourceblocks and their corresponding codewords, enabling efficient representation and processing of the data. Codewords serve as compact and encoded representations of the sourceblocks, capturing their essential information and characteristics. They are used as intermediate representations within the LCM system, allowing for efficient compression, transmission, and manipulation of the data.

As used herein, "supervisory neuron" refers to a specialized computational unit within a neural network that monitors, analyzes, and modifies the structure and behavior of a group of operational neurons in real-time. Supervisory neurons act as local controllers, continuously collecting activation data from their assigned neural network region. They perform statistical analysis on this data to identify patterns, anomalies, or suboptimal configurations. Based on this analysis, supervisory neurons can initiate structural modifications to the network, such as adding or removing neurons, creating or pruning connections, or adjusting connection weights. This adaptive mechanism allows the neural network to evolve its architecture dynamically in response to changing input patterns or task requirements, potentially improving performance and efficiency without the need for explicit retraining.

As used herein, "operational neuron" refers to a standard processing unit within a neural network that performs the primary computational tasks of the network. Operational neurons receive inputs, apply activation functions, and produce outputs that are passed on to other neurons or as final network outputs. Unlike supervisory neurons, operational neurons do not have the capability to modify the network structure. Instead, they form the basic building blocks of the neural network, collectively processing information to perform tasks such as pattern recognition, classification, or prediction. The behavior and connectivity of operational neurons are subject to modification by supervisory neurons, allowing for adaptive network architectures.

As used herein, "local neural network region" refers to a subset of interconnected operational neurons within a larger neural network, typically monitored and managed by one or more supervisory neurons. This region forms a functional unit within the network, often specialized for processing certain types of information or performing specific subtasks. The concept of local neural network regions allows for distributed control and adaptation within large-scale neural networks. By focusing on local regions, supervisory neurons can make targeted modifications that optimize performance for specific functions without necessarily affecting the entire network. This localized approach to network adaptation can lead to more efficient and specialized processing capabilities.

As used herein, "structural modification" refers to any change in the architecture, connectivity, or parameters of a neural network, including but not limited to neuron addition, neuron removal, connection creation, connection removal, and weight adjustment. Structural modifications are a key mechanism by which neural networks can adapt to new information or changing task requirements. Unlike traditional learning algorithms that only adjust connection weights, structural modifications allow for more fundamental changes to the network architecture. This can potentially lead to more flexible and powerful neural networks capable of handling a wider range of tasks or adapting to significant shifts in input distributions. Structural modifications are typically initiated by supervisory neurons based on their analysis of local network performance and activation patterns.

As used herein, "activation data" refers to information about the activity of neurons in a neural network, including but not limited to activation levels, activation frequencies, and inter-neuron correlation patterns. Activation data provides insight into the internal workings of the neural network, revealing how information flows through the network and which neurons or connections are most important for specific tasks. Supervisory neurons collect and analyze activation data to inform their decision-making processes. By examining patterns in activation data over time, supervisory neurons can identify underutilized or overactive parts of the network, detect emerging specializations, or recognize when the network is struggling with certain types of inputs. This information is crucial for determining appropriate structural modifications and optimizing network performance.

Conceptual Architecture

Figure 1A:
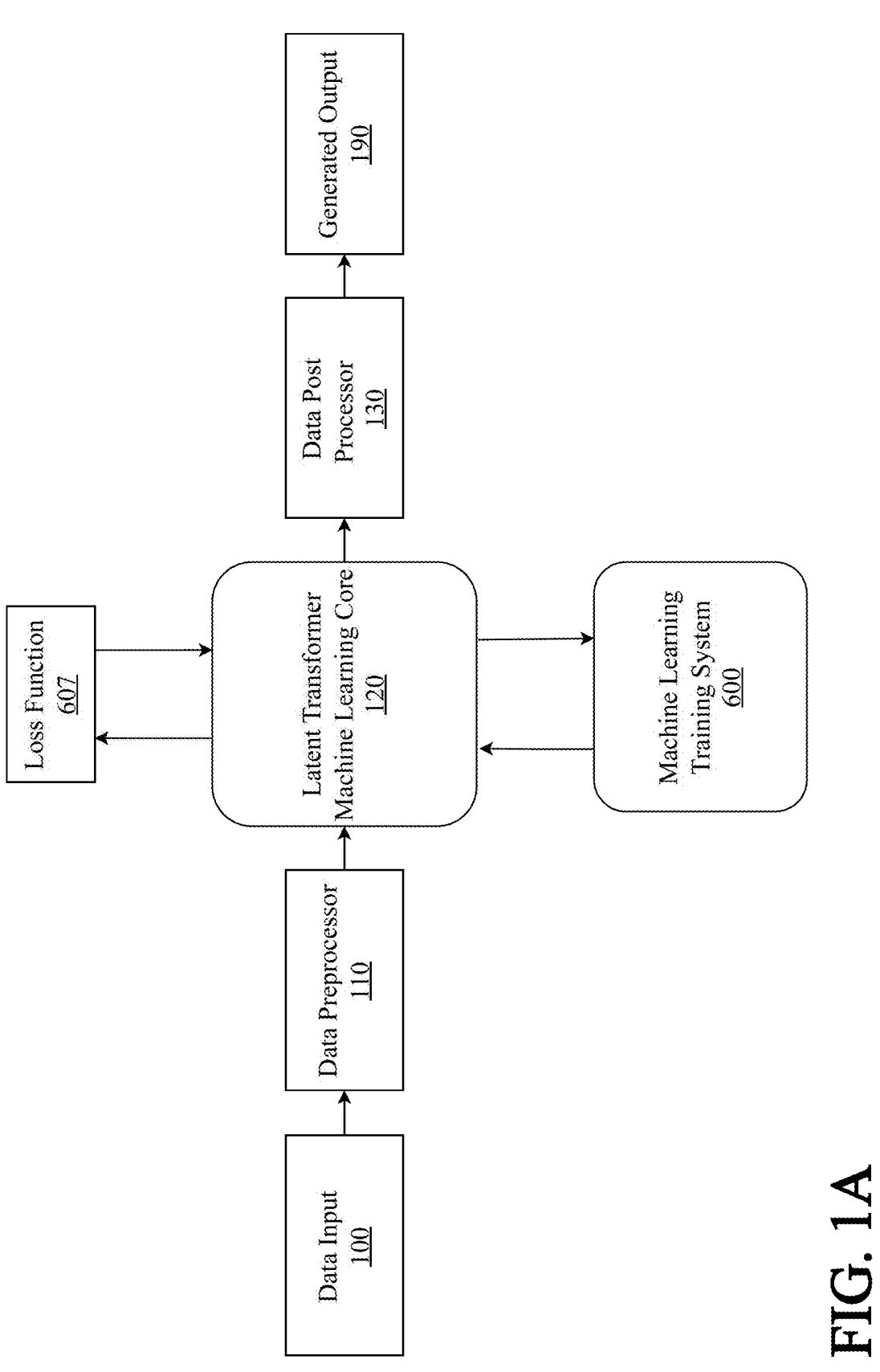
FIG. 1A is a block diagram illustrating an exemplary system architecture for a Latent Transformer core for a Large Codeword Model.

FIG. 1A is a block diagram illustrating an exemplary system architecture for a Latent Transformer core for a Large Codeword Model. The attached figure presents a streamlined view of the Latent Transformer Large Codeword Model (LCM) system, focusing on the core components and their interactions. This simplified representation highlights the essential elements of the system and illustrates the flow of data from input to output, along with the training process that enables the system to learn and generate meaningful results.

The system is fed a data input 100, which represents the raw data that needs to be processed and analyzed. This data can come from various sources and domains, such as time series, text, images, or any other structured or unstructured format. The data input 100 is fed into a data preprocessor 110, which is responsible for cleaning, transforming, and preparing the data for further processing. The data preprocessor 110 may perform tasks such as normalization, feature scaling, missing value imputation, or any other necessary preprocessing steps to ensure the data is in a suitable format for the machine learning core 120.

Once the data is preprocessed, it is passed to a latent transformer machine learning core 120. The machine learning core 120 employs advanced techniques such as self-attention mechanisms and multi-head attention to learn the intricate patterns and relationships within the data. It operates in a latent space, where the input data is encoded into a lower-dimensional representation that captures the essential features and characteristics. By working in this latent space, the machine learning core 120 can efficiently process and model the data, enabling it to generate accurate and meaningful outputs.

The generated outputs from the machine learning core 120 are then passed through a data post processor 130. The data post processor 130 is responsible for transforming the generated outputs into a format that is suitable for the intended application or user. It may involve tasks such as denormalization, scaling back to the original data range, or any other necessary post-processing steps to ensure the outputs are interpretable and usable.

The processed outputs are provided as a generated output 190, which represents the final result of the latent transformer LCM system. The generated output 190 can take various forms, depending on the specific task and domain. It could be predicted values for time series forecasting, generated text for language modeling, synthesized images for computer vision tasks, or any other relevant output format.

To train and optimize the latent transformer machine learning core 120, the system includes a machine learning training system 600. The training system 600 is responsible for updating the parameters and weights of the machine learning core 120 based on the observed performance and feedback. The training system 600 outputs from the machine learning core 120 and processes the outputs to be reinserted back through the machine learning core 120 as a testing and training data set. After processing the testing and training data set, the machine learning core 120 may output a testing and training output data set. This output may be passed through a loss function 607. The loss function 607 may be employed to measure the discrepancy between the generated outputs and the desired outcomes. The loss function 607 quantifies the error or dissimilarity between the predictions and the ground truth, providing a signal for the system to improve its performance.

The training process is iterative, where the system generates outputs, compares them to the desired outcomes using the loss function 607, and adjusts the parameters of the machine learning core 120 accordingly.

Through the iterative training process, the latent transformer machine learning core 120 learns to capture the underlying patterns and relationships in the data, enabling it to generate accurate and meaningful outputs. The training process aims to minimize the loss and improve the system's performance over time, allowing it to adapt and generalize to new and unseen data.

Figure 1B:
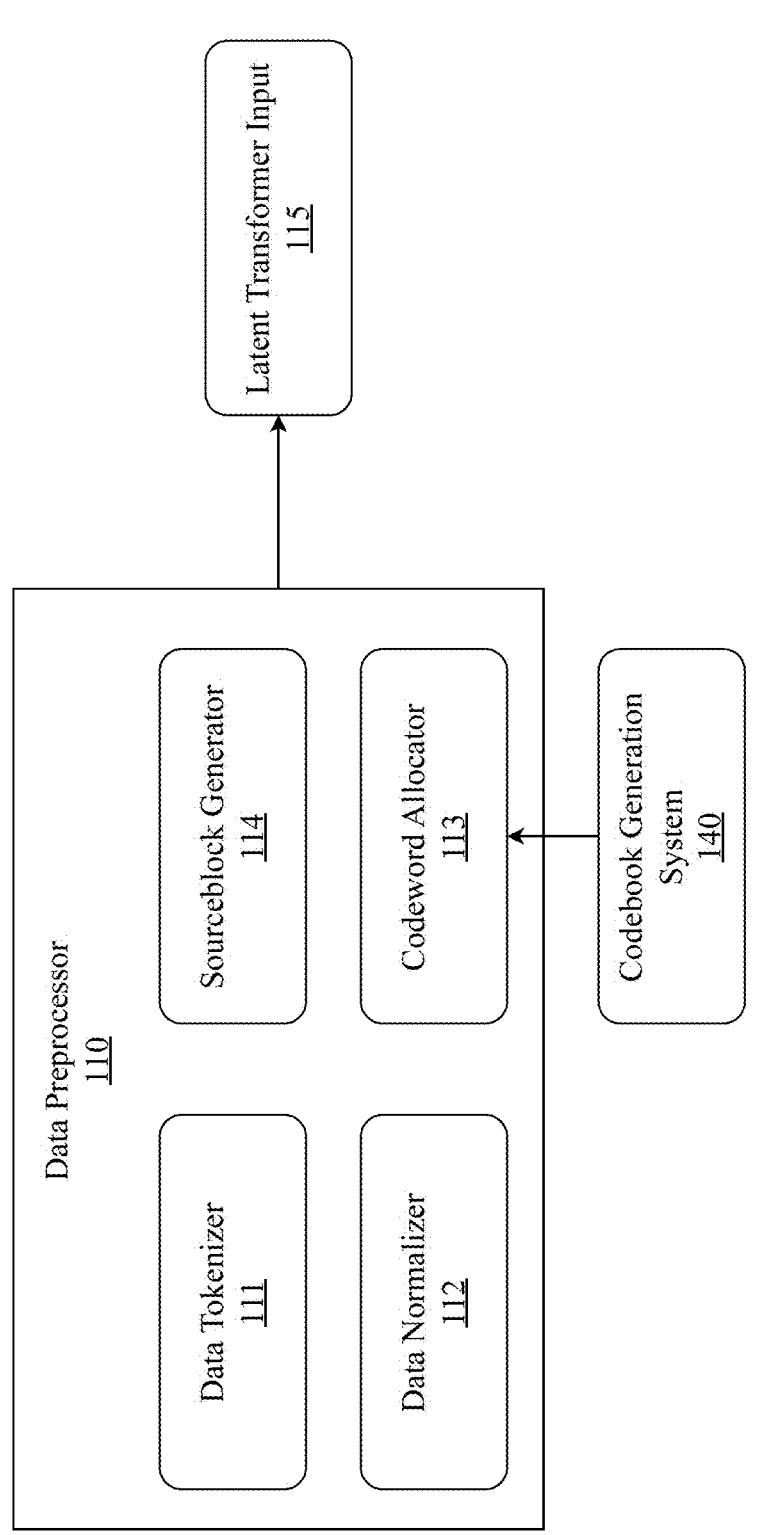
FIG. 1B is a block model illustrating an aspect of a system for a large codeword model for deep learning, a data preprocessor.

FIG. 1B is a block model illustrating an aspect of a system for a large codeword model for deep learning, a data preprocessor. The data preprocessor 110 plays a role in preparing the input data for further processing by the latent transformer machine learning core 120. It consists of several subcomponents that perform specific preprocessing tasks, ensuring that the data is in a suitable format and representation for effective learning and generation.

The data preprocessor 110 receives the raw input data and applies a series of transformations and operations to clean, normalize, and convert the data into a format that can be efficiently processed by the subsequent components of the system. The preprocessing pipeline include but is not limited to subcomponents such as a data tokenizer, a data normalizer, a codeword allocator, and a sourceblock generator. A data tokenizer 111 is responsible for breaking down the input data into smaller, meaningful units called tokens. The tokenization process varies depending on the type of data being processed. For textual data, the tokenizer may split the text into individual words, subwords, or characters. For time series data, the tokenizer may divide the data into fixed-length windows or segments. The goal of tokenization is to convert the raw input into a sequence of discrete tokens that can be further processed by the system.

A data normalizer 112 is responsible for scaling and normalizing the input data to ensure that it falls within a consistent range. Normalization techniques, such as min-max scaling or z-score normalization, are applied to the data to remove any biases or variations in scale. Normalization helps in improving the convergence and stability of the learning process, as it ensures that all features or dimensions of the data contribute equally to the learning algorithm. A codeword allocator 113 assigns unique codewords to each token generated by the data tokenizer 111. Additionally, codewords may be directly assigned to sourceblocks that are generated from inputs rather than from tokens. The codewords are obtained from a predefined codebook, which is generated and maintained by the codebook generation system 140. The codebook contains a mapping between the tokens and their corresponding codewords, enabling efficient representation and processing of the data. The codeword allocator 113 replaces each token, sourceblock, or input with its assigned codeword, creating a compressed and encoded representation of the input data.

A sourceblock generator 114 combines the codewords assigned by the codeword allocator 113 into larger units called sourceblocks. sourceblocks are formed by grouping together a sequence of codewords based on predefined criteria, such as a fixed number of codewords or semantic coherence. The formation of sourceblocks helps in capturing higher-level patterns and relationships within the data, as well as reducing the overall sequence length for more efficient processing by the latent transformer machine learning core 120.

A codebook generation system 140 is a component that works in conjunction with the data preprocessor 110. It is responsible for creating and maintaining the codebook used by the codeword allocator 113. The codebook is generated based on the statistical properties and frequency of occurrence of the tokens in the training data. It aims to assign shorter codewords to frequently occurring tokens and longer codewords to rare tokens, optimizing the compression and representation of the data.

After the data has undergone the preprocessing steps performed by the data preprocessor 110, the resulting output is the latent transformer input 115. The latent transformer input 115 represents the preprocessed and encoded data that is ready to be fed into the latent transformer machine learning core 120 for further processing and learning.

When dealing with time series prediction, the codeword allocator 113 may take a sequence of time series data points as input. In one example the input sequence consists of 1000 data points. The codeword allocator 113 performs the necessary data preparation steps to create a suitable input vector for the autoencoder. It truncates the last 50 data points from the input sequence, resulting in a sequence of 950 elements. This truncated sequence represents the historical data that will be used to predict the future values. The codeword allocator 113 then creates a 1000-element vector, where the first 950 elements are the truncated sequence, and the last 50 elements are filled with zeros. This input vector serves as the input to the Variational Autoencoder Encoder Subsystem 150, which compresses the data into a lower-dimensional latent space representation.

By performing this data preparation step, the codeword allocator 113 ensures that the input data is in a format that is compatible with the autoencoder's training process. During training, the autoencoder learns to reconstruct the complete 1000-element sequence from the truncated input vector. By setting the last 50 elements to zero, the autoencoder is forced to learn the patterns and dependencies in the historical data and use that information to predict the missing values. This approach enables the Latent Transformer LCM system to effectively handle time series prediction tasks by leveraging the power of autoencoders and the compressed latent space representation.

The codeword allocator 113 may split the incoming data input 100 meaningful units called sourceblocks. This process, known as semantic splitting, aims to capture the inherent structure and patterns in the data. The allocator 113 may employ various techniques to identify the optimal sourceblocks, such as rule-based splitting, statistical methods, or machine learning approaches. In one embodiment, the codeword allocator 113 may utilize Huffman coding to split the data into sourceblocks. The Huffman coding-based allocator enables efficient and semantically meaningful splitting of the input data into sourceblocks. Huffman coding is a well-known data compression algorithm that assigns variable-length codes to symbols based on their frequency of occurrence. In the context of the LCM, the Huffman coding-based allocator adapts this principle to perform semantic splitting of the input data.

With Huffman coding, the allocator 113 starts by analyzing the input data and identifying the basic units of meaning, such as words, phrases, or subwords, depending on the specific data modality and the desired level of granularity. This process may not be necessary for numerical or time series data sets. These basic units form the initial set of sourceblocks. The codeword allocator 130 then performs a frequency analysis of the sourceblocks, counting the occurrences of each sourceblock in the input data. Based on the frequency analysis, the allocator 113 constructs a Huffman tree, which is a binary tree that represents the probability distribution of the sourceblocks. The Huffman tree is built by iteratively combining the two least frequent sourceblocks into a single node, assigning binary codes to the branches, and repeating the process until all sourceblocks are included in the tree. The resulting Huffman tree has the property that sourceblocks with higher frequencies are assigned shorter codes, while sourceblocks with lower frequencies are assigned longer codes.

The Huffman coding-based codeword allocator 113 then uses the constructed Huffman tree to perform semantic splitting of the input data. It traverses the input data and matches the sequences of symbols against the sourceblocks represented in the Huffman tree. When a sourceblock is identified, the allocator 113 assigns the corresponding Huffman code to that sourceblock, effectively compressing the data while preserving its semantic structure. The use of Huffman coding for semantic splitting offers several advantages. It allows for variable-length sourceblocks, enabling the codeword allocator 113 to capture meaningful units of varying sizes. This is particularly useful for handling data with different levels of complexity and granularity, such as text with compound words or images with hierarchical structures.

After the sourceblock generation process, the codeword allocator 113 assigns a unique codeword to each sourceblock. The codewords are discrete, compressed representations of the sourceblocks, designed to capture the essential information in a compact form. The codeword allocator can use various mapping schemes to assign codewords to sourceblocks, such as hash functions, lookup tables, or learned mappings. For example, a simple approach could be to use a hash function that maps each sourceblock to a fixed-length binary code. Alternatively, another approach may involve learning a mapping function that assigns codewords based on the semantic similarity of the sourceblocks.

The codebook generation subsystem 140 is responsible for creating and maintaining the codebook, which is a collection of all the unique codewords used by the LCM. The codebook can be generated offline, before the actual processing begins, or it can be updated dynamically as new sourceblocks are encountered during processing. The codebook generation subsystem can use various techniques to create a compact and efficient codebook, such as frequency-based pruning, clustering, or vector quantization. The size of the codebook can be adjusted based on the desired trade-off between compression and information preservation. Going back to the War and Peace example, the string of sourceblocks ['Well', ',', 'Prince', ',', 'so', 'Gen', 'oa', 'and', 'Luc', 'ca', 'are', 'now', 'just', 'family', 'estates', 'of', 'the', 'Buon', 'apar', 'tes', '.'] may be given codewords such as [12, 5, 78, 5, 21, 143, 92, 8, 201, 45, 17, 33, 49, 62, 87, 11, 2, 179, 301, 56, 4], where each sourceblock is assigned a unique codeword, which is represented as an integer. The mapping between tokens and codewords is determined by the codebook generated by the LCM system.

Once the input data is allocated codewords, it is passed through the Variational Autoencoder Encoder Subsystem 150. This subsystem utilizes a VAE encoder to compress the codewords into a lower-dimensional latent space representation. The VAE encoder learns to capture the essential features and variations of the input data, creating compact and informative latent space vectors. The machine learning training system 600 is responsible for training the VAE encoder using appropriate objective functions and optimization techniques.

The latent space vectors generated by the VAE encoder are then fed into the Latent Transformer Subsystem 170. This subsystem is a modified version of the traditional Transformer architecture, where the embedding and positional encoding layers are removed. By operating directly on the latent space vectors, the Latent Transformer can process and generate data more efficiently, without the need for explicit embedding or positional information. The Transformer Training System 171 is used to train the Latent Transformer, leveraging techniques such as self-attention and multi-head attention to capture dependencies and relationships within the latent space.

The Latent Transformer comprises of several key components. Latent space vectors may be passed directly through a multi-head attention mechanism. The multi-head attention mechanism, which is the core building block of the Transformer, allows the model to attend to different parts of the input sequence simultaneously, capturing complex dependencies and relationships between codewords. Feed-forward networks are used to introduce non-linearity and increase the expressive power of the model. Residual connections and layer normalization are employed to facilitate the flow of information and stabilize the training process.

The Latent Transformer-based core can be implemented using an encoder-decoder architecture. The encoder processes the input codewords and generates contextualized representations, while the decoder takes the encoder's output and generates the target codewords or the desired output sequence. The encoder and decoder are composed of multiple layers of multi-head attention and feed-forward networks, allowing for deep and expressive processing of the codeword representations.

One of the key advantages of the Transformer in the LCM architecture is its ability to capture long-range dependencies between codewords. Unlike recurrent neural networks (RNNs), which process the input sequentially, the Transformer can attend to all codewords in parallel, enabling it to effectively capture relationships and dependencies that span across the entire input sequence. This is useful for processing long and complex data sequences, where capturing long-range dependencies is crucial for understanding the overall context. Another advantage of the Transformer-based core is its parallelization capability. The self-attention mechanism in the Transformer allows for efficient parallel processing of the codewords on hardware accelerators like GPUs. This parallelization enables faster training and inference times, making the LCM architecture suitable for processing large amounts of data in real-time applications.

The Latent Transformer-based core also generates contextualized representations of the codewords, where each codeword's representation is influenced by the surrounding codewords in the input sequence. This contextualization allows the model to capture the semantic and syntactic roles of the codewords based on their context, enabling a deeper understanding of the relationships and meanings within the data. The scalability of the Transformer-based core is another significant advantage in the LCM architecture. By increasing the number of layers, attention heads, and hidden dimensions, the Transformer can learn more complex patterns and representations from large-scale datasets. This scalability has been demonstrated by models like GPT-3, which has billions of parameters and can perform a wide range of tasks with impressive performance.

After being processed by the Latent Transformer, the latent space vectors are passed through the Variational Autoencoder Decode Subsystem 180. The VAE decoder takes the processed latent vectors and reconstructs the original data or generates new data based on the learned representations. The machine learning training subsystem 600 is responsible for training the VAE decoder to accurately reconstruct or generate data from the latent space. In some embodiments, the Decode Subsystem 180 may be used to create time series predictions about a particular data input.

The reconstructed or generated data is then output 190, which can be in the same format as the original input data or in a different modality altogether. This flexibility allows the Latent Transformer LCM to handle various tasks, such as data compression, denoising, anomaly detection, and data generation, across multiple domains.

Moreover, the modular design of the system enables each subsystem to be trained independently or jointly, depending on the specific requirements and available resources. The machine learning training system 600 may provide the necessary mechanisms to optimize the performance of each component and ensure the overall effectiveness of the Latent Transformer LCM.

Figure 1C:
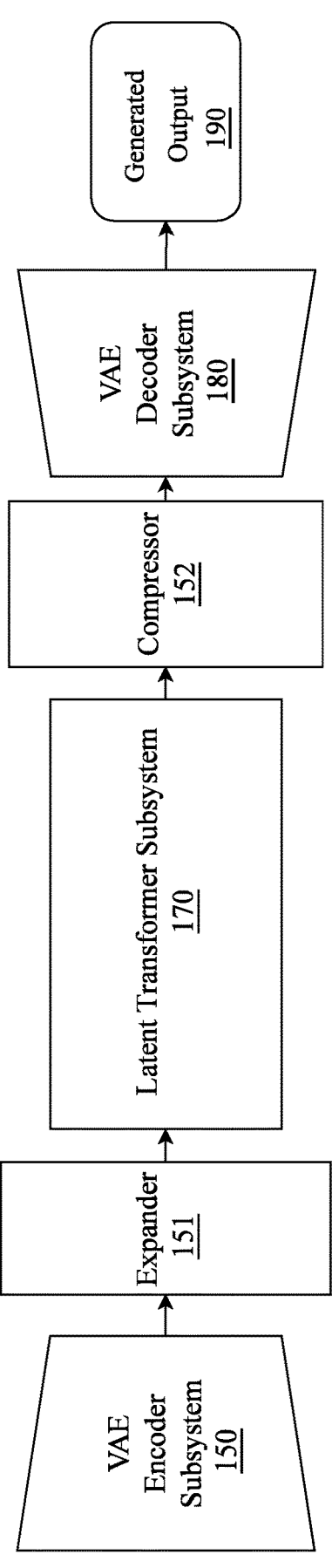
FIG. 1C is a block model illustrating an aspect of a system for a large codeword model for deep learning, a latent transformer machine learning core.

FIG. 1C is a block model illustrating an aspect of a system for a large codeword model for deep learning, a latent transformer machine learning core. At the heart of the system is a Latent Transformer Subsystem 170, which serves as the central processing unit responsible for learning the underlying patterns, relationships, and dependencies within the input data. The Latent Transformer Subsystem 170 leverages advanced techniques such as self-attention mechanisms and multi-head attention to capture the complex interactions and sequences in the data, enabling it to generate accurate and context-aware outputs.

The input to the Latent Transformer Subsystem 170 is provided by a VAE Encoder Subsystem 150. The VAE Encoder Subsystem 150 is responsible for encoding the preprocessed input data into a lower-dimensional latent space representation. An input is passed through the VAE Encoder Subsystem 150, which learns to compress the data into a compact latent space representation while preserving the essential features and characteristics of the input. Latent space vectors produced by the VAE Encoder Subsystem 150 may be further processed by an expander 151, which increases the dimensionality of the input data to a point where the vectors can be efficiently processed by the Latent Transformer Subsystem 170.

The latent space representation generated by the VAE Encoder Subsystem 150 serves as the input to the Latent Transformer Subsystem 170. The Latent Transformer Subsystem 170 operates in this latent space, leveraging the compressed and informative representation to learn the complex patterns and relationships within the data. By working in the latent space, the Latent Transformer Subsystem 170 can efficiently process and model the data, capturing the intricate dependencies and generating accurate and meaningful outputs.

Once the Latent Transformer Subsystem 170 has processed the latent space representation, the generated output is passed through the VAE Decoder Subsystem 180. The VAE Decoder Subsystem 180 is responsible for decoding the latent space representation back into the original data space. Prior to processing by the VAE Decoder Subsystem 180, Latent Transformer Subsystem outputs may be compressed back to an original size before being processed by the expander 151 by being processed by a compressor 152. The VAE Decoder Subsystem 180 learns to reconstruct the original data from the latent space representation, ensuring that the generated output is coherent and meaningful.

The reconstructed output from the VAE Decoder Subsystem 180 is provided as the generated output 190. The generated output 190 represents the final result of the Latent Transformer LCM system, which can take various forms depending on the specific task and domain. It could be predicted values for time series forecasting, generated text for language modeling, synthesized images for computer vision tasks, or any other relevant output format.

The VAE Encoder Subsystem 150 and VAE Decoder Subsystem 180 play large roles in the overall functioning of the Latent Transformer LCM system. The VAE Encoder Subsystem 150 enables the system to learn a compressed and informative representation of the input data in the latent space, while the VAE Decoder Subsystem 180 ensures that the generated output is coherent and meaningful by reconstructing it back into the original data space. The combination of these subsystems allows the Latent Transformer Subsystem 170 to focus on learning the complex patterns and relationships within the data, leading to accurate and context-aware outputs.

The specific architectures and parameters of the VAE Encoder Subsystem 150, Latent Transformer Subsystem 170, and VAE Decoder Subsystem 180 can be customized and adapted based on the characteristics and requirements of the input data and the specific task at hand. The modular design of the system allows for flexibility and extensibility, enabling the integration of different architectures, attention mechanisms, and training techniques to optimize the performance and efficiency of the Latent Transformer LCM system.

In one embodiment, the Latent Transformer LCM system may incorporate advanced techniques to ensure adversarial robustness, enhancing its reliability and security in real-world applications. Adversarial robustness refers to the model's ability to maintain accurate predictions and performance even when faced with adversarial inputs or attacks designed to mislead or manipulate the system. To achieve adversarial robustness, the LCM employs several strategies. During the training process, the model is exposed to adversarial examples alongside genuine data. These adversarial examples are generated using techniques such as the Fast Gradient Sign Method (FGSM) or Projected Gradient Descent (PGD). By learning from these perturbed inputs, the model becomes more resilient to similar attacks during inference. Before processing input data, the Latent Transformer LCM applies a series of preprocessing techniques to detect and mitigate potential adversarial perturbations. These techniques may include input transformation, feature squeezing, and spatial smoothing, which help to reduce the effectiveness of adversarial attacks while preserving the essential characteristics of the input data.

The Latent Transformer LCM may utilize an ensemble approach, combining predictions from multiple model instances or different architectural variants. This ensemble strategy helps to increase robustness by leveraging the diversity of different models, making it more challenging for an adversary to craft inputs that would fool all models simultaneously. The system also incorporates certifiable defense mechanisms, such as randomized smoothing or interval bound propagation, which provide provable guarantees on the model's robustness within certain bounds of input perturbations. Additionally, the Latent Transformer LCM may include a dedicated module for detecting potential adversarial inputs in real-time. This module analyzes input patterns and compares them against known adversarial signatures, flagging suspicious inputs for further scrutiny or alternative processing. By integrating these adversarial robustness techniques, the Latent Transformer LCM significantly enhances its resilience against malicious attacks and unexpected input variations, ensuring reliable performance in critical financial forecasting and decision-making scenarios.

Figure 1D:
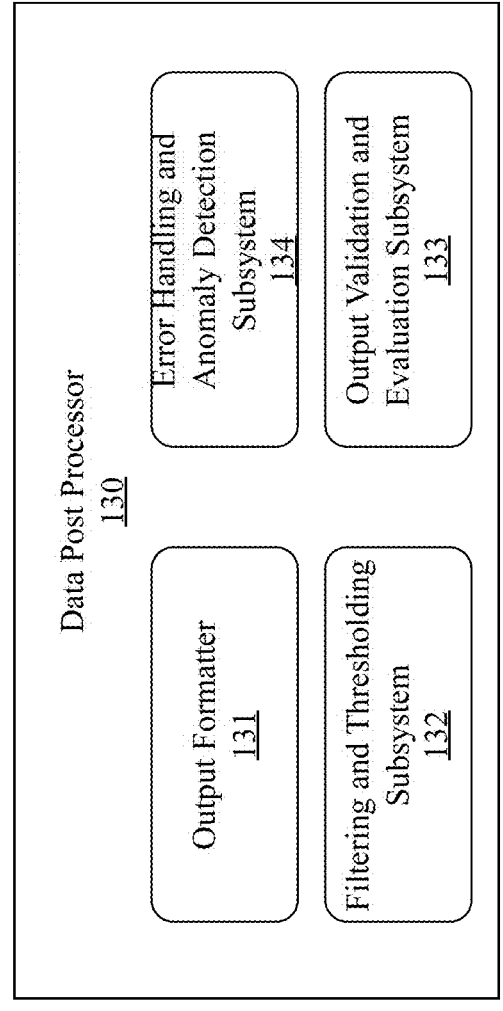
FIG. 1D is a block model illustrating an aspect of a system for a large codeword model for deep learning, a data post processor.

FIG. 1D is a block model illustrating an aspect of a system for a large codeword model for deep learning, a data post processor. The data post processor 130 receives the generated output from the Latent Transformer Machine Learning Core 120 and applies a series of transformations and operations to adapt it to the desired format and characteristics. The post-processing system may include, but is not limited to an output formatter, a filtering and thresholding subsystem, an output validation and evaluation subsystem, and an error handling and anomaly detection subsystem.

An output formatter 131 is responsible for converting the generated output into a specific format required by the application or user. It applies formatting rules and conventions to enhance the readability, coherence, and usability of the generated output. For example, in the case of generated text, the output formatter 131 may apply capitalization, punctuation, or line breaks to improve the clarity and structure of the text. In the case of generated time series data, the output formatter 131 may convert the values into the desired unit of measurement or apply specific formatting conventions to ensure consistency with the expected output format.

A filtering and thresholding subsystem 132 applies specific criteria or thresholds to filter or select the most relevant or reliable generated outputs. It helps to refine the generated output based on predefined rules, constraints, or user preferences. For example, in a recommendation system, the filtering and thresholding subsystem 132 may filter out generated recommendations that fall below a certain relevance threshold or exclude items that have already been recommended to the user. This subsystem ensures that only the most pertinent and valuable outputs are presented to the user or passed on for further processing.

An output validation and evaluation subsystem 133 assesses the quality and performance of the generated output against predefined metrics or ground truth data. It applies validation techniques to ensure that the generated output meets the expected criteria and conforms to the desired characteristics. This subsystem may include automatic evaluation methods, such as calculating similarity scores, perplexity, or domain-specific metrics, to measure the accuracy, coherence, or effectiveness of the generated output. By continuously monitoring and evaluating the generated output, the output validation and evaluation subsystem 133 provides valuable insights for model improvement and fine-tuning.

An error handling and anomaly detection subsystem 134 identifies and handles any errors, anomalies, or unexpected patterns in the generated output. It incorporates techniques for detecting and correcting syntactic or semantic errors, identifying out-of-distribution samples, or flagging potential issues that require human intervention. This subsystem plays a critical role in maintaining the quality and reliability of the generated output by proactively identifying and addressing any problems or inconsistencies. It helps to prevent the propagation of errors downstream and ensures that the generated output is trustworthy and dependable.

The data post processor 130 works seamlessly with the other components of the Latent Transformer LCM system to deliver high-quality and reliable generated outputs. It receives the generated output from the Latent Transformer Machine Learning Core 120, which has learned the underlying patterns, relationships, and dependencies within the input data. The post-processing subsystems within the data post processor 130 then refine, format, validate, and ensure the quality of the generated output, making it suitable for the intended application or user.

The specific configuration and parameters of each subsystem within the Data Post Processor 130 can be customized and adapted based on the requirements of the application domain and the nature of the generated output. The modular design of the post-processor allows for the integration of additional subsystems or the modification of existing ones to meet the specific needs of the task at hand.

Figure 2:
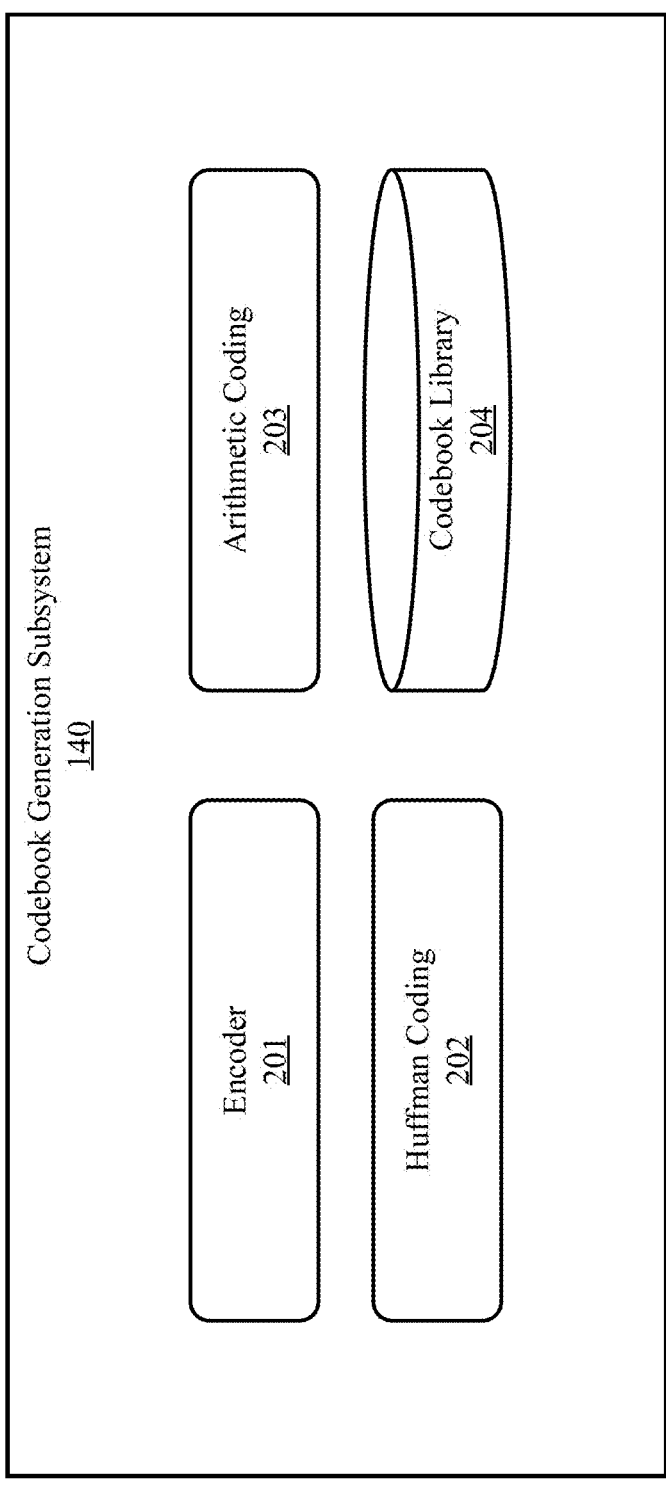
FIG. 2 is a block diagram illustrating an aspect of system for a large codeword model for deep learning, a codeword generation subsystem.

FIG. 2 is a block diagram illustrating an aspect of system and method for a large codeword model for deep learning, a codeword generation subsystem. According to the aspect, codebook generation subsystem 140 is configured to generate one or more codebooks for a collection of input data using various techniques, such as Huffman coding or arithmetic coding.

The codebook is an important component of the codebook-based homomorphic compression system. According to the embodiment, it is a collection of codewords, where each codeword corresponds to a sourceblock in the input. The codebook may generate based on the frequency distribution of the inputs, assigning shorter codewords to more frequently occurring inputs and longer codewords to less frequent inputs. There are several techniques for generating the codebook, with the goal of minimizing the average codeword length while maintaining the uniqueness of the codewords. Two common techniques are Huffman coding 202 and arithmetic coding 203. Huffman coding 202 is a variable-length coding technique that assigns codewords based on the frequency of occurrence of each symbol (sourceblock). It constructs a binary tree, known as the Huffman tree, where each leaf node represents a symbol and the path from the root to the leaf determines the codeword. More frequent symbols are assigned shorter codewords, while less frequent symbols receive longer codewords. Huffman coding guarantees an optimal prefix code, meaning no codeword is a prefix of any other codeword. For example, consider the quantized temperature data from the previous example. Let's say the frequency distribution of the intervals is as follows:

Sourceblock 0: 5%
Sourceblock 1: 10%
Sourceblock 2: 20%
Sourceblock 3: 15%
Sourceblock 4: 50%

Using Huffman coding, the codebook generation subsystem 140 can generate the following codebook:

Sourceblock 0:1100
Sourceblock 1:101
Sourceblock 2:00
Sourceblock 3:01
Sourceblock 4:11

The most frequent input (Sourceblock 4) receives the shortest codeword (11), while the least frequent input (Sourceblock 0) receives the longest codeword (1100).

Arithmetic coding 203 is another entropy coding technique that assigns codewords to sourceblocks based on their probability distribution. Unlike Huffman coding, arithmetic coding does not assign fixed codewords to symbols. Instead, it represents the entire message as a single fractional number between 0 and 1. The interval [0, 1) is recursively divided based on the probabilities of the symbols, and the final codeword is a binary fraction that falls within the subinterval corresponding to the entire message. Arithmetic coding achieves near-optimal compression rates but requires more computational complexity compared to Huffman coding. For example, using the same quantized temperature data and frequency distribution as before, arithmetic coding would assign subintervals to each symbol based on their probabilities:

Sourceblock 0: [0.00, 0.05)
Sourceblock 1: [0.05, 0.15)

Sourceblock 2: [0.15, 0.35)

Sourceblock 3: [0.35, 0.50)

Sourceblock 4: [0.50, 1.00)

To encode a message sequence like [Sourceblock 4, Sourceblock 2, Sourceblock 1], arithmetic coding would recursively subdivide the interval [0, 1) based on the probabilities of the symbols, resulting in a final subinterval. The codeword would be a binary fraction that lies within this final subinterval.

According to an embodiment, an encoder component 201 is present and configured to implement one or more deep learning techniques for generating codewords for quantized data. Deep learning techniques can be employed to generate effective codewords for the quantized data. One approach is to use deep learning-based autoencoder models to learn compact and meaningful representations of the quantized data. Autoencoders are neural network architectures that consist of an encoder and a decoder, where the encoder learns to compress the input data into a lower-dimensional latent space, and the decoder reconstructs the original data from the latent representation.

Here are a few exemplary deep learning encoding techniques that can be implemented for creating codewords of the quantized data, according to an embodiment. Convolutional autoencoders (CAEs) leverage convolutional neural networks (CNNs) in the encoder and decoder parts of the autoencoder. CNNs are particularly effective in capturing spatial dependencies and hierarchical features in data, making them well-suited for encoding structured data such as images or time series. In the context of the codebook-based homomorphic compression, a CAE can be trained on the quantized data. The encoder part of the CAE learns to compress the quantized data into a compact latent representation, which serves as the codeword. The decoder part learns to reconstruct the quantized data from the codeword. As an example, consider an example of using a CAE for encoding quantized sensor data. The quantized data is represented as a 2D matrix, where each row corresponds to a sensor reading, and each column represents a time step. The CAE encoder consists of convolutional layers followed by pooling layers, which gradually reduce the spatial dimensions of the input and extract meaningful features. The output of the encoder is a compact latent representation, which serves as the codeword. The CAE decoder consists of upsampling layers and convolutional layers, which reconstruct the original quantized data from the codeword.

Another form of deep learning coding includes recurrent autoencoders (RAEs). Recurrent autoencoders utilize recurrent neural networks (RNNs) in the encoder and decoder parts of the autoencoder. RNNs are well-suited for processing sequential data, such as time series or natural language, as they can capture temporal dependencies and context. An RAE can be used to encode quantized sequential data. The encoder part of the RAE consists of recurrent layers, such as Long Short-Term Memory (LSTM) or Gated Recurrent Unit (GRU) layers, which process the input sequence and generate a fixed-length latent representation, serving as the codeword. The decoder part of the RAE takes the codeword and reconstructs the original quantized sequence. For example, consider an example of using an RAE for encoding quantized audio data. The quantized audio signal is represented as a sequence of amplitude values. The RAE encoder consists of LSTM layers that process the input sequence and generate a fixed-length latent representation, which serves as the codeword. The RAE decoder, also consisting of LSTM layers, takes the codeword and reconstructs the original quantized audio sequence.

Another form of deep learning coding includes variational autoencoders (VAEs). Variational autoencoders extend the concept of autoencoders by introducing a probabilistic framework. VAEs learn to encode the input data into a probability distribution in the latent space, rather than a single point. The encoder part of the VAE learns to map the input data to the parameters of a probability distribution (e.g., mean and variance of a Gaussian distribution), and the decoder part learns to reconstruct the original data from samples drawn from this distribution. A VAE can be used to generate codewords that capture the underlying probability distribution of the quantized data. The encoder part of the VAE learns to map the quantized data to the parameters of a probability distribution in the latent space. The codewords are then obtained by sampling from this distribution. The decoder part of the VAE learns to reconstruct the original quantized data from the sampled codewords. Consider an example of using a VAE for encoding quantized image data. The quantized images are fed into the VAE encoder, which learns to map each image to the parameters of a Gaussian distribution in the latent space. The codewords are obtained by sampling from this distribution. The VAE decoder takes the sampled codewords and reconstructs the original quantized images.

Another form of deep learning coding includes deep belief networks (DBNs). Deep Belief Networks are generative models that consist of multiple layers of restricted Boltzmann machines (RBMs). DBNs can learn hierarchical representations of the input data by training each layer in an unsupervised manner, followed by fine-tuning the entire network using supervised learning. DBNs can be used to generate codewords that capture the hierarchical structure of the quantized data. The DBN is trained on the quantized data, and the activations of the hidden layers serve as the codewords. The hierarchical nature of DBNs allows for capturing complex patterns and dependencies in the data. Consider an example of using a DBN for encoding quantized text data. The quantized text is represented as a binary vector, where each element corresponds to the presence or absence of a specific word. The DBN is trained on the quantized text data, and the activations of the hidden layers serve as the codewords. The DBN learns to capture the hierarchical structure and semantic relationships in the text data.

These are just a few examples of deep learning encoding techniques that can be explored for creating codewords of the quantized data in a LCM. The choice of the specific deep learning architecture depends on the nature of the data and the desired properties of the codewords. It's important to note that the deep learning encoding process should be designed to generate codewords that are suitable for homomorphic operations. The codewords should exhibit certain properties, such as being compatible with the homomorphic encryption scheme's plaintext space and allowing for efficient homomorphic computations.

During the training process of the deep learning models, the objective function should be designed to capture the desired properties of the codewords, such as minimizing the reconstruction error while ensuring the codewords are suitable for homomorphic operations. Additionally, regularization techniques can be employed to encourage sparsity or other desirable properties in the codewords. Once the deep learning models are trained, the encoder part can be used to generate codewords for new quantized data. The generated codewords can then be used in the codebook-based homomorphic compression scheme, enabling efficient and privacy-preserving computations on the compressed data.

Experimental evaluation and performance analysis can be conducted to assess the effectiveness of the deep learning encoding techniques in generating codewords that achieve good compression ratios, maintain low approximation errors, and enable efficient homomorphic operations. The choice of the deep learning architecture and hyperparameters can be fine-tuned based on the specific requirements and characteristics of the data.

According to the aspect, a codebook library 204 is present and configured to store a plurality of codewords (i.e., a codebook) generated by one or more of the techniques described herein. When it comes to storing the codewords and codebook in the codebook-based homomorphic compression system, several database systems and data storage solutions can be considered. The choice of the storage system depends on factors such as the size of the codebook, the frequency of updates, the retrieval and query requirements, and the overall system architecture. In some implementations key-value stores may be used, Key-value stores are a type of NoSQL database that provide a simple and efficient way to store and retrieve data based on a unique key. Examples of key-value stores include Redis, Memcached, and Amazon DynamoDB. For storing the codewords and codebook, key-value stores can be used to store each codeword as a key-value pair, where the key represents the codeword, and the value represents the corresponding data or metadata associated with the codeword. The codebook can be stored as a collection of key-value pairs, allowing for fast retrieval of codewords based on their keys. Key-value stores offer high performance, low latency, and scalability, making them suitable for scenarios where fast retrieval of codewords is critical.

Document databases, such as MongoDB or Couchbase, store data as flexible, semi-structured documents in formats like JSON or BSON. They provide a schema-less design and allow for easy modification of the data structure. For storing the codewords and codebook, document databases can be used to store each codeword as a document, along with its associated data or metadata. The codebook can be stored as a collection of documents, where each document represents a codeword and its related information. Document databases offer flexibility in terms of data structure, allowing for easy addition or modification of codeword attributes. They also provide querying capabilities based on document fields, enabling efficient retrieval of codewords based on specific criteria.

Relational databases, such as MySQL, PostgreSQL, or Oracle, can also be used to store the codewords and codebook. In a relational database, the codewords can be stored in a table with columns representing the codeword and its associated data or metadata. The codebook can be stored in a separate table, with each row representing a codeword and its corresponding information. Relational databases provide structured querying capabilities using SQL, allowing for efficient retrieval and filtering of codewords based on specific conditions. Relational databases offer strong consistency, ACID properties, and support for complex queries, making them suitable for scenarios where data integrity and structured querying are important.

Graph databases, such as Neo4j or Amazon Neptune, store data as nodes and edges in a graph structure. They are designed to efficiently handle complex relationships and connections between data entities. For storing the codewords and codebook, graph databases can be used to represent the relationships between codewords and their associated data or metadata. Each codeword can be represented as a node in the graph, with edges connecting related codewords or linking codewords to their corresponding data. Graph databases provide efficient traversal and querying capabilities based on the graph structure, allowing for fast retrieval of connected codewords and exploration of relationships between codewords.

Distributed key-value stores, such as Apache Cassandra or Apache HBase, are designed to handle large-scale data and provide high scalability and fault tolerance. They distribute data across multiple nodes in a cluster, allowing for horizontal scaling. For storing the codewords and codebook, distributed key-value stores can be used to store codewords as key-value pairs, similar to regular key-value stores. The codebook can be partitioned and distributed across multiple nodes in the cluster, enabling high scalability and performance. Distributed key-value stores offer eventual consistency, high write throughput, and the ability to handle large volumes of data, making them suitable for scenarios where scalability and fault tolerance are critical.

Figure 3:
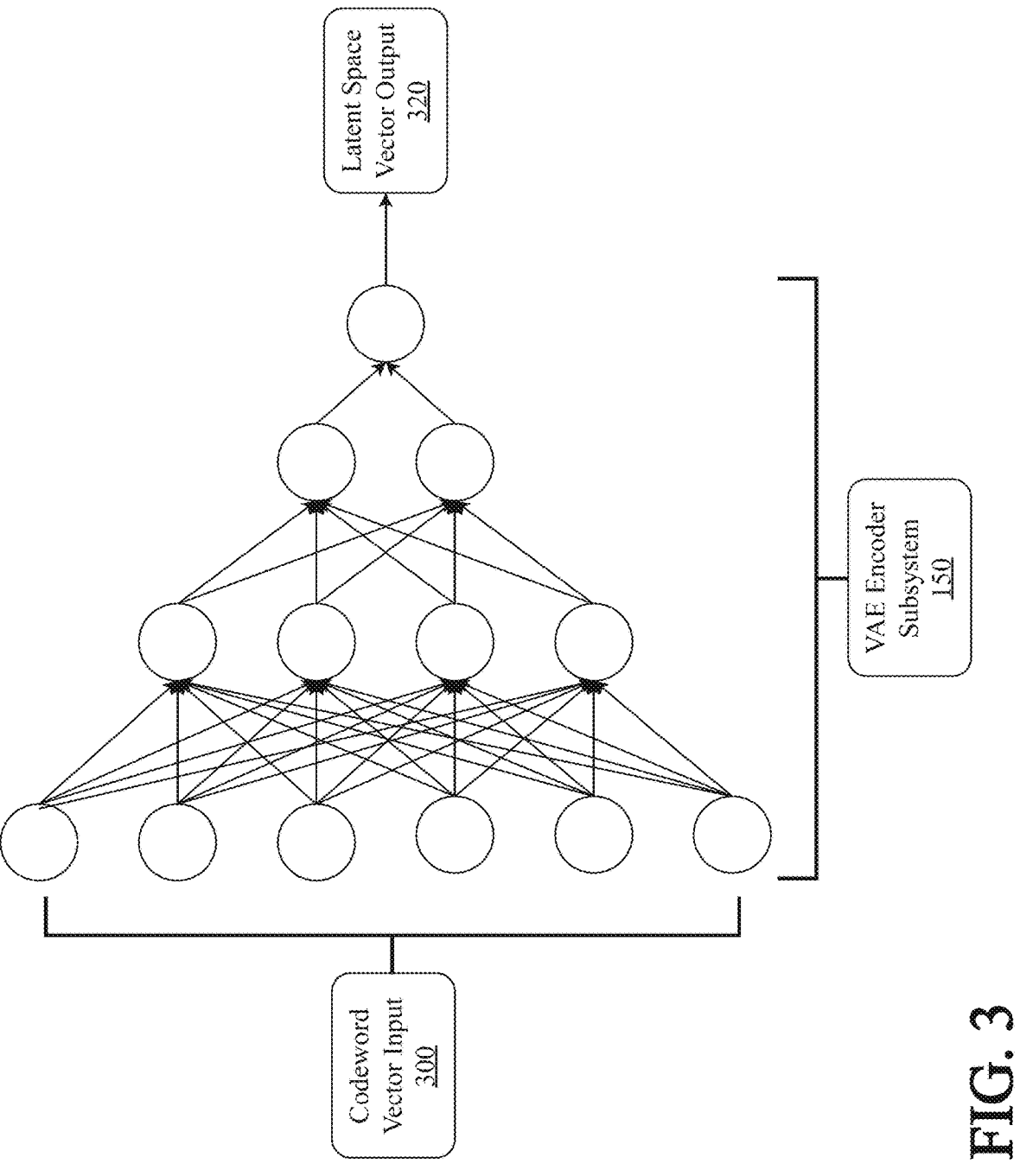
FIG. 3 is a block diagram illustrating a component of the system for a Latent Transformer core for a Large Codeword Model, a Variational Autoencoder Encoder Subsystem.

FIG. 3 is a block diagram illustrating a component of the system for a Latent Transformer core for a Large Codeword Model, a Variational Autoencoder Encoder Subsystem. A VAE Encode Subsystem is responsible for compressing the input codeword vectors into a lower-dimensional latent space representation, enabling efficient processing and data generation.

The VAE Encoder Subsystem 150 takes a codeword vector input 300 as its input. This codeword vector is generated by the codeword allocator 113, which converts the raw input data into a sequence of codewords based on the codebook maintained by the codebook generation subsystem 140. The codeword vector represents the input data in a compact and discrete form, capturing the essential information and structure of the original data. Inside the VAE Encode Subsystem 150, the codeword vector input 300 undergoes a series of transformations to map it into the latent space. The encoder architecture typically consists of multiple layers of neural networks, such as fully connected layers or convolutional layers, depending on the nature of the input data.

A layer of the encoder takes the codeword vector and applies a linear transformation to project it into a higher-dimensional space. This transformation is learned during the training process and helps to capture the complex patterns and relationships within the input data. The output of this layer may be passed through a non-linear activation function, such as the rectified linear unit (ReLU), to introduce non-linearity and enhance the representational power of the encoder.

As the codeword vector input 300 progresses through the subsequent layers of the encoder, the dimensionality of the representation is gradually reduced. Each layer applies a linear transformation followed by a non-linear activation function, allowing the encoder to learn hierarchical features and abstract representations of the input data.

The VAE Encoder Subsystem 150 in the Latent Transformer LCM system can be trained independently or jointly with the other machine learning components, such as the Latent Transformer Subsystem 170 and the VAE Decode Subsystem 180. The flexibility in training allows for optimizing the VAE encoder based on specific requirements and available resources. When trained individually, the VAE encoder can focus on learning the optimal compression and representation of the input codeword vectors in the latent space. The Encoder Training System 151 is responsible for updating the encoder's parameters using techniques like gradient descent and backpropagation, minimizing the reconstruction loss and the KL divergence. Individual training enables the encoder to specialize in mapping the input data to a meaningful latent space representation.

On the other hand, joint training of the VAE encoder 150 with the Latent Transformer 170 and VAE decoder 180 allows for end-to-end optimization of the entire system. By training all components simultaneously, the VAE encoder 150 can learn to generate latent space vectors that are well-suited for processing by the Latent Transformer and decoding by the VAE decoder 180. Joint training enables the system to capture the dependencies and interactions between the different components, leading to improved overall performance. However, joint training may be more computationally intensive and require careful coordination between the training systems. The choice between individual or joint training depends on factors such as the complexity of the data, the desired performance, and the available computational resources. Experimentation and evaluation can help determine the most suitable training approach for a given scenario.

Once the VAE Encoder Subsystem 150 is trained, it can map the input codeword vector to a lower-dimensional latent space representation. This latent space vector captures the essential features and characteristics of the input data in a compressed form. The dimensionality of the latent space vector is typically much smaller than the original codeword vector, allowing for efficient storage and processing.

The latent space vector output 320 serves as the input to the Latent Transformer Subsystem 170, which further processes and generates data based on the learned latent space representation. By compressing the input data into a compact latent space, the VAE Encoder Subsystem 150 enables the Latent Transformer LCM system to handle large-scale and complex datasets efficiently, while preserving the essential information and structure of the data.

Latent space vectors possess the property of continuous differentiability. This means that the latent space formed by these vectors is a smooth and continuous manifold, allowing for smooth interpolation and gradual transitions between different points in the latent space. The continuous differentiability of latent space vectors has important implications for the similarity and relatedness of the outputs generated by the LCM system. In the latent space, outputs that are more proximate to one another, i.e., closer in terms of their latent vector representations, tend to exhibit higher levels of similarity. This is because the VAE Encoder Subsystem 150 learns to map similar input data points to nearby regions in the latent space, capturing their shared characteristics and underlying patterns.

As a result, when the Latent Transformer Subsystem 170 operates on the latent space vectors and generates outputs, the proximity of the latent vectors directly influences the similarity of the generated outputs. Outputs corresponding to latent vectors that are close to each other in the latent space are more likely to share common features, styles, or semantics. This property enables smooth interpolation between different outputs, allowing for the generation of intermediate or blended results that exhibit gradual variations along the latent space. The continuous differentiability of latent space vectors also facilitates the learning and optimization process of the LCM system. During training, the gradients can be computed and propagated smoothly through the latent space, enabling efficient updates of the model parameters. This allows the system to learn meaningful and coherent representations of the input data, capturing the underlying structure and relationships.

Moreover, the proximity-based similarity of latent space vectors opens up possibilities for various applications and use cases. For example, in the context of image generation, interpolating between latent vectors of different images can lead to the generation of smooth transitions or morphs between the corresponding visual contents. Similarly, in the domain of text generation, interpolating between latent vectors of different sentences or paragraphs can result in the generation of semantically coherent and gradually varying textual outputs. The continuous differentiability and proximity-based similarity of latent space vectors in the LCM system provide a powerful tool for exploring and manipulating the generated outputs. By navigating and interpolating within the latent space, users can discover novel and meaningful variations of the data, generate diverse and creative outputs, and gain insights into the underlying structure and relationships captured by the model.

In the Variational Autoencoder (VAE) Encoder and Decoder subsystems of the Latent Transformer Large Codeword Model (LCM) system, the shape of the tensors undergoes transformations as they are compressed and decompressed. The VAE Encoder Subsystem 150 is responsible for compressing the input data into a lower-dimensional latent space representation, while the VAE Decoder Subsystem 180 decompresses the latent representation back into the original data space. The specific shape and dimensionality of the tensors at each stage of the encoding and decoding process can be adjusted based on the goals and requirements of the system.

The VAE Encoder Subsystem 150 takes the preprocessed input data, which is typically in the form of a high-dimensional vector or tensor, and applies a series of transformations to reduce its dimensionality. The shape of the tensor at each layer of the VAE Encoder Subsystem 150 can be customized based on the desired level of compression and the complexity of the input data. For example, after passing through the first layer of the encoder, the expanded input vector may be reduced to a tensor with 1000 elements. This compression step aims to capture the most salient features and patterns in the input data while reducing its dimensionality. The subsequent layers of the encoder can further compress the tensor, reducing it to even lower dimensions, such as 50 or 10 elements, depending on the specific training parameters and the desired level of compression.

The choice of the target dimensionality for the latent space representation depends on various factors, such as the nature of the input data, the complexity of the patterns and relationships to be captured, and the available computational resources. A smaller latent space dimensionality can lead to higher compression rates and more efficient processing, but it may also result in a loss of information and reduced expressiveness. On the other hand, a larger latent space dimensionality allows for more detailed and nuanced representations but may require more computational resources and longer training times.

Once the input data is compressed into the latent space representation, it is passed through the Latent Transformer Subsystem 170, where the self-attention mechanisms and multi-head attention operate on the compressed representation. The Latent Transformer Subsystem 170 learns the underlying patterns, relationships, and dependencies within the latent space, enabling it to generate accurate and context-aware outputs. If the shape of the latent space representation is not large enough to be effectively processed by the Latent Transformer Subsystem 170, the latent space vectors may be processed by an expander 151, which increases the dimensionality of the vector allowing for a richer and more expressive representation.

The generated output from the Latent Transformer Subsystem 170 is then fed into the VAE Decoder Subsystem 180, which is responsible for decompressing the latent representation back into the original data space. The VAE Decoder Subsystem 180 applies a series of transformations to gradually increase the dimensionality of the tensor, eventually reconstructing it into the desired output shape. Similar to the encoding process, the shape of the tensor at each layer of the VAE Decoder Subsystem 180 can be customized based on the desired output characteristics and the requirements of the application.

The flexibility in tensor shapes throughout the encoding and decoding process allows the Latent Transformer LCM system to adapt to various data types, input sizes, and output requirements. By adjusting the compression and decompression parameters, the system can be optimized for different goals, such as achieving high compression rates, preserving important details, or generating outputs with specific dimensions or characteristics.

The ability to customize the tensor shapes in the VAE Encoder and Decoder subsystems enables the Latent Transformer LCM system to handle a wide range of data modalities and tasks, from time series forecasting and language modeling to image generation and beyond. It provides the flexibility to tailor the system to the specific needs of each application, balancing the trade-offs between compression, expressiveness, and computational efficiency.

Figure 4:
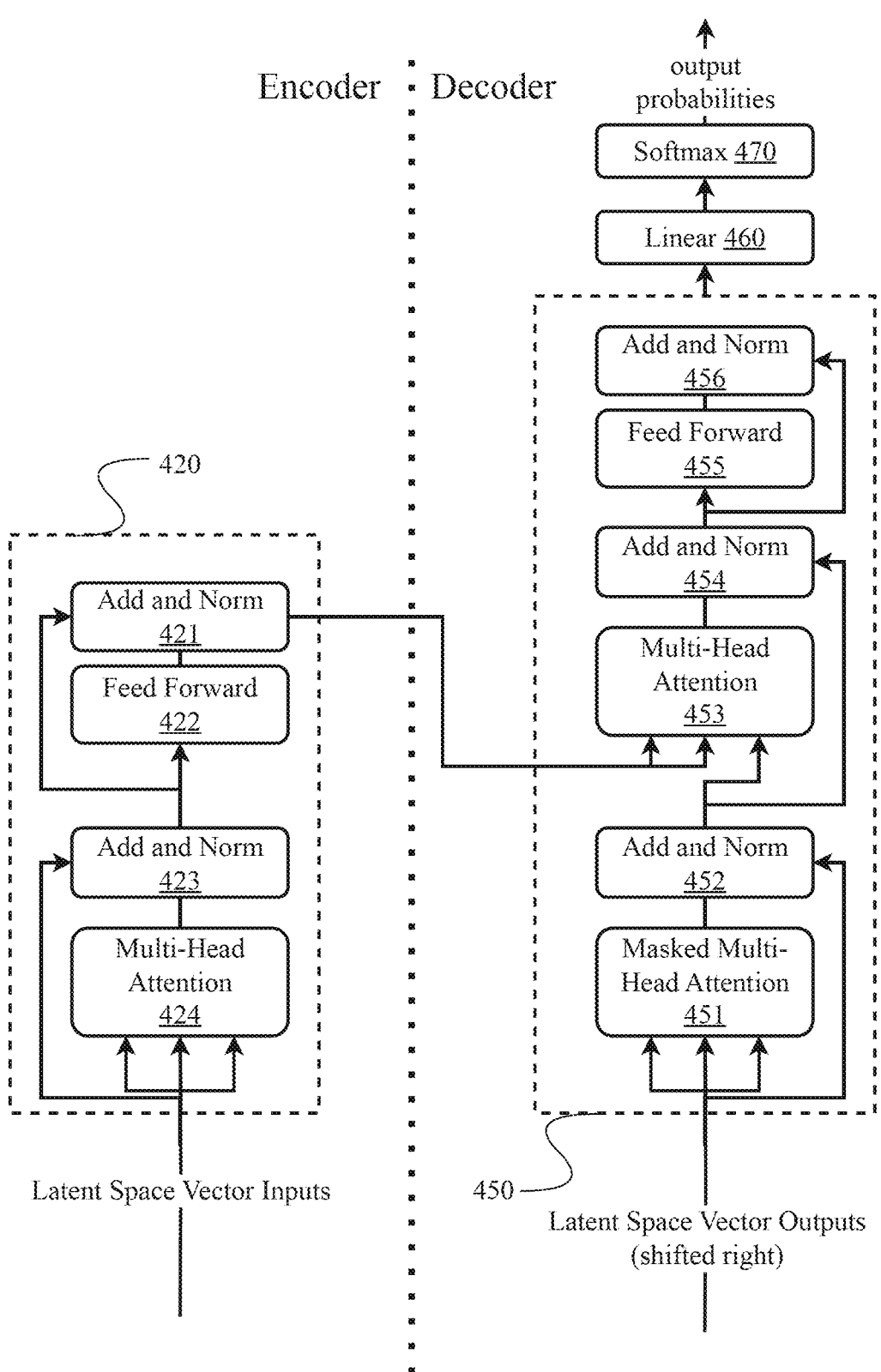
FIG. 4 is a block diagram illustrating a component of the system and method for a Latent Transformer core for a Large Codeword Model, a Latent Transformer.

FIG. 4 is a block diagram illustrating a component of the system and method for a large codeword model for deep learning, a Latent Transformer. A Transformer generally comprises an Encoder (the components on the left side of the illustration) and a Decoder (the components on the right side of the illustration).

The illustrated Latent Transformer comprises an Encoder and a Decoder. The Encoder takes latent space vector inputs and processes them through a stack of layers (represented as dashed box 420). Each layer consists of: multi-head attention, which allows the model to attend to different parts of the input sequence; add and norm, which applies residual connection and layer normalization; feed forward, which is a fully connected feed-forward network; and add and norm which is another residual connection and layer normalization.

The power of the transformer model lies in the self-attention mechanism. This mechanism contributes to accelerated learning compared to traditional models such as long short-term memory models. Self-attention empowers the transformer model with the remarkable capability to meticulously scrutinize distinct segments of a given sequence or even encompass the entire contextual essence of a sentence. This profound contextual awareness enables the model to make predictions with an elevated degree of accuracy and relevance.

Contrary to a standard transformer architecture, in a Latent Transformer, an input embedding layer and a positional encoding layer are not necessary. This is because rather than processing data inputs, a Latent Transformer processes latent space vectors which have been processed by a Variational Autoencoder encoder.

This latent space representation captures the essential features and characteristics of the input data, including both the content and positional information. By encoding the input data into a compact latent vector, the VAE effectively combines the roles of the embedding layer and positional encoding layer. The latent vectors generated by the VAE encoder already contain the necessary information for the Transformer to process and learn from, without the need for explicit embedding or positional encoding. This streamlined approach simplifies the Transformer architecture and reduces the computational overhead associated with maintaining separate embedding and positional encoding layers. As a result, the Latent Transformer LCM system can efficiently process and generate data in the latent space, leveraging the power of the Transformer architecture while benefiting from the compressed representation learned by the VAE.

The Encoder utilizes a multi-head attention mechanism 424 which allows the Encoder to attend to different parts of the input sequence and capture dependencies between vectors. The attention mechanism computes three matrices: Query (Q), Key (K), and Value (V). The Query, Key, and Value matrices are obtained by linearly projecting the input embeddings using learned weight matrices. The attention scores are computed by taking the dot product of the Query matrix with the transpose of the Key matrix, followed by scaling and applying a softmax function. The attention scores determine the importance of each vector in the input sequence for a given position. The Value matrix is then multiplied with the attention scores to obtain the weighted sum of the values, which forms the output of the attention mechanism. Multi-Head Attention splits the Query, Key, and Value matrices into multiple heads, allowing the model to attend to different aspects of the input simultaneously. The outputs from each head are concatenated and linearly projected to obtain the final output of the Multi-Head Attention layer 424.

In the Latent Transformer LCM system, the number of attention heads used by the Encoder can be adjusted based on the complexity and nature of the relationships within the input data. The attention mechanism allows the Encoder to focus on different aspects of the input and capture dependencies between elements at various positions. When dealing with datasets where the relationships between elements are weaker or more subtle, increasing the number of attention heads can be beneficial. By having more attention heads, the Encoder can learn and capture a wider range of patterns and dependencies within the data. Each attention head can attend to different parts of the input sequence, allowing the model to capture fine-grained relationships and nuances that may be difficult to detect with fewer attention heads. This is particularly useful when working with complex or heterogeneous datasets, where the relationships between elements may not be immediately apparent. By increasing the number of attention heads, the Latent Transformer LCM system can more effectively learn and represent the underlying structure and dependencies in the data, leading to improved performance and generalization. However, it's important to strike a balance, as having an excessive number of attention heads can increase computational complexity and may lead to overfitting. Experimentation and evaluation on specific tasks can help determine the optimal number of attention heads for a given dataset and desired outcome.

After the Multi-Head Attention layer, a residual connection is applied, followed by Layer Normalization at add and norm 423. The residual connection adds the input embeddings to the output of the attention layer, helping the model learn faster and deeper. Layer Normalization normalizes the activations across the features, stabilizing the training process.

The Feed Forward layer 422 is a fully connected neural network applied to each position of the Encoder's hidden states. It consists of two linear transformations with a Rectified Linear Unit (ReLU) activation function in between. The purpose of the Feed Forward layer is to introduce non-linearity and increase the model's capacity to learn complex representations. The output of the Feed Forward layer has the same dimensionality as the input embeddings. A residual connection and Layer Normalization 421 are applied after the Feed Forward layer.

The Encoder layers 420 are stacked Nx times, where N is a hyperparameter that determines the depth of the Encoder. Each layer follows the same structure: Multi-Head Attention, Add & Norm, Feed Forward, and Add & Norm. By stacking multiple Encoder layers, the model can capture hierarchical and long-range dependencies in the input sequence. The output of the final Encoder layer represents the encoded input sequence, which is then passed to the Decoder for generating the output sequence.

The Decoder generates the output probabilities. It has a similar structure to the Encoder, with a few additions. The Decoder takes output embeddings and processes them through a stack of layers (represented as dashed box 450). The latent space vector output layer 430 takes the previous output vectors (shifted right by one position) and processes them through a plurality of layers.

The masked multi-head attention 451 mechanism prevents the model form attending to future vectors. This layer performs self-attention on the Decoder's input sequence. It allows the Decoder to attend to different parts of its own input sequence. The attention is "masked" to prevent the Decoder from attending to future vectors, ensuring that the predictions are based only on the previously generated vectors. Multi-head attention splits the input into multiple heads, allowing the model to attend different aspect of the input simultaneously.

After the masked multi-head attention, a residual connection is applied follows by layer normalization via add and norm 452. The residual connection adds the input to the output of the attention layer, helping the model learn faster and deeper. Layer normalization normalizes the activations across the features, stabilizing the training process.

The multi-head attention 453 layer performs attention between the Decoder's hidden states and the Encoder's output. It allows the Decoder to attend to relevant parts of the input sequence based on the Encoder's representations. The attention weights are computed based on the compatibility between the Decoder's hidden states and Encoder's outputs.

In the Latent Transformer LCM system, the number of attention heads used by the Decoder can be adjusted based on the complexity and nature of the relationships within the input data. The attention mechanism allows the Decoder to focus on different aspects of the input and capture dependencies between elements at various positions. When dealing with datasets where the relationships between elements are weaker or more subtle, increasing the number of attention heads can be beneficial. By having more attention heads, the Decoder can learn and capture a wider range of patterns and dependencies within the data. Each attention head can attend to different parts of the input sequence, allowing the model to capture fine-grained relationships and nuances that may be difficult to detect with fewer attention heads. This is particularly useful when working with complex or heterogeneous datasets, where the relationships between elements may not be immediately apparent. By increasing the number of attention heads, the Latent Transformer LCM system can more effectively learn and represent the underlying structure and dependencies in the data, leading to improved performance and generalization. However, it's important to strike a balance, as having an excessive number of attention heads can increase computational complexity and may lead to overfitting. Experimentation and evaluation on specific tasks can help determine the optimal number of attention heads for a given dataset and desired outcome.

Another add and norm 454 layer is then followed by feed forward network 455. This a fully connected feed-forward network applied to each position of the Decoder's hidden states. It consists of two linear transformations with a Rectified Linear Unit (ReLU) activation in between. The feed forward layer helps the model capture non-linear interactions and increases the model's capacity.

Another add and norm 456 layer is followed by linear 460 and softmax 470 layers. The final hidden states of the Decoder are passed through a linear transformation to project them into the vocabulary space. Vocabulary space refers to the set of all unique codewords or words that the model can generate or predict. In the context of language models, the vocabulary is a predefined set of codewords that the model is trained on and can output. When the Decoder's final hidden states are passed through a linear transformation, they are projected into a vector space with the same dimensionality as the size of the vocabulary. Each dimension in this space corresponds to a specific codeword in the vocabulary.

A softmax function is applied to the projected values (vectors) to generate output probabilities over the vocabulary. The softmax function normalizes the values so that they sum up to 1, representing a probability distribution over the vocabulary. Each probability indicates the likelihood of a specific vector being the next output vector. The vector with the highest probability is selected as the next output vector. During the model's training, the objective is to maximize the probability of the correct next vector given the input sequence and the previously generated vector. The model learns to assign higher probabilities to the vector that are more likely to appear based on the context. At inference time, the vector with the highest probability in the vocabulary space is selected as the next output vector. This process is repeated iteratively, with the generated vector being fed back into the Decoder as input for the next step, until a stopping criterion is met (e.g., reaching a maximum length or generating an end-of-sequence vector). The size and composition of the vocabulary can vary depending on the specific task and the data the model is trained on. It can include words, sub-words, or even characters, depending on the codeword strategy used.

The Decoder layers 450 can be stacked Nx times, allowing the model to capture complex dependencies and generate coherent output sequences.

This transformer architecture allows the model to process input sequences, capture long-range dependencies, and generate output sequence based on the encoded input and the previously generated codewords.

Another type of variation is the auto-regressive model which feature the use of only the decoder portion of the transformer architecture. In autoregressive architectures, the decoder portion of the transformer is retained and the encoder portion is not used after model pre-training. Auto-regressive models are a class of models that generate outputs by predicting the next element based on the previously generated elements. In the context of the Transformer architecture and language modeling, auto-regressive models are commonly used for tasks such as text generation, machine translation, and language understanding.

Auto-regressive models generate outputs sequentially, one element at a time. In the case of language modeling, the model predicts the next word or vector based on the previous words or vector in the sequence. The prediction of the next element is conditioned on the previously generated elements. The model learns the conditional probability distribution $P(x\_t|x\_1, x\_2, \ldots, x\_\{t-1\})$, where $x\_t$ is the element at position t, and $x\_1, x\_2, \ldots, x\_\{t-1\}$ are the previously generated elements. The Transformer architecture, particularly the Decoder component, is well-suited for auto-regressive modeling. The Decoder generates the output sequence one element at a time, conditioned on the previously generated elements and the encoded input sequence from the Encoder. In the Transformer Decoder, the self-attention mechanism is masked to prevent the model from attending to future positions during training. This masking ensures that the model relies only on the previously generated elements to make predictions, following the auto-regressive property. During training, the Transformer Decoder uses a technique called teacher forcing. Instead of feeding the model's own predictions as input for the next step, the ground truth target sequence is used. This helps the model learn to generate the correct output sequence based on the input sequence and the previous target vectors. During inference or generation, the Transformer Decoder generates the output sequence one element at a time. At each step, the model takes the previously generated elements as input and predicts the next element. This process continues until a stopping criterion is met, such as reaching a maximum sequence length or generating an end-of-sequence vector. Auto-regressive models, including the Transformer, have achieved state-of-the-art performance in language modeling tasks. They excel at capturing the statistical properties and dependencies in sequential data, making them effective for generating coherent and fluent text.

While text generation is the most suitable use case of auto-regressors, they perform exceptionally well on a wide variety of tasks. Most modern LLMs are auto-regressors including, for example, the popular GPT series of LLMs, BERT, and XLNet.

The third variation of the transformer model is the sequence-to-sequence model which utilizes both the encoder and decoder portions of the transformer and can be trained in multiple ways. One of the methods is span corruption and reconstruction. These models are, generally, best suited for language translation. The T5 and BART family of models are examples of sequence-to-sequence models.

Figure 5:
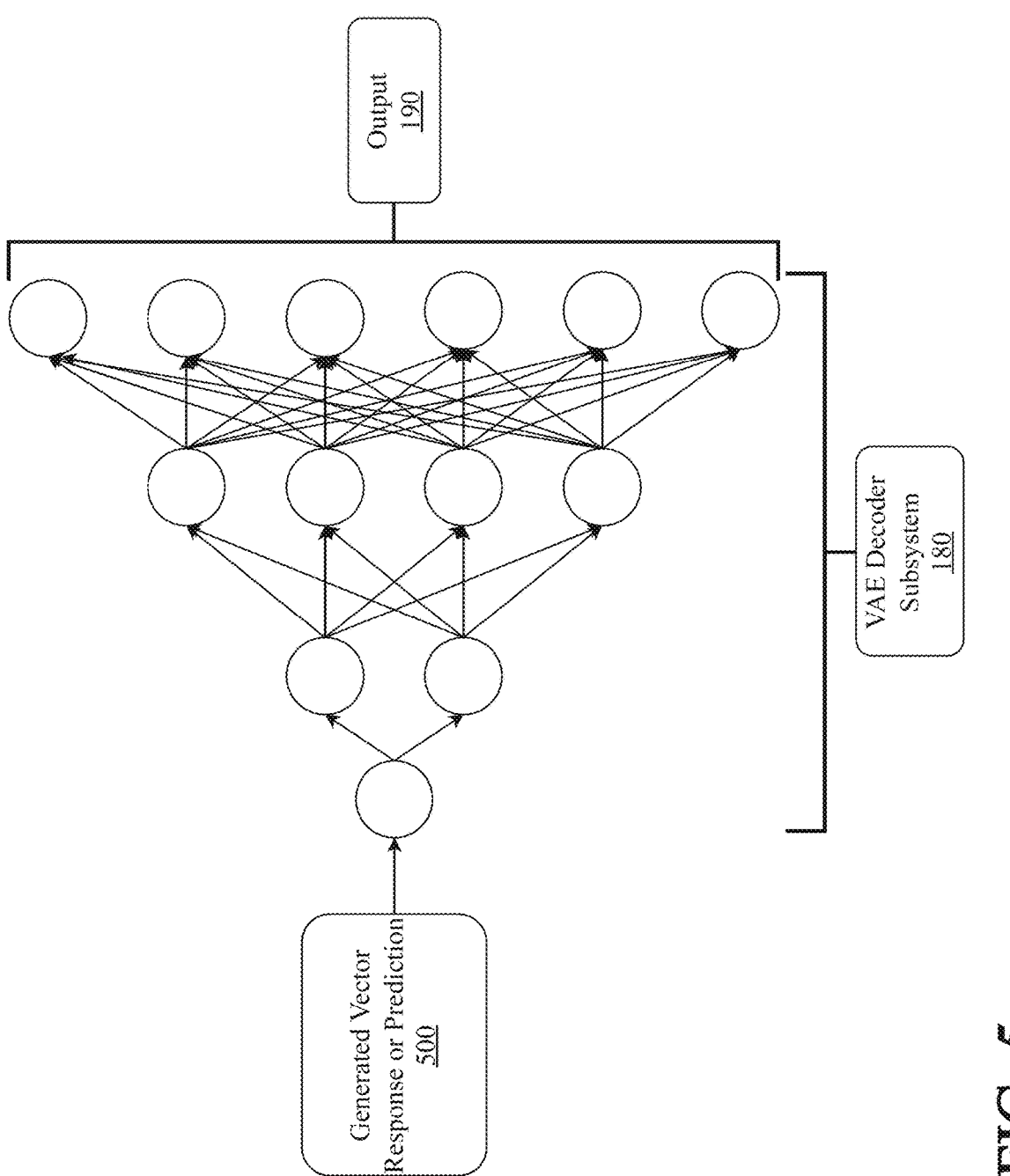
FIG. 5 is a block diagram illustrating a component of the system for a Latent Transformer core for a Large Codeword Model, a Variational Autoencoder Decoder Subsystem.

FIG. 5 is a block diagram illustrating a component of the system for a Latent Transformer core for a Large Codeword Model, a Variational Autoencoder Decoder Subsystem. The VAE Decoder Subsystem 180 is a component of the Latent Transformer LCM system, responsible for reconstructing or generating output data from the latent space vector representations. It works in conjunction with the Latent Transformer Subsystem 170 to provide meaningful and coherent outputs based on the learned relationships and patterns in the latent space. The input to the VAE Decoder Subsystem 180 is a Generated Vector Response or Prediction 500, which is produced by the Latent Transformer Subsystem 170. The Latent Transformer learns to model the dependencies and relationships between the latent space vectors generated by the VAE Encoder Subsystem 150. It processes the latent space vectors using self-attention mechanisms and captures the relevant information and context for generating the output.

The Generated Vector Response or Prediction 500 is a lower-dimensional representation that encodes the necessary information for reconstructing or generating the desired output. It contains the learned patterns, relationships, and variations that the Latent Transformer has captured from the input data. The VAE Decoder Subsystem 180 takes this generated vector as input and maps it back to the original data space, producing the final output 190. The decoder architecture typically comprises multiple layers of neural networks, such as fully connected layers or deconvolutional layers, depending on the nature of the output data.

The decoder starts by applying a linear transformation to the generated vector, projecting it into a higher-dimensional space. This transformation helps to expand the compressed representation and prepare it for the subsequent decoding steps. The output of this layer is then passed through a non-linear activation function, such as the rectified linear unit (ReLU), to introduce non-linearity and increase the expressiveness of the decoder. As the generated vector progresses through the subsequent layers of the decoder, the dimensionality of the representation is gradually increased. Each layer applies a linear transformation followed by a non-linear activation function, allowing the decoder to reconstruct the fine-grained details and structure of the output data. In the case of sequence-to-sequence tasks, such as time series prediction or language translation, the VAE Decoder Subsystem 180 may incorporate recurrent neural networks (RNNs) or attention mechanisms to generate the output sequence step by step. The decoder can attend to different parts of the generated vector and the previously generated outputs to produce coherent and contextually relevant results.

During the training process, the VAE Decoder Subsystem 180 learns to minimize the reconstruction loss between the generated output and the target output. It aims to produce outputs that closely match the desired or expected results based on the learned latent space representations. The Decoder Training System 181 is responsible for updating the decoder's parameters using techniques like gradient descent and backpropagation, optimizing the decoder's ability to generate accurate and meaningful outputs. Once the VAE Decoder Subsystem 180 is trained, it can map the Generated Vector Response or Prediction 500 back to the original data space, producing the final output 190. The output can be in various forms, such as reconstructed input data, predicted future sequences, or generated samples, depending on the specific task and application. The flexibility of the VAE Decoder Subsystem 180 allows it to handle various types of output data, such as time series, images, or text. By adapting the decoder architecture and training process to the specific requirements of the task, the Latent Transformer LCM system can generate high-quality outputs that capture the essential characteristics and variations of the target data.

Figure 6:
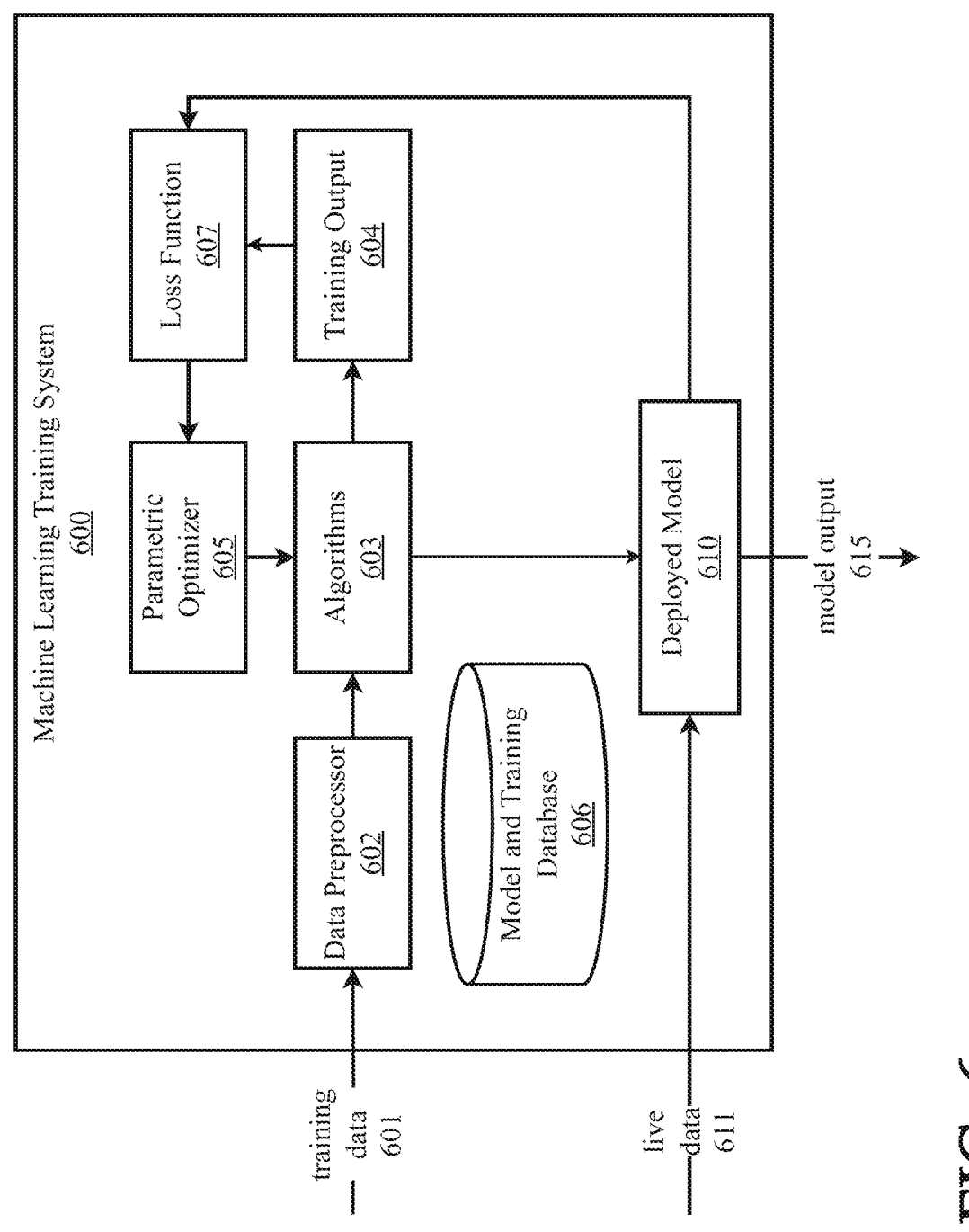
FIG. 6 is a block diagram illustrating a component of the system for a Latent Transformer core for a Large Codeword Model, a machine learning training system.

FIG. 6 is a block diagram illustrating an aspect of system and method for a Latent Transformer core for a Large Codeword Model, a machine learning training system. According to the embodiment, the machine learning training system 600 may comprise a model training stage comprising a data preprocessor 602, one or more machine and/or deep learning algorithms 603, training output 604, and a parametric optimizer 605, and a model deployment stage comprising a deployed and fully trained model 610 configured to perform tasks described herein such as processing codewords through a large codeword model. The machine learning training system 600 may be used to train and deploy a plurality of machine learning architectures in order to support the services provided by the large codeword model for deep learning. In one embodiment, machine learning training system 600 may be used to train the VAE Encoder Subsystem 150, the Latent Transformer Subsystem 170, and the VAE Decoder Subsystem 180. The machine learning training system 600 may train each of the proceeding systems separately or together as a single system.

At the model training stage, a plurality of training data 601 may be received by the generative AI training system 650. Data preprocessor 602 may receive the input data (e.g., codeword vector inputs, latent space vector representations) and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 602 may also be configured to create training dataset, a validation dataset, and a test set from the plurality of input data 601. For example, a training dataset may comprise 80% of the preprocessed input data, the validation set 10%, and the test dataset may comprise the remaining 10% of the data. The preprocessed training dataset may be fed as input into one or more machine and/or deep learning algorithms 603 to train a predictive model for object monitoring and detection.

During model training, training output 604 is produced and used to measure the accuracy and usefulness of the predictive outputs. During this process a parametric optimizer 605 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tanh, etc.), the choice of cost or loss function the model will use, number of hidden layers in a neural network, number of activation unites in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

In some implementations, various accuracy metrics may be used by the machine learning training system 600 to evaluate a model's performance. Metrics can include, but are not limited to, word error rate (WER), word information loss, speaker identification accuracy (e.g., single stream with multiple speakers), inverse text normalization and normalization error rate, punctuation accuracy, timestamp accuracy, latency, resource consumption, custom vocabulary, sentence-level sentiment analysis, multiple languages supported, cost-to-performance tradeoff, and personal identifying information/payment card industry redaction, to name a few. In one embodiment, the system may utilize a loss function 607 to measure the system's performance. The loss function 607 compares the training outputs with an expected output and determined how the algorithm needs to be changed in order to improve the quality of the model output. During the training stage, all outputs may be passed through the loss function 607 on a continuous loop until the algorithms 603 are in a position where they can effectively be incorporated into a deployed model 615.

The test dataset can be used to test the accuracy of the model outputs. If the training model is establishing correlations that satisfy a certain criterion such as but not limited to quality of the correlations and amount of restored lost data, then it can be moved to the model deployment stage as a fully trained and deployed model 610 in a production environment making predictions based on live input data 611 (e.g., codeword vector inputs, latent space vector representations). Further, model correlations and restorations made by deployed model can be used as feedback and applied to model training in the training stage, wherein the model is continuously learning over time using both training data and live data and predictions. A model and training database 606 is present and configured to store training/test datasets and developed models. Database 606 may also store previous versions of models.

According to some embodiments, the one or more machine and/or deep learning models may comprise any suitable algorithm known to those with skill in the art including, but not limited to: LLMs, generative transformers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 603 may comprise a deep learning algorithm such as neural networks (e.g., recurrent, convolutional, long short-term memory networks, etc.).

In some implementations, the machine learning training system 600 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in database(s) 606.

FIG. 7 is a flow diagram illustrating an exemplary method for a Latent Transformer core for a Large Codeword Model. In a first step 700, collect a plurality of inputs. These inputs can include structured or unstructured data, such as time series, text, images, or any other relevant data types. The data collection process involves gathering a substantial amount of information to ensure a representative and comprehensive dataset for training and inference purposes.

In a step 710, convert the plurality of inputs into a plurality of sourceblocks. Once the inputs are collected, they are converted into a plurality of sourceblocks. Sourceblocks are discrete units of information that capture the essential characteristics and patterns within the input data. The conversion process may involve techniques such as segmentation, tokenization, or feature extraction, depending on the nature of the input data. For example, in the case of text data, the inputs can be converted into sourceblocks by breaking them down into individual words, subwords, or phrases. For time series data, sourceblocks can be created by dividing the input into fixed-length windows or using techniques like sliding windows or overlapping segments.

In a step 720, assign codewords to each sourceblock based on a dictionary generated by a codebook generation subsystem. After converting the inputs into sourceblocks, each sourceblock is assigned a unique codeword based on a dictionary generated by a codebook generation subsystem. The codebook is a component of the Latent Transformer LCM system that maps the sourceblocks to their corresponding codewords. The codebook generation subsystem employs techniques such as clustering, vector quantization, or learned embedding spaces to create a compact and efficient representation of the sourceblocks. Each codeword serves as a discrete and compressed representation of the associated sourceblock, capturing its essential information and characteristics.

In a step 730, process the plurality of codewords through a variational autoencoder encoder system to create a plurality of latent space vectors. Once the codewords are assigned, they are processed through a variational autoencoder (VAE) encoder system. The VAE encoder takes the codewords as input and maps them into a lower-dimensional latent space representation. The encoder consists of multiple layers of neural networks that learn to compress the codewords into compact and informative latent space vectors. The latent space vectors capture the underlying structure, patterns, and variations present in the input data, while reducing the dimensionality and noise. The VAE encoder learns to generate a probabilistic distribution over the latent space, allowing for the sampling of new latent vectors during the generation process.

In a step 740, process the plurality of latent space vectors through a latent transformer, which leverages learned relationships between latent space vectors to generate a plurality of responses or predictions. The latent space vectors generated by the VAE encoder are then processed through a latent transformer. The latent transformer is a specialized neural network architecture that learns the relationships and dependencies between the latent space vectors. It employs self-attention mechanisms to capture the contextual information and long-range dependencies within the latent space. The latent transformer leverages these learned relationships to generate a plurality of responses or predictions based on the input latent vectors. It can perform tasks such as sequence-to-sequence prediction, data generation, or anomaly detection, depending on the specific application and training objectives.

In a step 750, decode the plurality of responses or predictions through a variational autoencoder decode subsystem. The generated responses or predictions from the latent transformer are in the form of latent space vectors. To obtain the final output, these latent vectors are passed through a variational autoencoder (VAE) decode subsystem. The VAE decoder takes the latent vectors as input and maps them back to the original data space. It consists of multiple layers of neural networks that learn to reconstruct the sourceblocks or generate new data based on the latent representations. The decoder aims to produce outputs that closely resemble the desired or expected results, utilizing the information captured in the latent space.

In a step 760, output the decoded plurality of responses or predictions. The decoded responses or predictions are outputted as the final result of the Latent Transformer LCM system. These outputs can take various forms, such as reconstructed input data, predicted future sequences, or generated samples, depending on the specific task and application. The outputted responses or predictions leverage the learned relationships and patterns captured by the latent transformer and the VAE decoder, providing meaningful and coherent results.

Throughout the method, the Latent Transformer LCM system learns to compress the input data into a compact latent space representation, capture the underlying relationships and dependencies, and generate accurate and contextually relevant responses or predictions. The combination of the VAE encoder, latent transformer, and VAE decoder enables the system to handle a wide range of data types and perform various tasks, such as data compression, anomaly detection, sequence prediction, and data generation. The training process involves optimizing the parameters of the VAE encoder, latent transformer, and VAE decoder using techniques such as gradient descent and backpropagation. The system learns to minimize the reconstruction loss between the input data and the decoded outputs, while also capturing the relevant patterns and relationships in the latent space.

Detailed Description of Exemplary Aspects

Figure 8:
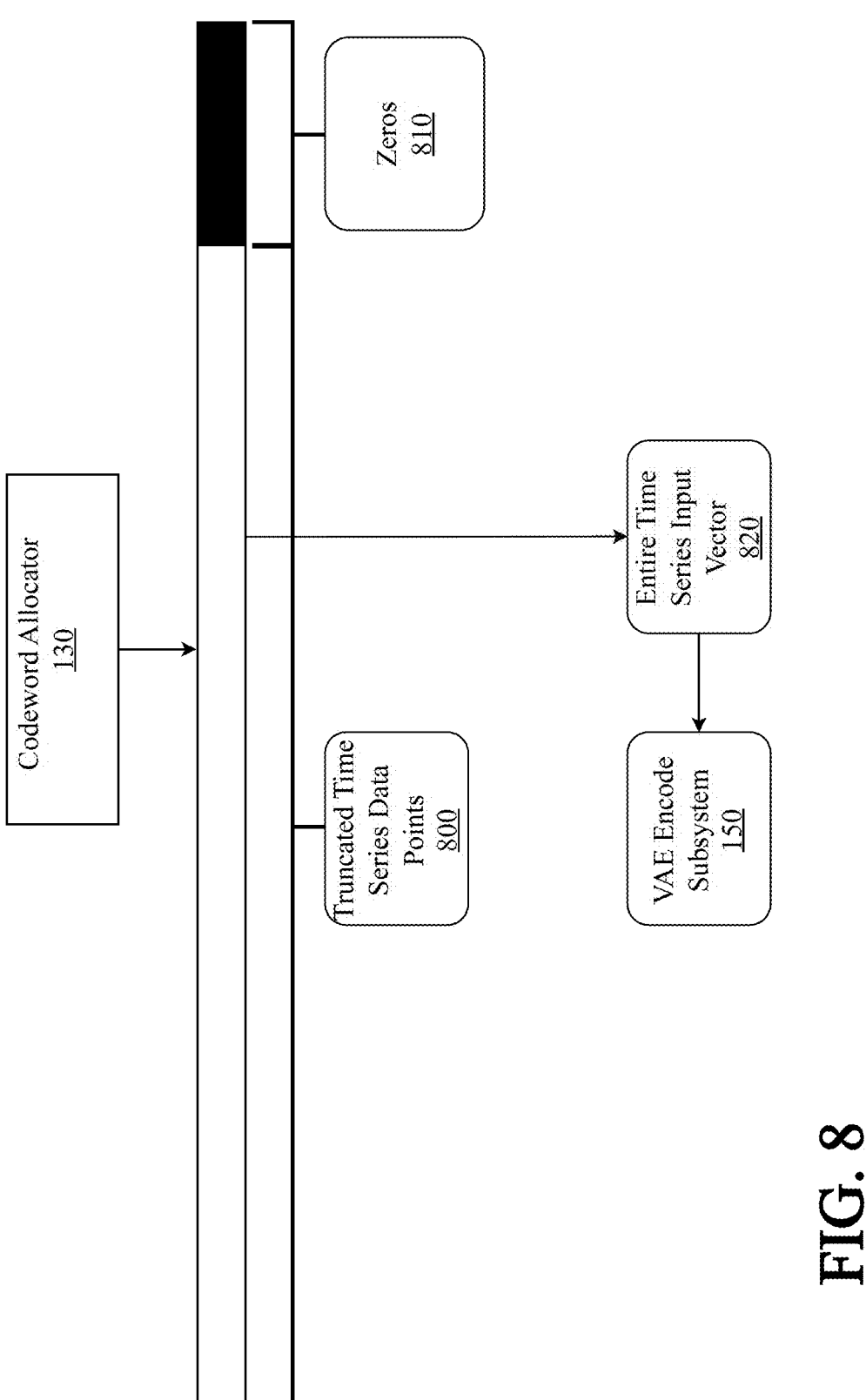
FIG. 8 is a block diagram illustrating an exemplary embodiment of a codeword allocator where the allocator appends zeros onto a vector of truncated data points.

FIG. 8 is a block diagram illustrating an exemplary embodiment of a codeword allocator where the allocator appends zeros onto a vector of truncated data points. In one embodiment of the Latent Transformer LCM system, the Codeword Allocator 113 processes time series data and prepares it for input into the Variational Autoencoder (VAE) Encoder Subsystem 150. This specific embodiment focuses on handling time series data and leveraging the system's capabilities for time series prediction and forecasting. The codeword allocator 113 receives a plurality of time series data points 800 as input. These data points represent a sequence of observations or measurements recorded over time. The time series data can be from various domains, such as financial markets, sensor readings, weather patterns, or any other field where temporal data is collected.

To prepare the time series data for processing by the VAE Encode Subsystem 150, the codeword allocator 113 performs a specific data arrangement. It creates a time series input vector 820 by combining a portion of the original time series data points with a set of truncated data points and a sequence of zeros. Let's consider an example where the time series input vector 820 consists of 1000 elements. In this case, the codeword allocator 113 takes the original time series data and selects the most recent 950 data points. These 950 data points form the truncated time series data points 800 and represent the known or observed values up to a certain point in time.

The codeword allocator 113 then appends a sequence of 50 zeros 810 to the truncated time series data points 800. These zeros serve as placeholders for the future or unknown values that the system aims to predict. By combining the truncated data points and the zeros, the codeword allocator 113 creates the entire time series input vector 820 with a total of 1000 elements. The time series input vector 820 is then fed into the VAE Encode Subsystem 150. The VAE Encode Subsystem 150 takes the input vector and maps it into a lower-dimensional latent space representation. It learns to compress the time series data into a compact and informative latent space vector while capturing the underlying patterns, trends, and dependencies present in the data.

The latent space vector generated by the VAE Encode Subsystem 150 is subsequently processed by the Latent Transformer Subsystem 170. The Latent Transformer leverages its self-attention mechanisms and learned relationships between latent space vectors to make predictions or generate responses based on the input data. In the context of time series prediction, the Latent Transformer focuses on predicting the values corresponding to the 50 zeros appended to the time series input vector. By analyzing the patterns and dependencies in the truncated time series data points, the Latent Transformer generates a prediction or forecast for the future values.

The predicted values are then passed through the VAE Decode Subsystem 180, which maps the latent space predictions back to the original data space. The VAE Decode Subsystem reconstructs the complete time series, including the predicted values for the 50 zeros. The reconstructed time series, along with the predicted future values, is outputted as the final result. This output provides valuable insights and forecasts for the time series data, enabling users to make informed decisions and take appropriate actions based on the predicted future trends.

The specific number of truncated data points and zeros in the time series input vector can be adjusted based on the specific requirements and characteristics of the time series data. The choice of these values depends on factors such as the desired forecast horizon, the temporal resolution of the data, and the available historical data.

By leveraging the Codeword Allocator 113 to create the time series input vector and combining it with the power of the VAE Encode Subsystem 150 and the Latent Transformer Subsystem 170, the Latent Transformer LCM system enables effective time series prediction and forecasting. It learns to capture the complex patterns, trends, and dependencies in the time series data and generates accurate predictions for future values, providing valuable insights and supporting decision-making processes.

Figure 9:
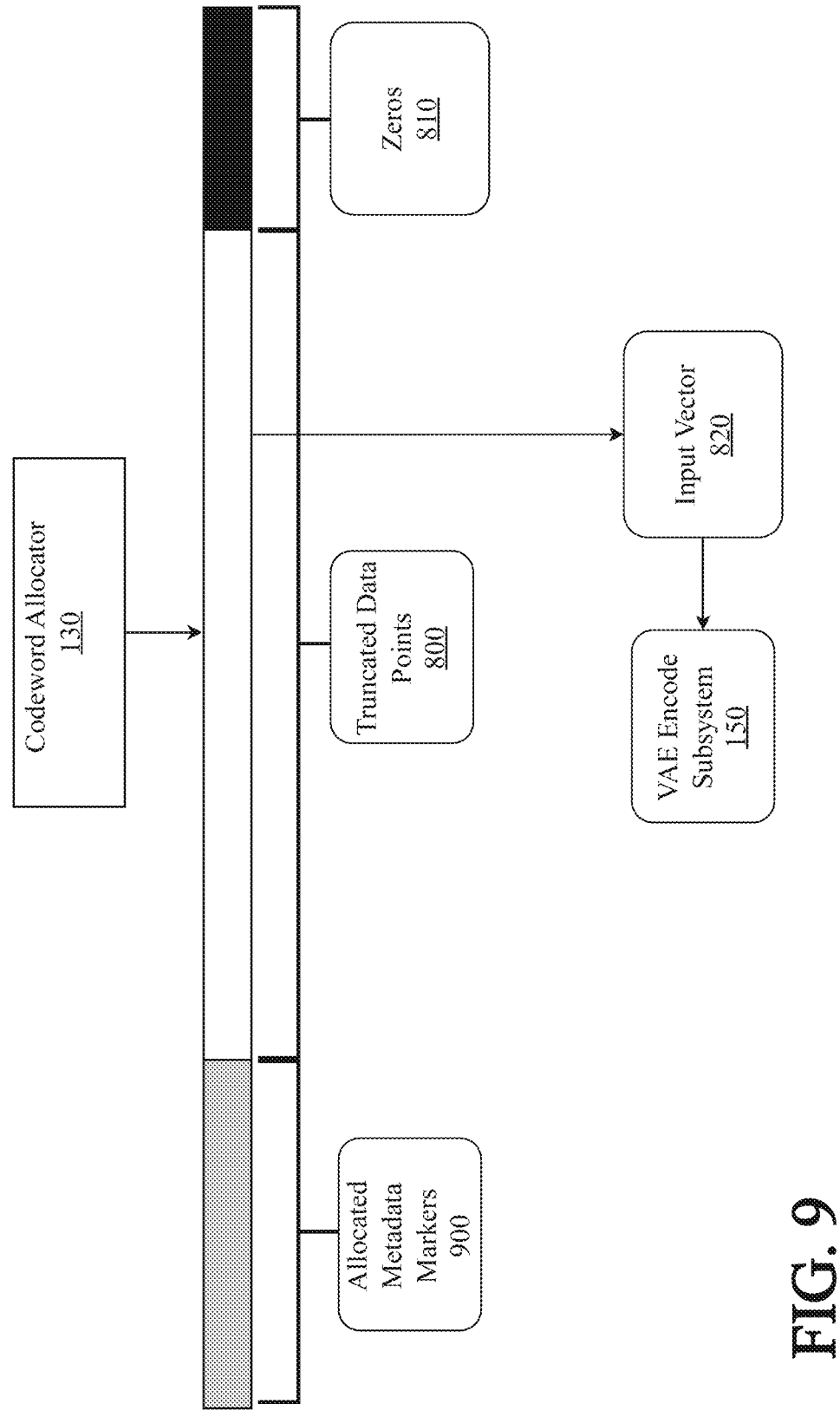
FIG. 9 is a block diagram illustrating an exemplary embodiment of a codeword allocator where the allocator appends metadata to the incoming data stream.

FIG. 9 is a block diagram illustrating an exemplary embodiment of a codeword allocator where the allocator appends metadata to the incoming data stream. In another embodiment of the Latent Transformer LCM system, the codeword allocator 113 takes on an expanded role in processing and preparing data for input into the Variational Autoencoder (VAE) Encode Subsystem 150. Beyond arranging data points, the codeword allocator 113 incorporates metadata information to provide additional context and enable more robust learning by the Latent Transformer.

The codeword allocator 130 receives a plurality of data points 800 as input, which can represent various types of information such as time series data, text, images, or any other structured or unstructured data. It processes the input data and creates an input vector 820 that combines a portion of the original data points with truncated data points and a sequence of zeros.

In the embodiment, the codeword allocator 113 has the ability to append metadata markers 900 to the input vector 820. These metadata markers provide valuable information about the data being processed, allowing the Latent Transformer to learn more comprehensive and context-aware relationships between the latent space vectors.

The metadata markers 900 can include a wide range of information, such as data type, temporal information, data source, data characteristics, and domain-specific metadata. For instance, the metadata markers can specify whether the input data is time series, text, images, or any other relevant data type. In the case of time series data, the metadata markers can include timestamps or temporal indicators associated with each data point, enabling the Latent Transformer to capture sequential dependencies and temporal patterns more effectively.

Additionally, the metadata markers can indicate the source or origin of the data, such as the specific sensor, device, or database from which the data was collected, allowing the Latent Transformer to learn source-specific patterns and characteristics. Furthermore, the metadata markers can provide information about the statistical properties or characteristics of the data, such as the mean, variance, or distribution type, assisting the Latent Transformer in understanding the underlying data distribution and making more informed predictions.

The codeword allocator 113 appends these metadata markers 900 to the input vector 820 alongside the truncated data points 800 and zeros 810, resulting in a rich combination of data points, truncated values, zeros, and metadata information. This input vector 820 is then fed into the VAE Encode Subsystem 150, which maps it into a lower-dimensional latent space representation, capturing the underlying patterns, dependencies, and metadata information in the latent space vector.

The Latent Transformer Subsystem 170 then processes the latent space vector, leveraging its self-attention mechanisms and learned relationships to make predictions or generate responses based on the input data. By incorporating metadata markers 900 into the input vector 820, the Latent Transformer can learn more robust and context-aware relationships between the latent space vectors. The metadata information provides additional guidance and context to the Latent Transformer, enabling it to capture complex patterns, dependencies, and domain-specific characteristics more effectively. For example, in a financial forecasting task, the metadata markers may include information about the company, industry, or economic indicators, allowing the Latent Transformer to incorporate this contextual information into its predictions. Similarly, in a text generation task, the metadata markers may include information about the genre, topic, or sentiment of the text, enabling the Latent Transformer to generate more coherent and contextually relevant responses.

The inclusion of metadata markers 900 enhances the expressiveness and adaptability of the Latent Transformer LCM system, allowing it to process and learn from a wide range of data types and incorporate relevant metadata information to improve the accuracy and contextual understanding of the generated predictions or responses. The specific types and formats of the metadata markers 900 can be tailored to the requirements and characteristics of the data being processed, with the codeword allocator 113 designed to extract and append the most relevant and informative metadata based on domain knowledge and the specific task at hand.

By leveraging the power of metadata markers 900 in conjunction with data points, truncated values, and zeros, the Latent Transformer LCM system can learn more comprehensive and robust relationships between the latent space vectors, enabling it to generate more accurate and context-aware predictions or responses across a wide range of applications, including time series forecasting, text generation, image synthesis, and more.

FIG. 10 is a flow diagram illustrating an exemplary method for the truncation of vectors for time series prediction. In a first step 1000, collect a plurality of inputs. These inputs can represent various types of data, such as time series data, text, images, or any other structured or unstructured data. The data collection process ensures that a sufficient amount of relevant and representative data is gathered for the subsequent steps.

In a step 1010, the collected inputs are converted into a plurality of sourceblocks. Sourceblocks are discrete units of information that capture the essential characteristics and patterns within the input data. The conversion process may involve techniques such as segmentation, tokenization, or feature extraction, depending on the nature of the input data. For example, in the case of text data, the inputs can be converted into sourceblocks by breaking them down into individual words, subwords, or phrases. For time series data, sourceblocks can be created by dividing the input into fixed-length windows or using techniques like sliding windows or overlapping segments.

In a step 1020, assign codewords to each sourceblock based on a dictionary generated by a codebook generation subsystem. The codebook is a component of the Latent Transformer LCM system that maps the sourceblocks to their corresponding codewords. The codebook generation subsystem employs techniques such as clustering, vector quantization, or learned embedding spaces to create a compact and efficient representation of the sourceblocks. Each codeword serves as a discrete and compressed representation of the associated sourceblock, capturing its essential information and characteristics.

In a step 1030, an input vector is created using the assigned codewords. This step is particularly relevant for tasks involving prediction or forecasting, such as time series prediction. The input vector includes a truncated data set, which represents the known or observed values up to a certain point in time. The truncated data set may be followed by a sequence of zeros, which serve as placeholders for the future or unknown values that the system aims to predict. The combination of the truncated data set and the zeros forms the complete input vector.

In a step 1040, process the input vector through a VAE encoder subsystem to generate a latent space vector representation of the input vector. The VAE encoder subsystem is a component of the Latent Transformer LCM system, responsible for mapping the input vector into a lower-dimensional latent space. The VAE encoder learns to compress the input data while capturing the underlying patterns, dependencies, and essential features in the latent space vector. By encoding the input vector into a compact latent representation, the VAE encoder enables efficient processing and learning by the subsequent components of the system.

In a step 1050, a transformer is used to learn relationships between the latent space vector representations. The transformer architecture, with its self-attention mechanism, is well-suited for capturing long-range dependencies and complex interactions within the data. By learning the relationships between the latent space vectors, the transformer can uncover patterns, correlations, and dependencies that may not be apparent in the original input space. These learned relationships can be leveraged to determine the values of the zero portion in the next input vector, enabling the system to make predictions or generate future values based on the truncated data set.

The transformer learns to attend to relevant information from the latent space vectors and propagate that information through its layers to generate meaningful predictions. By iteratively processing the input vectors and learning from the relationships between the latent space representations, the transformer can capture the underlying dynamics and patterns in the data, enabling accurate predictions of the unknown values.

The combination of codeword assignment, VAE encoding, and transformer learning enables the Latent Transformer LCM system to effectively process and predict data across various domains. The method leverages the power of compressed representations, latent space learning, and self-attention to uncover complex patterns and generate accurate predictions.

FIG. 11 is a flow diagram illustrating an exemplary method appending metadata to the incoming data stream using a codeword allocator. In a step 1100, collect a plurality of inputs. These inputs can represent various types of data, such as time series data, text, images, or any other structured or unstructured data. The data collection process ensures that a diverse and representative set of inputs is gathered for the subsequent steps.

In a step 1110, the collected inputs are converted into a plurality of sourceblocks. Sourceblocks are discrete units of information that capture the essential characteristics and patterns within the input data. The conversion process may involve techniques such as segmentation, tokenization, or feature extraction, depending on the nature of the input data. For example, in the case of text data, the inputs can be converted into sourceblocks by breaking them down into individual words, subwords, or phrases. For time series data, sourceblocks can be created by dividing the input into fixed-length windows or using techniques like sliding windows or overlapping segments.

In a step 1120, assign codewords to each sourceblock based on a dictionary generated by a codebook generation subsystem. The codebook is a component of the Latent Transformer LCM system, as it maps the sourceblocks to their corresponding codewords. The codebook generation subsystem employs techniques such as clustering, vector quantization, or learned embedding spaces to create a compact and efficient representation of the sourceblocks. Each codeword serves as a discrete and compressed representation of the associated sourceblock, capturing its essential information and characteristics.

In a step 1130, an input vector is created using the assigned codewords, along with additional components. The input vector includes a truncated data set, which represents the known or observed values up to a certain point in time. The truncated data set is followed by a sequence of zeros, which serve as placeholders for the future or unknown values that the system aims to predict. In addition to the truncated data set and zeros, the input vector also includes a metadata portion. The metadata portion contains relevant information about the input data, such as the data type, timestamp, source, or any other contextual details that can aid in the learning and prediction process.

In a step 1140, process the input vector through a VAE encoder subsystem to generate a latent space vector representation of the input vector. The VAE encoder subsystem is a critical component of the Latent Transformer LCM system, responsible for mapping the input vector into a lower-dimensional latent space. The VAE encoder learns to compress the input data while capturing the underlying patterns, dependencies, and essential features in the latent space vector. By encoding the input vector into a compact latent representation, the VAE encoder enables efficient processing and learning by the subsequent components of the system.

In a step 1150, a transformer is used to learn relationships between the latent space vector representations. The transformer architecture, with its self-attention mechanism, is well-suited for capturing long-range dependencies and complex interactions within the data. By learning the relationships between the latent space vectors, the transformer can uncover patterns, correlations, and dependencies that may not be apparent in the original input space. These learned relationships can be leveraged to determine the values of the zero portion in the next input vector, enabling the system to make predictions or generate future values based on the truncated data set.

In a step 1160, relationships established by the transformer are based on the metadata portion of each input vector. The metadata portion corresponds to the data type of the plurality of inputs, providing contextual information about the nature and characteristics of the data. By considering the metadata during the learning process, the transformer can establish more meaningful and targeted relationships between the latent space vectors. For example, if the metadata indicates that the input data is time series, the transformer can focus on capturing temporal dependencies and patterns specific to time series data. Similarly, if the metadata represents different categories or classes of data, the transformer can learn class-specific relationships and distinguish between different data types.

The incorporation of metadata in the learning process enhances the ability of the Latent Transformer LCM system to capture and leverage domain-specific knowledge and characteristics. By establishing relationships based on the metadata, the transformer can generate more accurate and context-aware predictions or outputs. The metadata acts as an additional guide, helping the transformer to focus on the most relevant aspects of the data and improve the quality of the learned representations.

Figure 12:
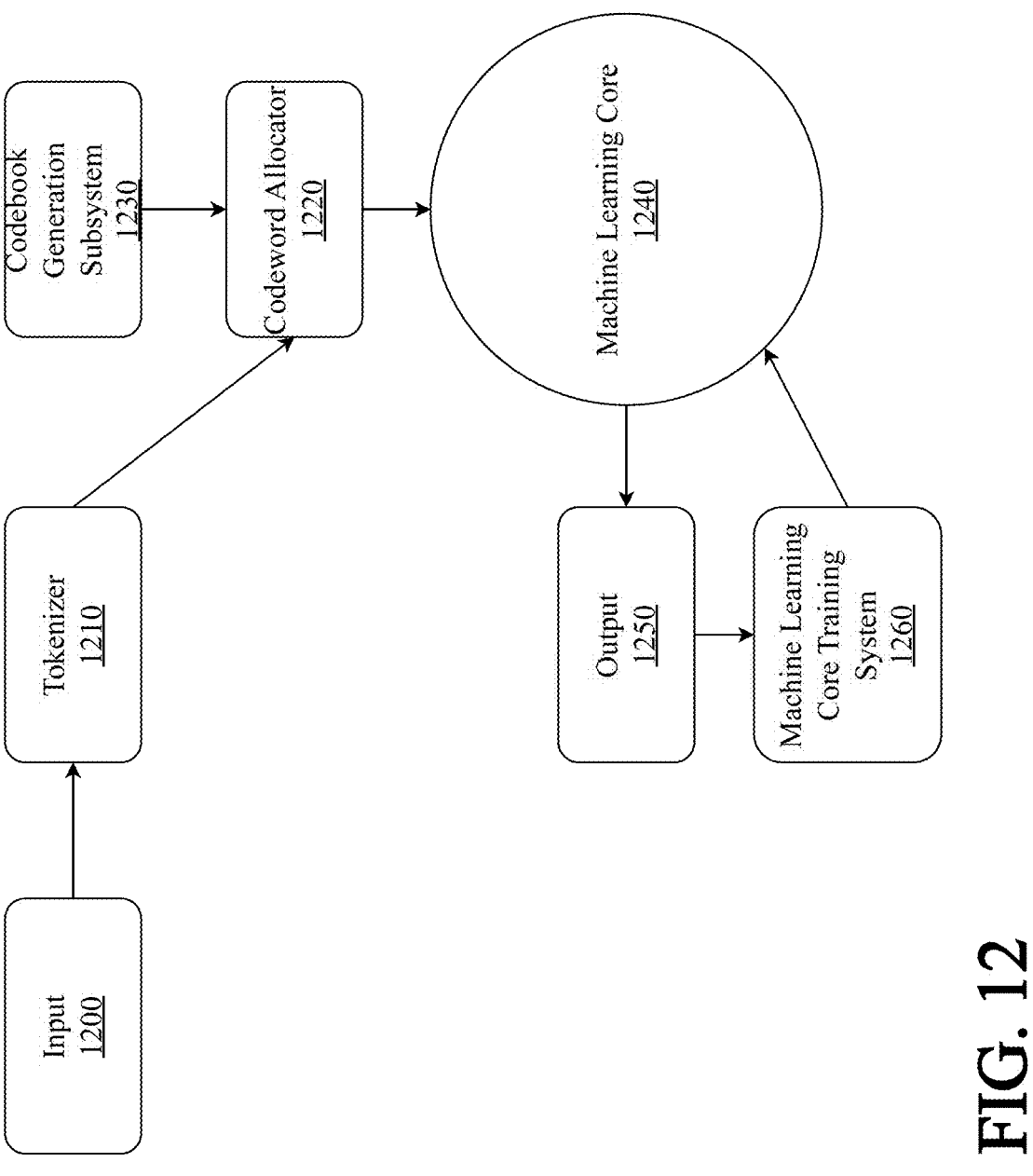
FIG. 12 is a block diagram illustrating an exemplary system architecture for a large codeword model for deep learning.

FIG. 12 is a block diagram illustrating an exemplary system architecture for a large codeword model for deep learning. An input 1200 represents the raw data that needs to be processed by the LCM. This data can be in various modalities, such as text, images, audio, time series, or any other structured or unstructured format. The input data is fed into the tokenizer 110 for further processing.

A tokenizer 1210 is responsible for splitting the input data into meaningful semantic units called sourceblocks. This process, known as semantic splitting, aims to capture the inherent structure and patterns in the data. The tokenizer can employ various techniques to identify the optimal source-blocks, such as rule-based splitting, statistical methods, or machine learning approaches. For textual data, the tokenizer may use subword tokenization methods like Byte-Pair Encoding (BPE) or WordPiece, which break down words into smaller, more frequently occurring units. For images, the tokenizer may use approaches such as but not limited to a patch-approach, where the image is divided into fixed-size patches or regions. The specific tokenization method can be chosen based on the data modality and the characteristics of the domain. For example, the first paragraph of Leo Tolstoy's War and Peace which reads, "Well, Prince, so Genoa and Lucca are now just family estates of the Buonapartes," may be tokenized into ['Well', ',', 'Prince', ',', 'so', 'Gen', 'oa', 'and', 'Luc', 'ca', 'are', 'now', 'just', 'family', 'estates', 'of', 'the', 'Buon', 'apar', 'tes', '.'].

In one embodiment, the tokenizer may utilize Huffman coding to split the data into sourceblocks. The Huffman coding-based tokenizer enables efficient and semantically meaningful splitting of the input data into sourceblocks. Huffman coding is a well-known data compression algorithm that assigns variable-length codes to symbols based on their frequency of occurrence. In the context of the LCM, the Huffman coding-based tokenizer adapts this principle to perform semantic splitting of the input data.

With Huffman coding, the tokenizer starts by analyzing the input data and identifying the basic units of meaning, such as words, phrases, or subwords, depending on the specific data modality and the desired level of granularity. These basic units form the initial set of sourceblocks. The tokenizer then performs a frequency analysis of the source-blocks, counting the occurrences of each sourceblock in the input data. Based on the frequency analysis, the tokenizer constructs a Huffman tree, which is a binary tree that represents the probability distribution of the sourceblocks. The Huffman tree is built by iteratively combining the two least frequent sourceblocks into a single node, assigning binary codes to the branches, and repeating the process until all sourceblocks are included in the tree. The resulting Huffman tree has the property that sourceblocks with higher frequencies are assigned shorter codes, while sourceblocks with lower frequencies are assigned longer codes.

The Huffman coding-based tokenizer then uses the constructed Huffman tree to perform semantic splitting of the input data. It traverses the input data and matches the sequences of symbols against the sourceblocks represented in the Huffman tree. When a sourceblock is identified, the tokenizer assigns the corresponding Huffman code to that sourceblock, effectively compressing the data while preserving its semantic structure. The use of Huffman coding for semantic splitting offers several advantages. It allows for variable-length sourceblocks, enabling the tokenizer to capture meaningful units of varying sizes. This is particularly useful for handling data with different levels of complexity and granularity, such as text with compound words or images with hierarchical structures.

A Huffman coding-based approach optimizes the representation of the sourceblocks based on their frequency of occurrence. By assigning shorter codes to more frequent sourceblocks and longer codes to less frequent ones, the tokenizer achieves data compression while still preserving the semantic information. This compression reduces the overall size of the data and improves the efficiency of subsequent processing stages. Additionally, the Huffman tree construction process inherently captures the statistical properties and patterns within the input data. The resulting sourceblocks and their assigned codes reflect the underlying structure and relationships present in the data. This semantic awareness enhances the ability of the LCM to learn and generate meaningful representations.

After the semantic splitting process, the resulting source-blocks and their assigned Huffman codes are passed to the codeword allocator. The codeword allocator maps each sourceblock to a unique codeword, which is a compact representation used by the subsequent components of the LCM architecture. The codeword mapping can be based on various schemes, such as a fixed-length binary encoding or a learned embedding space.

Once the input data is tokenized into sourceblocks, the codeword allocator 120 assigns a unique codeword to each sourceblock. The codewords are discrete, compressed representations of the sourceblocks, designed to capture the essential information in a compact form. The codeword allocator can use various mapping schemes to assign codewords to sourceblocks, such as hash functions, lookup tables, or learned mappings. For example, a simple approach could be to use a hash function that maps each sourceblock to a fixed-length binary code. Alternatively, another approach may involve learning a mapping function that assigns codewords based on the semantic similarity of the sourceblocks.

The codebook generation subsystem 130 is responsible for creating and maintaining the codebook, which is a collection of all the unique codewords used by the LCM. The codebook can be generated offline, before the actual processing begins, or it can be updated dynamically as new sourceblocks are encountered during processing. The codebook generation subsystem can use various techniques to create a compact and efficient codebook, such as frequency-based pruning, clustering, or vector quantization. The size of the codebook can be adjusted based on the desired trade-off between compression and information preservation. Going back to the War and Peace example, the string of tokens ['Well', ',', 'Prince', ',', 'so', 'Gen', 'oa', 'and', 'Luc', 'ca', 'are', 'now', 'just', 'family', 'estates', 'of', 'the', 'Buon', 'apar', 'tes', '.'] may be given codewords such as [12, 5, 78, 5, 21, 143, 92, 8, 201, 45, 17, 33, 49, 62, 87, 11, 2, 179, 301, 56, 4], where each token is assigned a unique codeword, which is represented as an integer. The mapping between tokens and codewords is determined by the codebook generated by the LCM system.

The machine learning core 1240 is the central component of the LCM architecture, where the actual learning and processing take place. The core operates on the codewords generated by the codeword allocator, learning to process, generate, and manipulate the compressed representations. The machine learning core can be implemented using various configurations, depending on the specific task and data modality. Some possible variations include:

In one embodiment, the machine learning core 1240 may be a Transformer-based core. The Transformer-based core consists of several key components. An embedding layer maps the codewords to dense vector representations, capturing their semantic and syntactic properties. Positional encoding is used to incorporate positional information into the codeword embeddings, enabling the Transformer to distinguish the relative positions of the codewords in the input sequence. The multi-head attention mechanism, which is the core building block of the Transformer, allows the model to attend to different parts of the input sequence simultaneously, capturing complex dependencies and relationships between codewords. Feed-forward networks are used to introduce non-linearity and increase the expressive power of the model. Residual connections and layer normalization are employed to facilitate the flow of information and stabilize the training process.

The Transformer-based core can be implemented using an encoder-decoder architecture. The encoder processes the input codewords and generates contextualized representations, while the decoder takes the encoder's output and generates the target codewords or the desired output sequence. The encoder and decoder are composed of multiple layers of multi-head attention and feed-forward networks, allowing for deep and expressive processing of the codeword representations.

One of the key advantages of the Transformer-based core in the LCM architecture is its ability to capture long-range dependencies between codewords. Unlike recurrent neural networks (RNNs), which process the input sequentially, the Transformer can attend to all codewords in parallel, enabling it to effectively capture relationships and dependencies that span across the entire input sequence. This is useful for processing long and complex data sequences, where capturing long-range dependencies is crucial for understanding the overall context. Another advantage of the Transformer-based core is its parallelization capability. The self-attention mechanism in the Transformer allows for efficient parallel processing of the codewords on hardware accelerators like GPUs. This parallelization enables faster training and inference times, making the LCM architecture suitable for processing large amounts of data in real-time applications.

The Transformer-based core also generates contextualized representations of the codewords, where each codeword's representation is influenced by the surrounding codewords in the input sequence. This contextualization allows the model to capture the semantic and syntactic roles of the codewords based on their context, enabling a deeper understanding of the relationships and meanings within the data. The scalability of the Transformer-based core is another significant advantage in the LCM architecture. By increasing the number of layers, attention heads, and hidden dimensions, the Transformer can learn more complex patterns and representations from large-scale datasets. This scalability has been demonstrated by models like GPT-3, which has billions of parameters and can perform a wide range of tasks with impressive performance.

In another embodiment, the machine learning core 1240 may utilize a Variational Autoencoder (VAE)-based core. A VAE-based core consists of two main components: an encoder and a decoder. The encoder takes the codewords as input and maps them to a lower-dimensional latent space representation. The encoder is typically implemented as a neural network, such as a multi-layer perceptron (MLP) or a convolutional neural network (CNN), depending on the nature of the codewords and the data modality. The encoder learns to compress the codewords into a compact latent representation while capturing the essential features and relationships within the data.

The decoder, on the other hand, takes the latent space representation and reconstructs the original codewords. The decoder is also implemented as a neural network, typically the inverse architecture of the encoder. The decoder learns to map the latent space representation back to the codeword space, generating codewords that closely resemble the original input. One of the key advantages of the VAE-based core in the LCM architecture is its ability to learn a continuous and structured latent space representation of the codewords. The latent space captures the underlying patterns and relationships within the data, allowing for smooth interpolation and generation of new codewords. By sampling from the latent space, the VAE-based core can generate novel and meaningful codewords that are similar to the original data distribution.

The VAE-based core also enables efficient compression of the codewords. By encoding the codewords into a lower-dimensional latent space, the VAE reduces the storage and computational requirements of the LCM. The compact latent representation can be used for various downstream tasks, such as data compression, similarity search, or data generation. The VAE-based core in the LCM architecture offers several advantages over traditional data processing techniques. It enables the learning of a compact and expressive latent representation of the codewords, capturing the essential features and relationships within the data. The continuous latent space allows for smooth interpolation and generation of new codewords, enabling tasks such as data augmentation, anomaly detection, and creative content generation.

The LCM architecture with the VAE-based core has a wide range of applications across various domains. In natural language processing, it can be used for tasks such as language modeling, text generation, and text compression. In computer vision, the VAE-based core can be applied to image compression, image generation, and unsupervised representation learning. The architecture can also be used for audio and speech processing, where the codewords represent audio features, enabling tasks such as audio compression, speech synthesis, and music generation.

In another embodiment, the machine learning core 1240 may be a Recurrent Neural Network (RNN)-based core. The RNN-based core consists of one or more recurrent layers, such as Long Short-Term Memory (LSTM) or Gated Recurrent Unit (GRU) layers. These recurrent layers maintain an internal state that allows them to remember and process information from previous time steps, enabling the capture of long-term dependencies and context within the codeword sequences.

The RNN-based core takes a sequence of codewords as input and processes them one at a time. At each time step, the RNN-based core updates its internal state based on the current input codeword and the previous state. This allows the core to learn and encode the temporal dependencies and patterns within the codeword sequences.

The RNN-based core can be used for various tasks, such as codeword sequence prediction, codeword generation, and sequence-to-sequence mapping. In codeword sequence prediction, the RNN-based core learns to predict the next codeword in a sequence given the previous codewords. This enables tasks such as language modeling, time series fore-casting, and predictive maintenance.

In codeword generation, the RNN-based core can be trained to generate new codeword sequences based on a learned probability distribution. By sampling from this distribution, the core can generate novel and coherent code-word sequences that resemble the training data. This has applications in tasks such as text generation, music compo-sition, and synthetic data generation. Sequence-to-sequence mapping involves using two RNN-based cores, an encoder and a decoder, to map an input codeword sequence to an output codeword sequence. The encoder RNN processes the input sequence and generates a fixed-length context vector that captures the essential information. The decoder RNN takes the context vector and generates the output codeword sequence step by step. This architecture has been success-fully applied to tasks such as machine translation, speech recognition, and image captioning.

The RNN-based core in the LCM architecture offers several advantages over traditional data processing tech-niques. It enables the capture and modeling of temporal dependencies and sequential patterns within the codeword sequences, which is crucial for processing and generating sequential data. The RNN-based core can learn and adapt to the specific characteristics and patterns of the data, allowing for more accurate and contextually relevant processing and generation. Furthermore, the RNN-based core can handle variable-length sequences, making it suitable for processing data with different lengths and temporal resolutions. The recurrent nature of the RNN allows it to maintain and propagate information over long sequences, enabling the capture of long-term dependencies and context.

In another embodiment, the core can be implemented as a hybrid of multiple architectures, combining the strengths of different approaches. For example, a Transformer-VAE hybrid can be used, where the Transformer encoder gener-ates contextualized representations of the codewords, and the VAE decoder generates new codewords based on the learned latent space. The specific choice of the machine learning core can be tailored to the requirements of the task and the characteristics of the data. The modular nature of the LCM architecture allows for easy experimentation and adap-tation of different core configurations.

After processing the codewords, the machine learning core generates the output 150 in the desired format. The output can be in the form of codewords, which can be mapped back to the corresponding sourceblocks or tokens using the inverse mapping scheme. Alternatively, the output can be directly generated in the target modality, such as text, images, or audio, depending on the specific application.

The LCM architecture offers several advantages over traditional deep learning approaches. By operating on com-pressed codewords instead of raw tokens, the LCM can reduce the computational and memory requirements, mak-ing it more efficient and scalable. The semantic splitting and codeword representation also allow the LCM to capture the inherent structure and patterns in the data, enabling more effective learning and generalization. Moreover, the modular nature of the LCM architecture allows for easy adaptation to different data modalities and tasks, making it a versatile and flexible framework for various applications.

Figure 13:
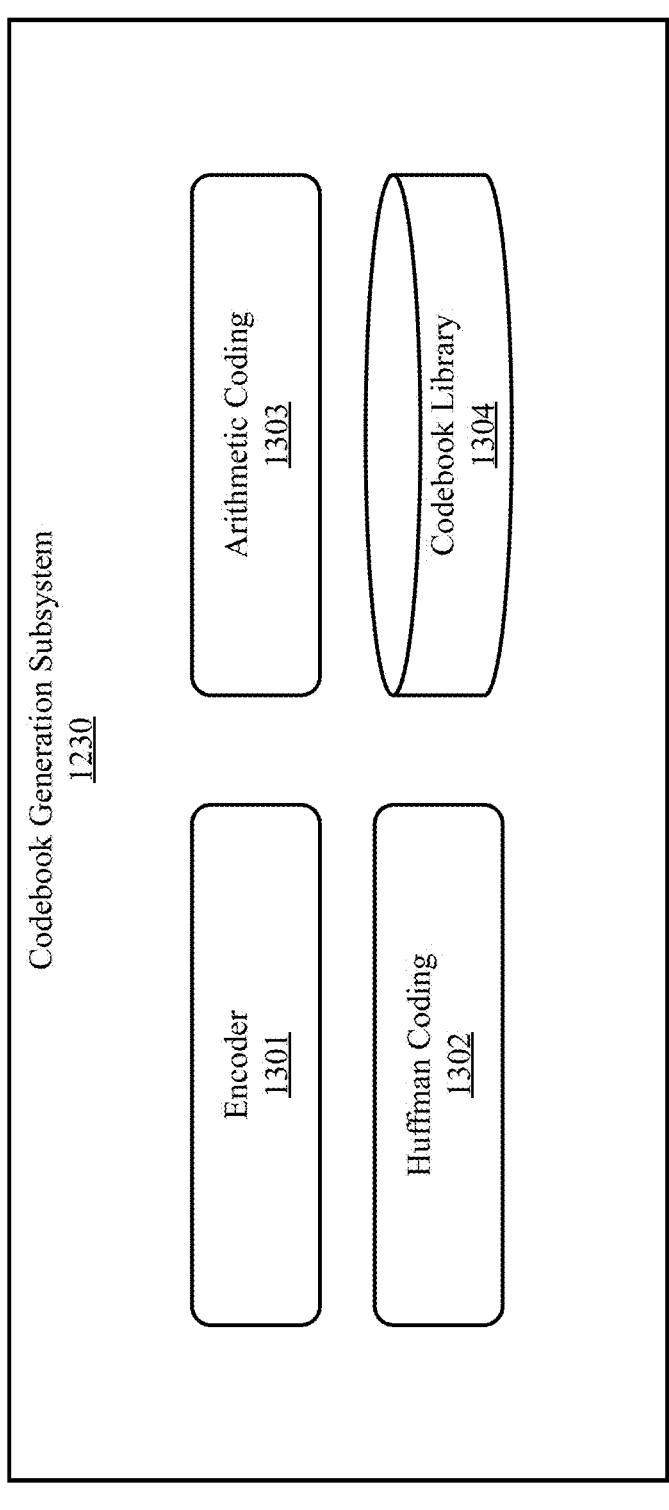
FIG. 13 is a block diagram illustrating an aspect of system for a large codeword model for deep learning, a codeword generation subsystem.

FIG. 13 is a block diagram illustrating an aspect of system and method for a large codeword model for deep learning, a codeword generation subsystem. According to the aspect, codebook generation subsystem 1230 is configured to gen-erate one or more codebooks for a collection of input data using various techniques, such as Huffman coding or arith-metic coding.

The codebook is an important component of the code-book-based homomorphic compression system. According to the embodiment, it is a collection of codewords, where each codeword corresponds to a sourceblock in the token-ized input. The codebook may generated based on the frequency distribution of the tokenized inputs, assigning shorter codewords to more frequently occurring tokens and longer codewords to less frequent tokens. There are several techniques for generating the codebook, with the goal of minimizing the average codeword length while maintaining the uniqueness of the codewords. Two common techniques are Huffman coding 1302 and arithmetic coding 1303. Huffman coding 1302 is a variable-length coding technique that assigns codewords based on the frequency of occur-rence of each symbol (sourceblock). It constructs a binary tree, known as the Huffman tree, where each leaf node represents a symbol and the path from the root to the leaf determines the codeword. More frequent symbols are assigned shorter codewords, while less frequent symbols receive longer codewords. Huffman coding guarantees an optimal prefix code, meaning no codeword is a prefix of any other codeword. For example, consider the quantized tem-perature data from the previous example. Let's say the frequency distribution of the intervals is as follows:

Sourceblock 0: 5%
Sourceblock 1: 10%
Sourceblock 2: 20%
Sourceblock 3: 15%
Sourceblock 4: 50%

Using Huffman coding, the codebook generation subsys-tem 1230 can generate the following codebook:

Sourceblock 0:1100
Sourceblock 1:101
Sourceblock 2:00
Sourceblock 3:01
Sourceblock 4:11

The most frequent tokenized input (Sourceblock 4) receives the shortest codeword (11), while the least frequent tokenized input (Sourceblock 0) receives the longest code-word (1100).

Arithmetic coding 1303 is another entropy coding tech-nique that assigns codewords to sourceblocks based on their probability distribution. Unlike Huffman coding, arithmetic coding does not assign fixed codewords to symbols. Instead, it represents the entire message as a single fractional number between 0 and 1. The interval [0, 1) is recursively divided based on the probabilities of the symbols, and the final codeword is a binary fraction that falls within the subinterval corresponding to the entire message. Arithmetic coding achieves near-optimal compression rates but requires more computational complexity compared to Huffman coding. For example, using the same quantized temperature data and frequency distribution as before, arithmetic coding would assign subintervals to each symbol based on their probabili-ties:

Sourceblock 0: [0.00, 0.05)
Sourceblock 1: [0.05, 0.15)
Sourceblock 2: [0.15, 0.35)
Sourceblock 3: [0.35, 0.50)
Sourceblock 4: [0.50, 1.00)

To encode a message sequence like [Sourceblock 4, Sourceblock 2, Sourceblock 1], arithmetic coding would recursively subdivide the interval [0, 1) based on the probabilities of the symbols, resulting in a final subinterval. The codeword would be a binary fraction that lies within this final subinterval.

According to an embodiment, an encoder component 1301 is present and configured to implement one or more deep learning techniques for generating codewords for quantized data. Deep learning techniques can be employed to generate effective codewords for the quantized data. One approach is to use deep learning-based autoencoder models to learn compact and meaningful representations of the quantized data. Autoencoders are neural network architectures that consist of an encoder and a decoder, where the encoder learns to compress the input data into a lower-dimensional latent space, and the decoder reconstructs the original data from the latent representation.

Here are a few exemplary deep learning encoding techniques that can be implemented for creating codewords of the quantized data, according to an embodiment. Convolutional autoencoders (CAEs) leverage convolutional neural networks (CNNs) in the encoder and decoder parts of the autoencoder. CNNs are particularly effective in capturing spatial dependencies and hierarchical features in data, making them well-suited for encoding structured data such as images or time series. In the context of the codebook-based homomorphic compression, a CAE can be trained on the quantized data. The encoder part of the CAE learns to compress the quantized data into a compact latent representation, which serves as the codeword. The decoder part learns to reconstruct the quantized data from the codeword. As an example, consider an example of using a CAE for encoding quantized sensor data. The quantized data is represented as a 2D matrix, where each row corresponds to a sensor reading, and each column represents a time step. The CAE encoder consists of convolutional layers followed by pooling layers, which gradually reduce the spatial dimensions of the input and extract meaningful features. The output of the encoder is a compact latent representation, which serves as the codeword. The CAE decoder consists of upsampling layers and convolutional layers, which reconstruct the original quantized data from the codeword.

Another form of deep learning coding includes recurrent autoencoders (RAEs). Recurrent autoencoders utilize recurrent neural networks (RNNs) in the encoder and decoder parts of the autoencoder. RNNs are well-suited for processing sequential data, such as time series or natural language, as they can capture temporal dependencies and context. An RAE can be used to encode quantized sequential data. The encoder part of the RAE consists of recurrent layers, such as Long Short-Term Memory (LSTM) or Gated Recurrent Unit (GRU) layers, which process the input sequence and generate a fixed-length latent representation, serving as the codeword. The decoder part of the RAE takes the codeword and reconstructs the original quantized sequence. For example, consider an example of using an RAE for encoding quantized audio data. The quantized audio signal is represented as a sequence of amplitude values. The RAE encoder consists of LSTM layers that process the input sequence and generate a fixed-length latent representation, which serves as the codeword. The RAE decoder, also consisting of LSTM layers, takes the codeword and reconstructs the original quantized audio sequence.

Another form of deep learning coding includes variational autoencoders (VAEs). Variational autoencoders extend the concept of autoencoders by introducing a probabilistic framework. VAEs learn to encode the input data into a probability distribution in the latent space, rather than a single point. The encoder part of the VAE learns to map the input data to the parameters of a probability distribution (e.g., mean and variance of a Gaussian distribution), and the decoder part learns to reconstruct the original data from samples drawn from this distribution. A VAE can be used to generate codewords that capture the underlying probability distribution of the quantized data. The encoder part of the VAE learns to map the quantized data to the parameters of a probability distribution in the latent space. The codewords are then obtained by sampling from this distribution. The decoder part of the VAE learns to reconstruct the original quantized data from the sampled codewords. Consider an example of using a VAE for encoding quantized image data. The quantized images are fed into the VAE encoder, which learns to map each image to the parameters of a Gaussian distribution in the latent space. The codewords are obtained by sampling from this distribution. The VAE decoder takes the sampled codewords and reconstructs the original quantized images.

Another form of deep learning coding includes deep belief networks (DBNs). Deep Belief Networks are generative models that consist of multiple layers of restricted Boltzmann machines (RBMs). DBNs can learn hierarchical representations of the input data by training each layer in an unsupervised manner, followed by fine-tuning the entire network using supervised learning. DBNs can be used to generate codewords that capture the hierarchical structure of the quantized data. The DBN is trained on the quantized data, and the activations of the hidden layers serve as the codewords. The hierarchical nature of DBNs allows for capturing complex patterns and dependencies in the data. Consider an example of using a DBN for encoding quantized text data. The quantized text is represented as a binary vector, where each element corresponds to the presence or absence of a specific word. The DBN is trained on the quantized text data, and the activations of the hidden layers serve as the codewords. The DBN learns to capture the hierarchical structure and semantic relationships in the text data.

These are just a few examples of deep learning encoding techniques that can be explored for creating codewords of the quantized data in a LCM. The choice of the specific deep learning architecture depends on the nature of the data and the desired properties of the codewords. It's important to note that the deep learning encoding process should be designed to generate codewords that are suitable for homomorphic operations. The codewords should exhibit certain properties, such as being compatible with the homomorphic encryption scheme's plaintext space and allowing for efficient homomorphic computations.

During the training process of the deep learning models, the objective function should be designed to capture the desired properties of the codewords, such as minimizing the reconstruction error while ensuring the codewords are suitable for homomorphic operations. Additionally, regularization techniques can be employed to encourage sparsity or other desirable properties in the codewords. Once the deep learning models are trained, the encoder part can be used to generate codewords for new quantized data. The generated codewords can then be used in the codebook-based homomorphic compression scheme, enabling efficient and privacy-preserving computations on the compressed data.

Experimental evaluation and performance analysis can be conducted to assess the effectiveness of the deep learning encoding techniques in generating codewords that achieve good compression ratios, maintain low approximation errors, and enable efficient homomorphic operations. The choice of the deep learning architecture and hyperparameters can be fine-tuned based on the specific requirements and characteristics of the data.

According to the aspect, a codebook library 1304 is present and configured to store a plurality of codewords (i.e., a codebook) generated by one or more of the techniques described herein. When it comes to storing the codewords and codebook in the codebook-based homomorphic compression system, several database systems and data storage solutions can be considered. The choice of the storage system depends on factors such as the size of the codebook, the frequency of updates, the retrieval and query requirements, and the overall system architecture. In some implementations key-value stores may be used, Key-value stores are a type of NoSQL database that provide a simple and efficient way to store and retrieve data based on a unique key. Examples of key-value stores include Redis, Memcached, and Amazon DynamoDB. For storing the codewords and codebook, key-value stores can be used to store each codeword as a key-value pair, where the key represents the codeword, and the value represents the corresponding data or metadata associated with the codeword. The codebook can be stored as a collection of key-value pairs, allowing for fast retrieval of codewords based on their keys. Key-value stores offer high performance, low latency, and scalability, making them suitable for scenarios where fast retrieval of codewords is critical.

Document databases, such as MongoDB or Couchbase, store data as flexible, semi-structured documents in formats like JSON or BSON. They provide a schema-less design and allow for easy modification of the data structure. For storing the codewords and codebook, document databases can be used to store each codeword as a document, along with its associated data or metadata. The codebook can be stored as a collection of documents, where each document represents a codeword and its related information. Document databases offer flexibility in terms of data structure, allowing for easy addition or modification of codeword attributes. They also provide querying capabilities based on document fields, enabling efficient retrieval of codewords based on specific criteria.

Relational databases, such as MySQL, PostgreSQL, or Oracle, can also be used to store the codewords and codebook. In a relational database, the codewords can be stored in a table with columns representing the codeword and its associated data or metadata. The codebook can be stored in a separate table, with each row representing a codeword and its corresponding information. Relational databases provide structured querying capabilities using SQL, allowing for efficient retrieval and filtering of codewords based on specific conditions. Relational databases offer strong consistency, ACID properties, and support for complex queries, making them suitable for scenarios where data integrity and structured querying are important.

Graph databases, such as Neo4j or Amazon Neptune, store data as nodes and edges in a graph structure. They are designed to efficiently handle complex relationships and connections between data entities. For storing the codewords and codebook, graph databases can be used to represent the relationships between codewords and their associated data or metadata. Each codeword can be represented as a node in the graph, with edges connecting related codewords or linking codewords to their corresponding data. Graph databases provide efficient traversal and querying capabilities based on the graph structure, allowing for fast retrieval of connected codewords and exploration of relationships between codewords.

Distributed key-value stores, such as Apache Cassandra or Apache HBase, are designed to handle large-scale data and provide high scalability and fault tolerance. They distribute data across multiple nodes in a cluster, allowing for horizontal scaling. For storing the codewords and codebook, distributed key-value stores can be used to store codewords as key-value pairs, similar to regular key-value stores. The codebook can be partitioned and distributed across multiple nodes in the cluster, enabling high scalability and performance. Distributed key-value stores offer eventual consistency, high write throughput, and the ability to handle large volumes of data, making them suitable for scenarios where scalability and fault tolerance are critical.

Figure 14:
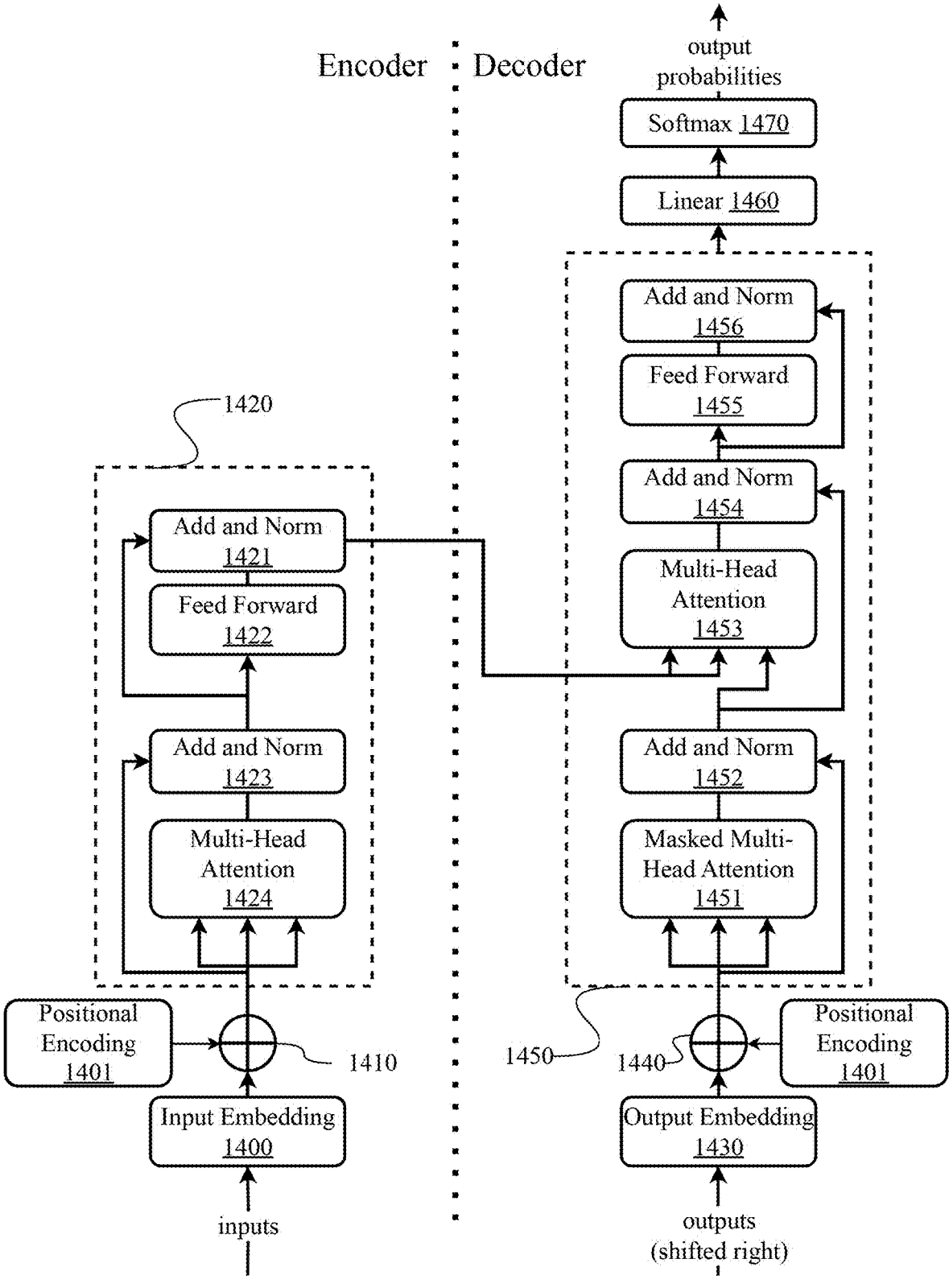
FIG. 14 is a block diagram illustrating an embodiment of the system for a large codeword model for deep learning, where the machine learning core is a Transformer-based core.

FIG. 14 is a block diagram illustrating an embodiment of the system and method for a large codeword model for deep learning, where the machine learning core is a Transformer-based core. A Transformer generally comprises an Encoder (the components on the left side of the illustration) and a Decoder (the components on the right side of the illustration).

The illustrated Transformer comprises an Encoder and a Decoder. The Encoder takes input embeddings and processes them through a stack of layers (represented as dashed box 1420). Each layer consists of: positional encoding, which adds position information to the input embeddings; multi-head attention, which allows the model to attend to different parts of the input sequence; add and norm, which applies residual connection and layer normalization; feed forward, which is a fully connected feed-forward network; and add and norm which is another residual connection and layer normalization.

The power of the transformer model lies in the self-attention mechanism. This mechanism contributes to accelerated learning compared to traditional models such as long short-term memory models. Self-attention empowers the transformer model with the remarkable capability to meticulously scrutinize distinct segments of a given sequence or even encompass the entire contextual essence of a sentence. This profound contextual awareness enables the model to make predictions with an elevated degree of accuracy and relevance.

The input embedding 1400 to the Encoder is a sequence of tokens, typically represented as integers. Each token is mapped to a learnable embedding vector of a fixed size. The embedding layer is a lookup table that converts each token into its corresponding dense vector representation. The embeddings are learned during training and capture semantic and syntactic relationships between tokens.

A dense vector representation, also known as a dense embedding or a continuous vector representation, is a way of representing data, particularly words or tokens, as dense vectors in a high-dimensional continuous space. In the context of natural language processing (NLP) and language models, dense vector representations are used to capture semantic and syntactic information about words or tokens. Each word or token is mapped to a fixed-size vector of real numbers, typically with hundreds or thousands of dimensions. Each word or token is represented by a vector of a fixed size, regardless of the length of the input sequence. The size of the vector is a hyperparameter that is determined during model design. The vectors exist in a continuous high-dimensional space, where each dimension represents a latent feature or aspect of the word or token. The continuous nature allows for capturing fine-grained relationships and similarities between words. The dense vector representations are learned during the training process of the model. The model learns to assign similar vectors to words that have similar meanings or occur in similar contexts. The dense vector representations aim to capture semantic and syntactic relationships between words. Words that have similar meanings or are used in similar contexts tend to have similar vector representations. Dense vector representations allow for performing algebraic operations on words, such as addition and subtraction. These operations can capture analogies and relationships between words, such as "prince"−"man"+"woman"≈"princess". Dense vector representations serve as input features for various downstream NLP tasks, such as text classification, sentiment analysis, named entity recognition, and machine translation. The dense representations provide a rich and informative input to the models, enabling them to learn patterns and make predictions. Some popular examples of dense vector representations include, but are not limited to, Word2Vec, Global Vectors for Word Representations (GloVe), FastText, and BERT.

After the input embedding layer, positional encoding 1401 is added to the input embedding to provide position information to the model. The positional encoding 1401 and the input embedding 1400 may be added using a function 1410. Since the Transformer architecture doesn't have inherent recurrence or convolution, positional encodings help capture the order and relative positions of tokens. The positional encodings are typically sine and cosine functions of different frequencies, allowing the model to learn relative positions. The positional encodings have the same dimensionality as the input embeddings and are summed with them.

The Encoder utilizes a multi-head attention mechanism 1424 which is a key component of the Transformer architecture. It allows the Encoder to attend to different parts of the input sequence and capture dependencies between tokens. The attention mechanism computes three matrices: Query (Q), Key (K), and Value (V). The Query, Key, and Value matrices are obtained by linearly projecting the input embeddings using learned weight matrices. The attention scores are computed by taking the dot product of the Query matrix with the transpose of the Key matrix, followed by scaling and applying a softmax function. The attention scores determine the importance of each token in the input sequence for a given position. The Value matrix is then multiplied with the attention scores to obtain the weighted sum of the values, which forms the output of the attention mechanism. Multi-Head Attention splits the Query, Key, and Value matrices into multiple heads, allowing the model to attend to different aspects of the input simultaneously. The outputs from each head are concatenated and linearly projected to obtain the final output of the Multi-Head Attention layer 1424.

After the Multi-Head Attention layer, a residual connection is applied, followed by Layer Normalization at add and norm 1423. The residual connection adds the input embeddings to the output of the attention layer, helping the model learn faster and deeper. Layer Normalization normalizes the activations across the features, stabilizing the training process.

The Feed Forward layer 1422 is a fully connected neural network applied to each position of the Encoder's hidden states. It consists of two linear transformations with a Rectified Linear Unit (ReLU) activation function in between. The purpose of the Feed Forward layer is to introduce non-linearity and increase the model's capacity to learn complex representations. The output of the Feed Forward layer has the same dimensionality as the input embeddings. A residual connection and Layer Normalization 1421 are applied after the Feed Forward layer.

The Encoder layers 1420 are stacked Nx times, where N is a hyperparameter that determines the depth of the Encoder. Each layer follows the same structure: Multi-Head Attention, Add & Norm, Feed Forward, and Add & Norm. By stacking multiple Encoder layers, the model can capture hierarchical and long-range dependencies in the input sequence. The output of the final Encoder layer represents the encoded input sequence, which is then passed to the Decoder for generating the output sequence.

The Decoder generates the output probabilities. It has a similar structure to the Encoder, with a few additions. The Decoder takes output embeddings and processes them through a stack of layers (represented as dashed box 1450). The output embedding layer 1430 takes the previous output tokens (shifted right by one position) and converts them into dense vectors. Each token is mapped to a learnable embedding vector of a fixed size. The embedding vectors capture semantic and syntactic relationships between tokens.

Positional encoding 1401 is added to the output embedding 1430 to provide position information to the model. Positional encoding 1401 may be added to the output embedding 1430 through a function 1440. Since the Transformer architecture does not have inherent recurrence or convolution, positional encodings help capture the order and relative positions of tokens. The positional encodings are typically sine and cosine functions of different frequencies, allowing the model to learn relative positions.

The masked multi-head attention 1451 mechanism prevents the model form attending to future tokens. This layer performs self-attention on the Decoder's input sequence. It allows the Decoder to attend to different parts of its own input sequence. The attention is "masked" to prevent the Decoder from attending to future tokens, ensuring that the predictions are based only on the previously generated tokens. Multi-head attention splits the input into multiple heads, allowing the model to attend different aspect of the input simultaneously.

After the masked multi-head attention, a residual connection is applied follows by layer normalization via add and norm 1452. The residual connection adds the input to the output of the attention layer, helping the model learn faster and deeper. Layer normalization normalizes the activations across the features, stabilizing the training process.

The multi-head attention 1453 layer performs attention between the Decoder's hidden states and the Encoder's output. It allows the Decoder to attend to relevant parts of the input sequence based on the Encoder's representations. The attention weights are computed based on the compatibility between the Decoder's hidden states and Encoder's outputs.

Another add and norm 1454 layer is then followed by feed forward network 1455. This a fully connected feed-forward network applied to each position of the Decoder's hidden states. It consists of two linear transformations with a Rectified Linear Unit (ReLU) activation in between. The feed forward layer helps the model capture non-linear interactions and increases the model's capacity.

Another add and norm 1456 layer is followed by linear 1460 and softmax 1470 layers. The final hidden states of the Decoder are passed through a linear transformation to project them into the vocabulary space. Vocabulary space refers to the set of all unique tokens or words that the model can generate or predict. In the context of language models, the vocabulary is a predefined set of tokens that the model is trained on and can output. When the Decoder's final hidden states are passed through a linear transformation, they are projected into a vector space with the same dimensionality as the size of the vocabulary. Each dimension in this space corresponds to a specific token in the vocabulary. For example, the model has a vocabulary of 10,000 unique tokens. The linear transformation would project the Decoder's hidden states into a 10,000-dimensional vector space. Each element in this vector represents the model's predicted probability or score for the corresponding token in the vocabulary.

A softmax function is applied to the projected values (vectors) to generate output probabilities over the vocabulary. The softmax function normalizes the values so that they sum up to 1, representing a probability distribution over the vocabulary. Each probability indicates the likelihood of a specific token being the next output token. The token with the highest probability is selected as the next output token. During the model's training, the objective is to maximize the probability of the correct next token given the input sequence and the previously generated tokens. The model learns to assign higher probabilities to the tokens that are more likely to appear based on the context. At inference time, the token with the highest probability in the vocabulary space is selected as the next output token. This process is repeated iteratively, with the generated token being fed back into the Decoder as input for the next step, until a stopping criterion is met (e.g., reaching a maximum length or generating an end-of-sequence token). The size and composition of the vocabulary can vary depending on the specific task and the data the model is trained on. It can include words, sub-words, or even characters, depending on the tokenization strategy used.

The Decoder layers 1450 can be stacked Nx times, allowing the model to capture complex dependencies and generate coherent output sequences.

This transformer architecture allows the model to process input sequences, capture long-range dependencies, and generate output sequence based on the encoded input and the previously generated codewords.

There are at least three variations of transformer architecture that may enable an LCM. A first such variation comprises Auto-Encoding Models. In autoencoders, the decoder portion of the transformer is discarded after pre-training and only the encoder is used to generate the output. The popular BERT and ROBERTa models are examples of models based on this architecture and perform well on sentiment analysis and text classification. These types of models may be trained using a process called masked language modeling (MLM).

The primary goal of an autoencoder is to learn efficient representations of input data by encoding the data into a lower-dimensional space and then reconstructing the original data from the encoded representation. Autoencoders are trained in an unsupervised manner, meaning they don't require labeled data. They learn to capture the underlying structure and patterns in the input data without explicit guidance. An autoencoder consists of two main components: an encoder and a decoder. The encoder takes the input data and maps it to a lower-dimensional representation, often referred to as the latent space or bottleneck. The decoder takes the latent representation and tries to reconstruct the original input data. Autoencoders can be used for dimensionality reduction by learning a compressed representation of the input data in the latent space. The latent space has a lower dimensionality than the input data, capturing the most salient features or patterns. The training objective of an autoencoder is to minimize the reconstruction error between the original input and the reconstructed output. The model learns to encode and decode the data in a way that preserves the essential information needed for reconstruction. Variants and extensions of autoencoders can include denoising autoencoders, variational autoencoders (VAEs) which introduce a probabilistic approach to autoencoders wherein they learn a probabilistic encoder and decoder, allowing for generating new samples from the learned latent space, and conditional autoencoders which incorporate additional conditions or labels as input to the encoder and decoder, enabling the generation of samples conditioned on specific attributes.

Autoencoders can have various applications. Autoencoders can be used to detect anomalies by measuring the reconstruction error. Anomalous samples tend to have higher reconstruction errors compared to normal samples. Autoencoders can be used as a pre-training step to learn meaningful features from unlabeled data. The learned features can then be used for downstream tasks like classification or clustering. Additionally, or alternatively, autoencoders, particularly VAEs, can be used as generative models to generate new samples similar to the training data by sampling from the learned latent space. It's worth noting that while autoencoders can be effective for certain tasks, they have some limitations. They may struggle to capture complex dependencies and may generate blurry or less sharp reconstructions compared to other generative models like Generative Adversarial Networks (GANs).

Another type of variation is the auto-regressive model which feature the use of only the decoder portion of the transformer architecture. In autoregressive architectures, the decoder portion of the transformer is retained and the encoder portion is not used after model pre-training. Auto-regressive models are a class of models that generate outputs by predicting the next element based on the previously generated elements. In the context of the Transformer architecture and language modeling, auto-regressive models are commonly used for tasks such as text generation, machine translation, and language understanding.

Auto-regressive models generate outputs sequentially, one element at a time. In the case of language modeling, the model predicts the next word or token based on the previous words or tokens in the sequence. The prediction of the next element is conditioned on the previously generated elements. The model learns the conditional probability distribution $P(x_t|x\_1, x\_2, \ldots, x\_{t-1})$, where $x\_t$ is the element at position t, and $x\_1, x\_2, \ldots, x\_{t-1}$ are the previously generated elements. The Transformer architecture, particularly the Decoder component, is well-suited for auto-regressive modeling. The Decoder generates the output sequence one element at a time, conditioned on the previously generated elements and the encoded input sequence from the Encoder. In the Transformer Decoder, the self-attention mechanism is masked to prevent the model from attending to future positions during training. This masking ensures that the model relies only on the previously generated elements to make predictions, following the auto-regressive property. During training, the Transformer Decoder uses a technique called teacher forcing. Instead of feeding the model's own predictions as input for the next step, the ground truth target sequence is used. This helps the model learn to generate the correct output sequence based on the input sequence and the previous target tokens. During inference or generation, the Transformer Decoder generates the output sequence one element at a time. At each step, the model takes the previously generated elements as input and predicts the next element. This process continues until a stopping criterion is met, such as reaching a maximum sequence length or generating an end-of-sequence token. Auto-regressive models, including the Transformer, have achieved state-of-the-art performance in language modeling tasks. They excel at capturing the statistical properties and dependencies in sequential data, making them effective for generating coherent and fluent text.

While text generation is the most suitable use case of auto-regressors, they perform exceptionally well on a wide variety of tasks. Most modern LLMs are auto-regressors including, for example, the popular GPT series of LLMs, BERT, and XLNet.

The third variation of the transformer model is the sequence-to-sequence model which utilizes both the encoder and decoder portions of the transformer and can be trained in multiple ways. One of the methods is span corruption and reconstruction. These models are, generally, best suited for language translation. The T5 and BART family of models are examples of sequence-to-sequence models.

Figure 15:
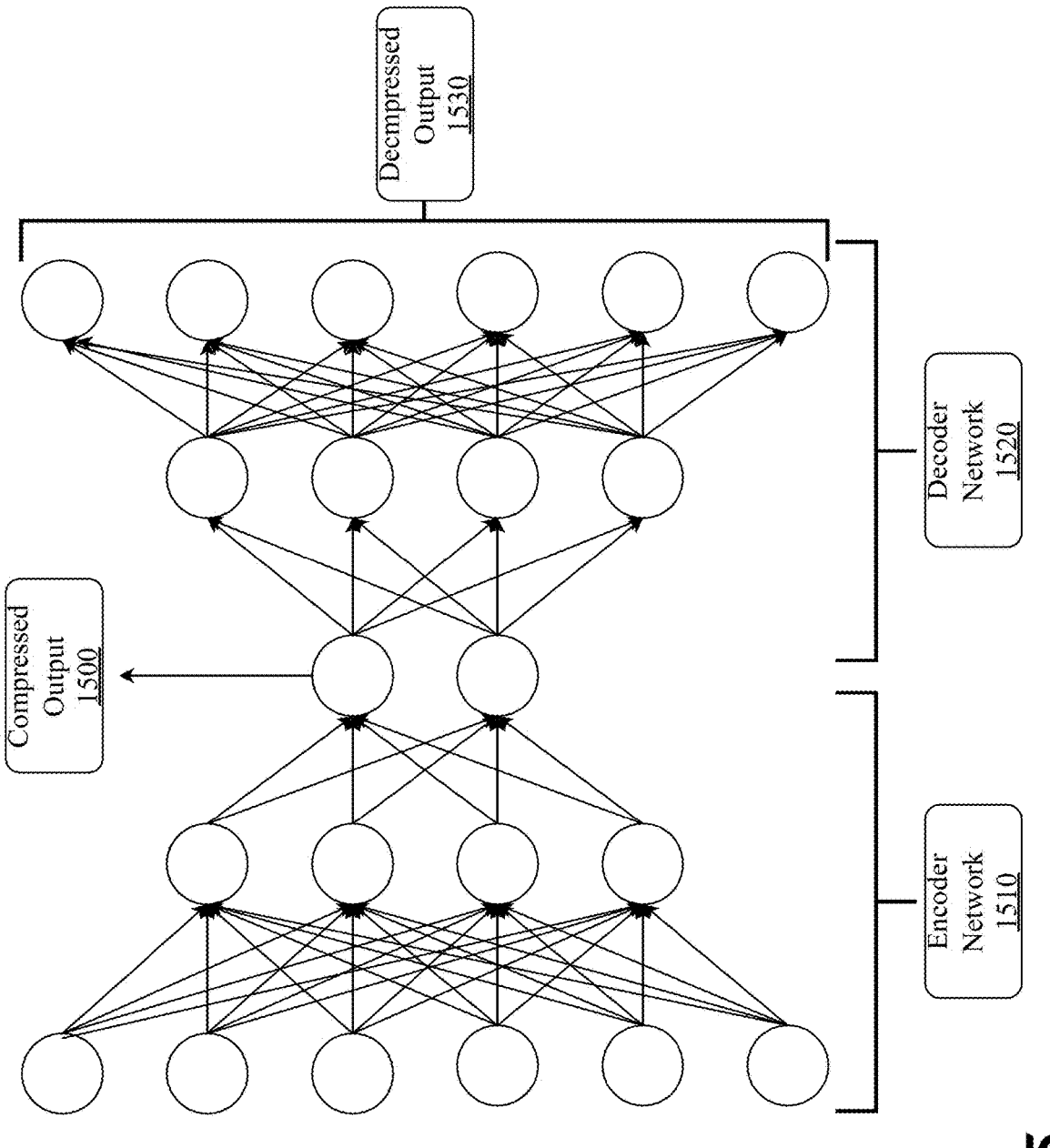
FIG. 15 is a block diagram illustrating an embodiment of the system and method for a large codeword model for deep learning, where the machine learning core is a VAE-based core.

FIG. 15 is a block diagram illustrating an embodiment of the system and method for a large codeword model for deep learning, where the machine learning core is a VAE-based core. An autoencoder network comprises an encoder network 1510 or a decoder network 1520 that work together to encode and decode data effectively. The encoder network 1510 and decoder network 1520 within the autoencoder network is comprised of a plurality of layers that contribute to the encoding and decoding process. These layers include, but are not limited to, convolutional layers, pooling layers, and a bottleneck layer. Some embodiments also include functions that operate on information including but not limited to rectified linear unit functions, sigmoid functions, and skip connections.

The convolutional layers are responsible for extracting meaningful features from the input data. They apply convolutional operations using learnable filters to capture spatial patterns and hierarchical representations of the data. The convolutional layers can have different numbers of filters, kernel sizes, and strides to capture features at various scales and resolutions. Skip connections are employed to facilitate the flow of information across different layers of the autoencoder. Skip connections allow the output of a layer to be directly added to the output of a subsequent layer, enabling the network to learn residual mappings and mitigate the vanishing gradient problem. Skip connections help in preserving fine-grained details and improving the training stability of the autoencoder.

Pooling layers are used to downsample the feature maps generated by the convolutional layers. They reduce the spatial dimensions of the feature maps while retaining the most salient information. Common pooling operations include but are not limited to max pooling and average pooling. Pooling layers help in achieving translation invariance, reducing computational complexity, and controlling the receptive field of the autoencoder. Rectified Linear Unit (ReLU) functions introduce non-linearity into the autoencoder by applying a ReLU activation function element-wise to the output of the previous layer. ReLU functions help in capturing complex patterns and relationships in the data by allowing the network to learn non-linear transformations. They also promote sparsity and alleviate the vanishing gradient problem. The bottleneck layer represents the most compressed representation of the input data. The bottleneck layer has a significantly reduced dimensionality compared to the input and output layers of the autoencoder. It forces the network to learn a compact and meaningful encoding of the data, capturing the essential features and discarding redundant information. In one embodiment, the multi-layer autoencoder network is comprised of a plurality of the previously mentioned layers where the sequence and composition of the layers may vary depending on a user's preferences and goals. The bottleneck layer is where the compressed output 1500 is created. Each layer previous to the bottleneck layer creates a more and more compressed version of the original input. The layers after the bottleneck layer represent the decoder network 1530 where a plurality of layers operate on a compressed input to decompress a data set. Decompression results in a version of the original input which is largely similar but has some lost data from the transformations.

Figure 16:
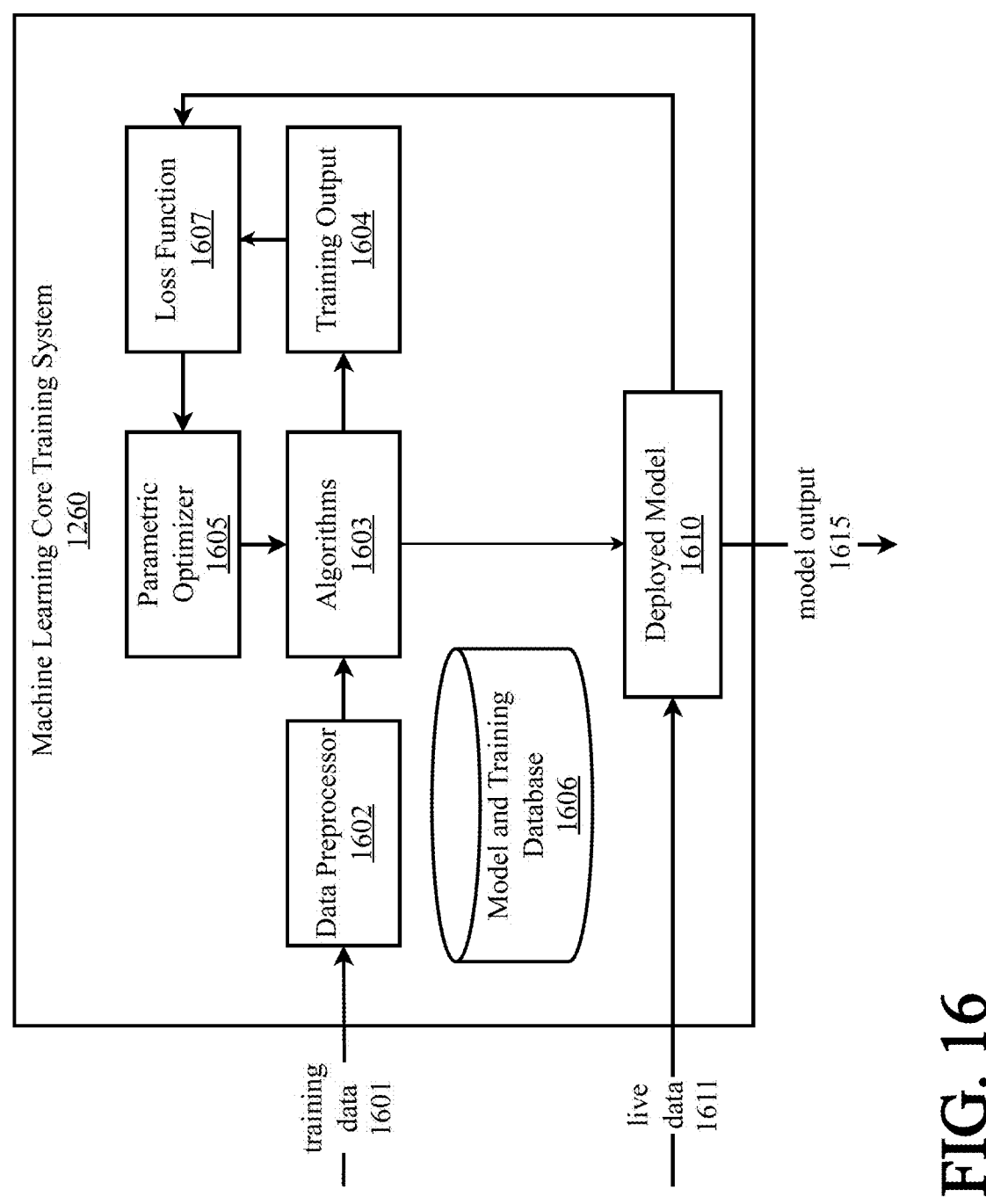
FIG. 16 is a block diagram illustrating an aspect of system and method for a large codeword model for deep learning, a machine learning core training system.

FIG. 16 is a block diagram illustrating an aspect of system and method for a large codeword model for deep learning, a machine learning core training system. According to the embodiment, the machine learning core training system 1260 may comprise a model training stage comprising a data preprocessor 1602, one or more machine and/or deep learning algorithms 1603, training output 1604, and a parametric optimizer 1605, and a model deployment stage comprising a deployed and fully trained model 1610 configured to perform tasks described herein such as processing codewords through a large codeword model. The machine learning core training system 1260 may be used to train and deploy a plurality of machine learning architectures in order to support the services provided by the large codeword model for deep learning.

At the model training stage, a plurality of training data 1601 may be received by the generative AI training system 1650. Data preprocessor 1602 may receive the input data (e.g., codewords, sourceblocks) and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 1602 may also be configured to create training dataset, a validation dataset, and a test set from the plurality of input data 1601. For example, a training dataset may comprise 80% of the preprocessed input data, the validation set 10%, and the test dataset may comprise the remaining 10% of the data. The preprocessed training dataset may be fed as input into one or more machine and/or deep learning algorithms 1603 to train a predictive model for object monitoring and detection.

During model training, training output 1604 is produced and used to measure the accuracy and usefulness of the predictive outputs. During this process a parametric optimizer 1605 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tanh, etc.), the choice of cost or loss function the model will use, number of hidden layers in a neural network, number of activation unites in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

In some implementations, various accuracy metrics may be used by the machine learning core training system 1260 to evaluate a model's performance. Metrics can include, but are not limited to, word error rate (WER), word information loss, speaker identification accuracy (e.g., single stream with multiple speakers), inverse text normalization and normalization error rate, punctuation accuracy, timestamp accuracy, latency, resource consumption, custom vocabulary, sentence-level sentiment analysis, multiple languages supported, cost-to-performance tradeoff, and personal identifying information/payment card industry redaction, to name a few. In one embodiment, the system may utilize a loss function 1607 to measure the system's performance. The loss function 1607 compares the training outputs with an expected output and determined how the algorithm needs to be changed in order to improve the quality of the model output. During the training stage, all outputs may be passed through the loss function 1607 on a continuous loop until the algorithms 1603 are in a position where they can effectively be incorporated into a deployed model 1615.

The test dataset can be used to test the accuracy of the model outputs. If the training model is establishing correlations that satisfy a certain criterion such as but not limited to quality of the correlations and amount of restored lost data, then it can be moved to the model deployment stage as a fully trained and deployed model 1610 in a production environment making predictions based on live input data 1611 (e.g., interest factor data, incentive data). Further, model correlations and restorations made by deployed model can be used as feedback and applied to model training in the training stage, wherein the model is continuously learning over time using both training data and live data and predictions. A model and training database 1606 is present and configured to store training/test datasets and developed models. Database 1606 may also store previous versions of models.

According to some embodiments, the one or more machine and/or deep learning models may comprise any suitable algorithm known to those with skill in the art including, but not limited to: LLMs, generative transformers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 1603 may comprise a deep learning algorithm such as neural networks (e.g., recurrent, convolutional, long short-term memory networks, etc.). In some implementations, the machine learning core training system 1260 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in database(s) 1606.

FIG. 17 is a flow diagram illustrating an exemplary method for a large codeword model for deep learning. In a first step 1700, collect a plurality of inputs from various sources, such as user input, sensor data, or existing datasets. These inputs can be in different modalities, including text, images, audio, time series, or any other structured or unstructured format.

In a step 1710, the collected inputs are tokenized into a plurality of sourceblocks. Tokenization is performed by the tokenizer component of the LCM architecture, which splits the input data into meaningful semantic units called sourceblocks. The tokenizer employs techniques like syntactic splitting or semantic splitting to capture the inherent structure and patterns in the data. For textual data, the tokenizer may use subword tokenization methods like Byte-Pair Encoding (BPE) or WordPiece. For other modalities, such as images or audio, the tokenizer may use domain-specific techniques to identify and extract relevant sourceblocks.

In a step 1720, each sourceblock is assigned a unique codeword based on a dictionary generated by the codebook generation subsystem. The codebook generation subsystem creates and maintains a dictionary that maps sourceblocks to their corresponding codewords. Codewords are discrete, compressed representations of the sourceblocks, designed to capture the essential information in a compact form. The codeword assignment can be based on various techniques, such as frequency-based coding, hash functions, or learned mappings.

In a step 1730, the assigned codewords are then processed through the machine learning core of the LCM. The machine learning core is the central component of the LCM architecture, responsible for learning and generating responses based on the input codewords. It can be implemented using various configurations, such as a Transformer-based core, a Variational Autoencoder (VAE)-based core, or a combination of different architectures. The machine learning core learns to map input codeword sequences to output codeword sequences, capturing the patterns, relationships, and semantics within the data.

In a step 1740, the machine learning core generates an output response. The output response can be in the form of codewords, which are then mapped back to the corresponding sourceblocks or tokens using the inverse mapping scheme defined in the codebook. Alternatively, the output response can be directly generated in the target modality, such as text, images, or audio, depending on the specific application.

In a step 1750, to improve the performance and adaptability of the LCM, the machine learning core is trained using the generated output. The training process involves comparing the generated output with the expected or desired output, and adjusting the parameters of the machine learning core accordingly. This can be done using techniques like backpropagation, gradient descent, or reinforcement learning, depending on the specific architecture and objective of the LCM. The training process allows the LCM to learn from its own outputs and continuously improve its performance over time.

Figure 18:
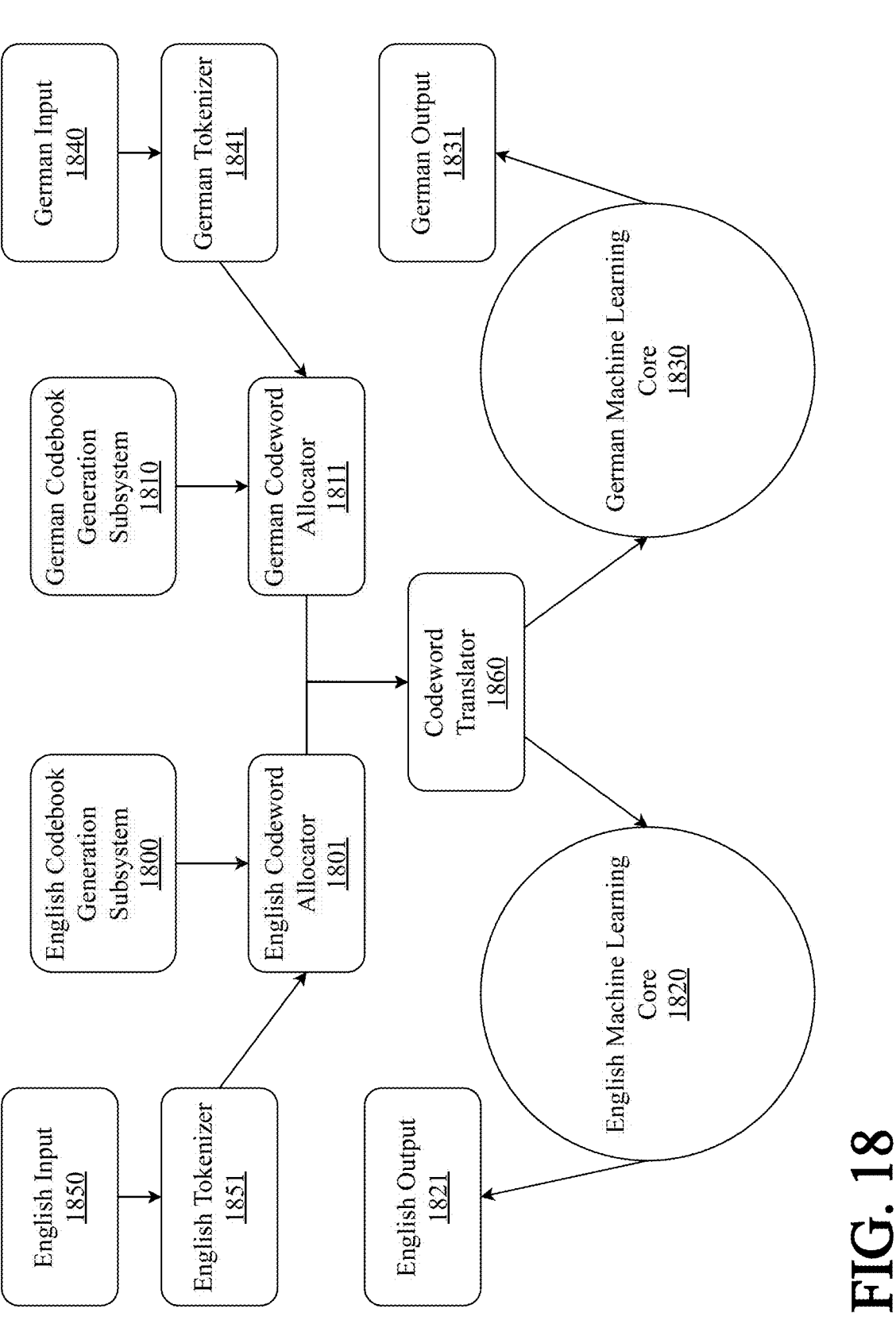
FIG. 18 is a block diagram illustrating an exemplary embodiment of a large codeword model where the model is configured to translate various language inputs.

FIG. 18 is a block diagram illustrating an exemplary embodiment of a large codeword model where the model is configured to translate various language inputs. The system consists of several key components that work together to enable translation between two languages, in this case, English and German. The system includes separate codebook generation subsystems, codeword allocators, and machine learning cores for each language, as well as a codeword translator that facilitates the translation process.

An English input 1850 represents the source text or data that needs to be translated from English to German. This input is fed into an English tokenizer 1851, which is responsible for tokenizing the English input into a plurality of sourceblocks. The English tokenizer 1851 employs language-specific techniques, such as subword tokenization methods like Byte-Pair Encoding (BPE) or WordPiece, to split the input into meaningful semantic units that capture the linguistic structure and patterns of the English language.

The tokenized English sourceblocks are then processed by an English codebook generation subsystem 1800. This subsystem generates and maintains a codebook specifically for the English language. The English codebook is a dictionary that maps each English sourceblock to a corresponding codeword. Codewords are discrete, compressed representations of the sourceblocks, designed to capture the essential linguistic information in a compact form. The codebook generation subsystem uses techniques like frequency-based coding, hash functions, or learned mappings to assign codewords to the sourceblocks. An English codeword allocator 1801 takes the tokenized English sourceblocks and assigns the corresponding codewords from the English codebook. This process converts the English sourceblocks into a sequence of codewords that represent the English input in a compressed and efficient format.

The sequence of English codewords is then processed by an English machine learning core 720. This core is a specialized component of the LCM architecture that is trained specifically on the English language. It learns to map input codeword sequences to output codeword sequences, capturing the linguistic patterns, relationships, and semantics of the English language. The English machine learning core 1820 may be implemented using various configurations, such as a Transformer-based core, a Variational Autoencoder (VAE)-based core, or a combination of different architectures, tailored to the characteristics of the English language.

The English machine learning core 1820 generates an English output 1821 in the form of a sequence of codewords. These codewords represent the translated content in the English language, encoded in the compressed codeword format.

To perform the translation from English to German, the system utilizes a codeword translator 1860. The codeword translator 1860 maps the English codewords to their corresponding German codewords. It learns the mappings between the codewords of the two languages, enabling cross-lingual translation. The codeword translator 1860 can be implemented using various techniques, such as neural machine translation models, cross-lingual word embeddings, or learned mapping functions.

In the depicted case, the codeword translator 1860 takes the English codeword output 1821 and translates it into a sequence of German codewords. These German codewords represent the translated content in the German language, encoded in the compressed codeword format.

The translated German codewords are then processed by a German machine learning core 1830. Similar to the English machine learning core 1820, the German Machine Learning Core is a specialized component trained specifically on the German language. It learns to map input German codeword sequences to output sequences in the German language, capturing the linguistic patterns and semantics of German. The German machine learning core 1830 generates a German output 1831 based on the translated German codewords. This output represents the final translated content in the German language.

The system also includes a German codebook generation subsystem 1810 and a German codeword allocator 1811, which serve similar purposes as their English counterparts but are specific to the German language. These components handle the generation and allocation of German codewords based on a German input 1840 and a German tokenizer 1841. This system may be configured to handle any plurality of languages. The English and German codebooks and machine learning cores are simply examples. Likewise, a machine learning core may be trained to process any given language, depending on needs. The modular architecture of the system allows for flexibility and scalability in handling multiple languages. The system can be extended to support additional language pairs by incorporating language-specific codebook generation subsystems, codeword allocators, and machine learning cores, along with corresponding codeword translators.

Figure 19:
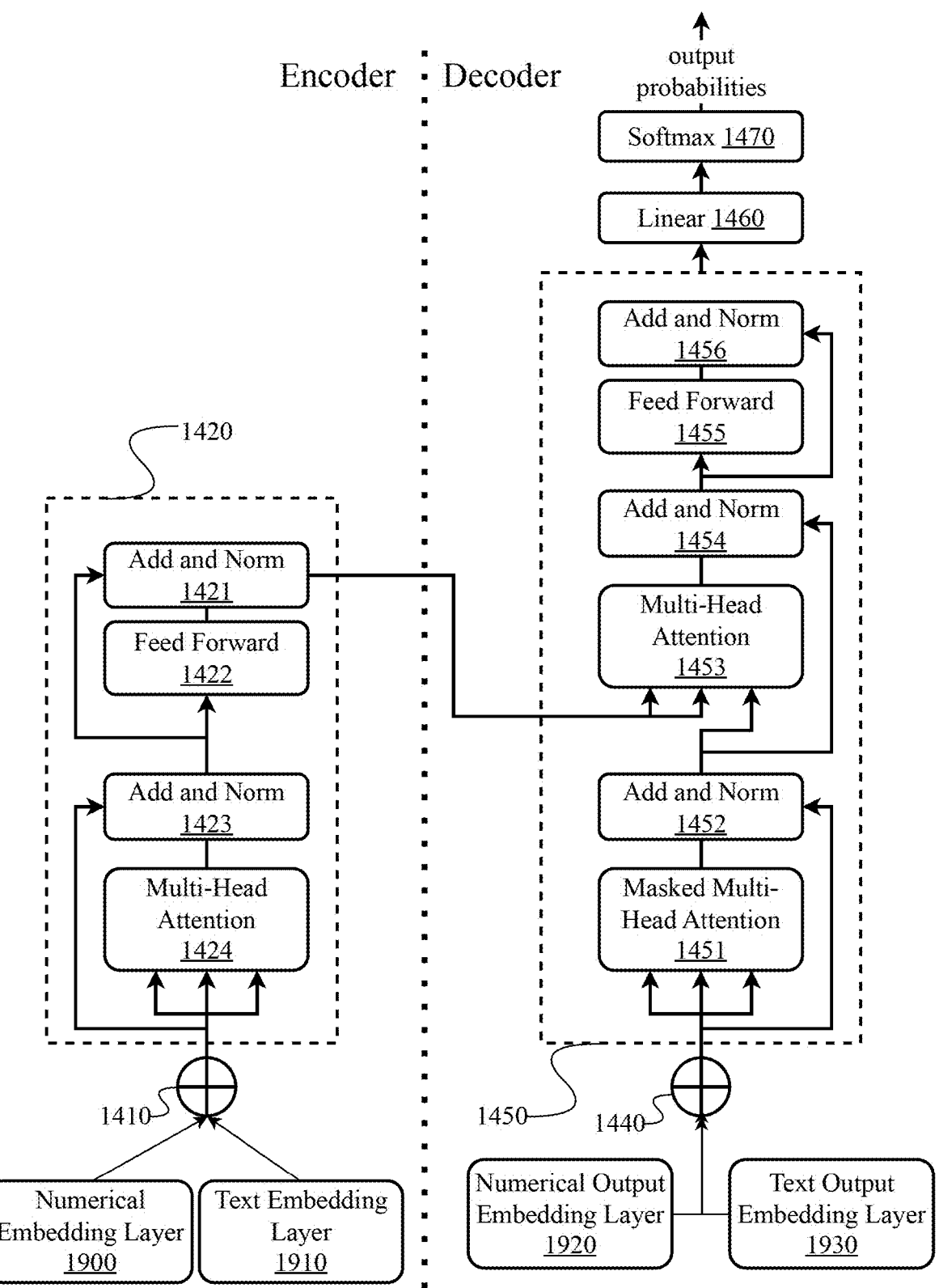
FIG. 19 is a block diagram illustrating an exemplary embodiment of a large codeword model with a dual embedding layer.

FIG. 19 is a block diagram illustrating an exemplary embodiment of a large codeword model with a dual embedding layer. The LCM may be configured to process inputs through a plurality of embedding layers. In one example, inputs of different modalities may be processed through a numerical embedding layer 1900 and a text embedding layer 1910. The numerical embedding layer 1900 is responsible for processing numerical input data, mapping it into a dense vector representation. It learns to capture the relevant patterns and relationships within the numerical data. Similarly, the text embedding layer 1910 handles the processing of textual input data, mapping each token to a dense vector representation and capturing the semantic and syntactic information present in the text.

The embedded vectors from each embedding layer may be concatenated to form a single input stream. To concatenate the numerical and text embeddings along the feature dimension, they have the same sequence length. This can be achieved by padding the shorter sequence or truncating the longer sequence to match the lengths. The numerical embeddings and text embeddings are then concatenated along the feature dimension. The feature dimensionality of the combined sequence is the sum of the embedding dimensions of the individual modalities. The combined input sequence contains information from both the numerical and text input data, with each position in the sequence representing a concatenation of the corresponding numerical and text embeddings.

The combined input sequence may then be passed through an encoder within a transformer. Inside the encoder, a multi-head attention 1924 sub-layer performs self-attention on the combined input sequence. It allows the model to attend to different positions within the sequence and capture dependencies between the numerical and text features. The self-attention mechanism computes attention weights based on the similarity between different positions in the sequence, enabling the model to focus on relevant information. Feed forward layers within the transformer may learn to combine and transform features from all types of codewords, non-dependent on their original modality.

The single input stream is processed through the remainder of the transformer architecture, which is explained more in depth in FIG. 15. By concatenating the embeddings from different modalities and processing them through the Transformer architecture, the system can effectively learn and utilize the cross-modal interactions and dependencies. The self-attention mechanism in the Transformer allows the model to capture relationships between the numerical and text features at different positions in the sequence, enabling it to generate coherent and contextually relevant outputs.

The concatenation of embeddings along the feature dimension provides a flexible and extensible approach to integrating multiple input modalities. It allows the system to handle various data types and learn joint representations that leverage information from different sources. This approach can be extended to incorporate additional modalities by adding corresponding embedding layers and concatenating their outputs to the combined input sequence.

Figure 20:
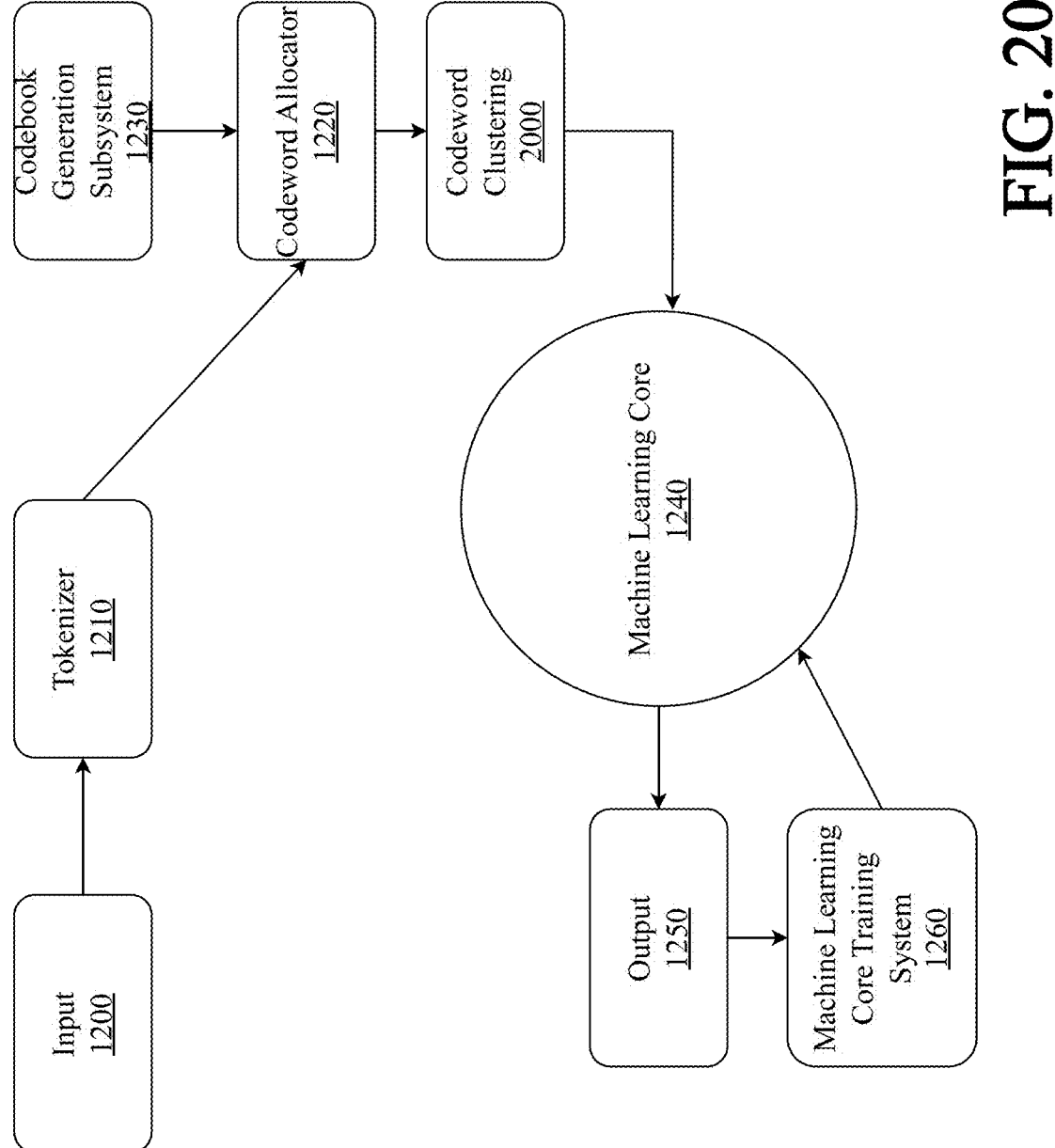
FIG. 20 is a block diagram illustrating an exemplary embodiment of a large codeword model which uses codeword clustering.

FIG. 20 is a block diagram illustrating an exemplary embodiment of a large codeword model which uses codeword clustering. This approach aims to capture semantic similarities and relationships among codewords, enabling more efficient and meaningful representations for downstream processing.

The system starts with an input 1200, which receives the raw data that needs to be processed. This data can be in various formats, such as text, images, audio, or any other structured or unstructured data. The input data is then passed to a tokenizer 1210, which is responsible for tokenizing the raw data into a sequence of smaller units called sourceblocks. The tokenization process depends on the specific data type and can involve techniques like subword tokenization, byte-pair encoding, or domain-specific tokenization methods.

After tokenization, the sourceblocks are sent to a codeword allocator 1220. The codeword allocator 1220 assigns a unique codeword to each sourceblock based on a predefined codebook generated by a codebook generation subsystem 1230. The codebook is a mapping between sourceblocks and their corresponding codewords, which are compact and discrete representations of the sourceblocks. The codebook generation subsystem 1230 uses techniques like frequency-based coding, hash functions, or learned mappings to generate the codebook.

The assigned codewords are then passed to the codeword clustering 2000 component, which groups semantically similar or related codewords together based on their co-occurrence patterns or semantic proximity in the training data. This clustering process aims to capture the underlying semantic structure and relationships among the codewords. Various clustering algorithms can be employed in the codeword clustering 2000 component, such as k-means clustering, hierarchical clustering, or density-based clustering. The choice of the clustering algorithm depends on the specific characteristics of the data and the desired granularity of the clusters. The clustering process takes into account the semantic similarity between codewords, which can be measured using techniques like cosine similarity, Euclidean distance, or other similarity metrics.

Once the codewords are clustered, the system learns individual vector embeddings for each cluster of codewords, rather than learning embeddings for individual codewords. This approach reduces the dimensionality of the embedding space and allows for more efficient representation learning. The clustered codewords are mapped to dense vector representations in a continuous vector space, capturing the semantic and syntactic information of the codewords within each cluster.

The vector embeddings of the clustered codewords may then processed by the machine learning core 1240. The machine learning core 1240 is responsible for learning and generating meaningful representations and outputs based on the input codeword embeddings. It can consist of various architectures, such as Transformer models, recurrent neural networks, or convolutional neural networks, depending on the specific task and data type. An output 150 is generated by the machine learning core 1240 and is based on the processed codeword embeddings from the machine learning core 1240. The output can be in various formats, such as text, images, or any other desired representation, depending on the specific application.

The incorporation of codeword clustering before vector embedding in the LCM architecture brings several benefits.

By grouping semantically similar codewords together, the system can learn more meaningful and compact representations, reducing the dimensionality of the embedding space. This can lead to improved efficiency in terms of memory and computational resources. Moreover, the clustered codeword embeddings can capture higher-level semantic concepts and relationships, enabling the system to generalize better to unseen or rare codewords. The clustering process helps in handling data sparsity and can improve the robustness and interpretability of the learned representations.

FIG. 21 is a flow diagram illustrating an exemplary method for language translation using a large codeword model for deep learning. In a first step 2100, collect a plurality of inputs in a first language. These inputs can be in various forms, such as text, speech, or any other language-based data. The first language represents the source language from which the translation will be performed.

In a step 2110, the collected inputs in the first language are tokenized into a plurality of sourceblocks. Tokenization is performed by the tokenizer component of the LCM architecture, which splits the input data into meaningful semantic units called sourceblocks. The tokenizer employs language-specific techniques to capture the linguistic structure and patterns of the first language. This may involve using subword tokenization methods like Byte-Pair Encoding (BPE) or WordPiece, or language-specific tokenization rules based on the grammatical and morphological properties of the first language.

In a step 2120, each sourceblock in the first language is assigned a codeword based on a first language codebook. The LCM architecture maintains a plurality of codebooks, each configured for a specific language. The first language codebook is a dictionary that maps sourceblocks in the first language to their corresponding codewords. Codewords are discrete, compressed representations of the sourceblocks, designed to capture the essential linguistic information in a compact form. The codeword assignment can be based on various techniques, such as frequency-based coding, hash functions, or learned mappings specific to the first language.

In a step 2130, the assigned first language codewords are then processed through a first language machine learning core. The first language machine learning core is a specialized component of the LCM architecture that is trained specifically on the first language. It learns to map input codeword sequences in the first language to output codeword sequences, capturing the linguistic patterns, relationships, and semantics of the first language. The first language machine learning core can be implemented using various configurations, such as a Transformer-based core, a Variational Autoencoder (VAE)-based core, or a combination of different architectures, tailored to the characteristics of the first language.

The first language machine learning core generates a first language codeword response. This response represents the output of the LCM in the first language, encoded as a sequence of codewords.

In a step 2140, a codeword translated is used to translate the first language codeword response into the desired language. The codeword translator is a component of the LCM architecture that maps codewords from the first language codebook to codewords in the desired language codebook. It learns the mappings between codewords across different languages, enabling cross-lingual translation. The codeword translator can be implemented using various techniques, such as neural machine translation models, cross-lingual word embeddings, or learned mapping functions.

The codeword translator converts the first language codeword response into a desired language codeword response. This response represents the translated output in the desired language, encoded as a sequence of codewords from the desired language codebook.

In a step 2150, the desired language codeword response is processed through a desired language machine learning core. The desired language machine learning core is another specialized component of the LCM architecture, trained specifically on the desired language. It learns to map input codeword sequences in the desired language to output sequences in the same language, capturing the linguistic patterns and semantics of the desired language. The desired language machine learning core generates a full desired language response which represents the final translated output in the desired language.

The method described provides a framework for using LCMs as translators between different languages. By maintaining language-specific codebooks and machine learning cores, the LCM can effectively capture the linguistic properties and nuances of each language. The codeword translator acts as a bridge between the different language representations, enabling cross-lingual translation. The modular nature of the LCM architecture allows for flexibility and scalability in handling multiple languages. New languages can be added by creating language-specific codebooks and training corresponding machine learning cores. The codeword translator can be extended to support translation between multiple language pairs, enabling a versatile and efficient translation system.

FIG. 22 is a flow diagram illustrating an exemplary method for codeword clustering using a large codeword model. In a step 2200, collect a plurality of inputs. These inputs can be from various sources and modalities, such as text, images, audio, time series, or any other structured or unstructured data. The inputs represent the data that needs to be processed by the LCM.

In a step 2210, the collected inputs are tokenized into a plurality of sourceblocks. Tokenization is performed by the tokenizer component of the LCM architecture, which splits the input data into meaningful semantic units called sourceblocks. The tokenizer employs techniques specific to each input modality to capture the relevant patterns and structures. For textual data, this may involve using subword tokenization methods like Byte-Pair Encoding (BPE) or WordPiece. For other modalities, such as images or audio, the tokenizer may use domain-specific techniques to extract relevant features or segments.

In a step 2220, each sourceblock is assigned a codeword based on a codebook. The codebook is a dictionary that maps sourceblocks to their corresponding codewords. Codewords are discrete, compressed representations of the sourceblocks, designed to capture the essential information in a compact form. The codeword assignment can be based on various techniques, such as frequency-based coding, hash functions, or learned mappings.

In a step 2230, the assigned codewords are then clustered based on their semantic similarity or co-occurrence patterns in the training data. Codeword clustering is a technique that groups semantically related or frequently co-occurring codewords together. This clustering process aims to capture the underlying semantic structure and relationships among the codewords. Various clustering algorithms can be employed, such as but not limited to k-means clustering, hierarchical clustering, or topic modeling techniques like Latent Dirichlet Allocation (LDA). The clustering algorithm takes into account the semantic similarity between codewords, which can be determined using measures like cosine similarity or semantic embeddings learned from the training data.

In a step 2240, a single embedding vector is learned for each codeword cluster. The embedding vector represents the shared semantic representation of the codewords within a cluster. By learning embeddings at the cluster level, the LCM can capture the high-level semantic concepts and relationships among the codewords. The embedding vectors are typically learned using techniques like word2vec, GloVe, or other embedding learning algorithms. These algorithms leverage the co-occurrence patterns and semantic similarities of the codewords within the clusters to learn dense, continuous vector representations.

In a step 2250, the learned embedding vectors for the codeword clusters are then processed through the machine learning core of the LCM. The machine learning core can be implemented using various architectures, such as a Transformer-based core, a Variational Autoencoder (VAE)-based core, or a combination of different models. The machine learning core takes the embedding vectors as input and learns to map them to the desired output. It captures the patterns, relationships, and semantics encoded in the embedding vectors to generate meaningful and coherent outputs. The machine learning core generates an output based on the processed embedding vectors. The output can be in the form of codewords, which are then mapped back to the corresponding sourceblocks or tokens using the codebook. Alternatively, the output can be directly generated in the target modality, such as text, images, or any other desired format, depending on the specific application.

The method described provides a framework for using an LCM with codeword clustering and learned embedding vectors. By clustering semantically similar or co-occurring codewords together and learning a single embedding vector for each cluster, the LCM can capture high-level semantic concepts and relationships among the codewords. This approach reduces the dimensionality of the embedding space and allows for more efficient processing and storage of the learned representations. Codeword clustering and embedding learning offer several advantages. It enables the LCM to capture semantic similarities and relationships among codewords, leading to more meaningful and coherent outputs. By learning embeddings at the cluster level, the LCM can generalize better to unseen or rare codewords, as they can be associated with the nearest cluster embedding. Additionally, the reduced dimensionality of the embedding space can lead to faster training and inference times, as well as lower memory requirements.

The specific implementation details, such as the choice of clustering algorithm, embedding learning technique, and machine learning core architecture, can be adapted based on the characteristics of the data and the desired output. The modular nature of the LCM architecture allows for flexibility in incorporating different clustering and embedding learning approaches. By leveraging codeword clustering and learned embedding vectors, the LCM can capture semantic relationships and generate more meaningful and coherent outputs. This approach has potential applications in various domains, such as natural language processing, information retrieval, and content generation, among others. It can lead to improved performance, generalization, and efficiency in processing and generating data using LCMs.

FIG. 23 is a flow diagram illustrating an exemplary method for a large codeword model for deep learning using a dual embedding layer. In a first step 2300, collect a plurality of inputs. These inputs can be from various sources and plurality of inputs. These inputs can be from various sources and modalities, such as text, images, audio, time series, or any other structured or unstructured data. The inputs represent the data that needs to be processed by the LCM.

In a step 2310, the collected inputs are tokenized into a plurality of sourceblocks. Tokenization is performed by the tokenizer component of the LCM architecture, which splits the input data into meaningful semantic units called sourceblocks. The tokenizer employs techniques specific to each input modality to capture the relevant patterns and structures. For textual data, this may involve using subword tokenization methods like Byte-Pair Encoding (BPE) or WordPiece. For other modalities, such as images or audio, the tokenizer may use domain-specific techniques to extract relevant features or segments.

In a step 2320, each sourceblock is assigned a codeword based on a codebook. The codebook is a dictionary that maps sourceblocks to their corresponding codewords. Codewords are discrete, compressed representations of the sourceblocks, designed to capture the essential information in a compact form. The codeword assignment can be based on various techniques, such as frequency-based coding, hash functions, or learned mappings.

In a step 2330, the assigned codewords are then passed through a plurality of embedding layers. Unlike traditional transformer architectures that use a single embedding layer, this modified LCM architecture employs multiple embedding layers, each configured to receive a different kind of input. Each embedding layer learns a dense vector representation specific to its corresponding input modality. For example, there can be separate embedding layers for text, images, audio, and other input types. The embedding layers capture the semantic and structural information of the input codewords in a continuous vector space.

In a step 2340, the embeddings from the different input modalities are then concatenated to form a single combined input sequence. This concatenation process brings together the learned representations from each embedding layer, creating a unified representation that captures the information from all input modalities. The combined input sequence represents a multi-modal representation of the input data.

In a step 2350, the combined input sequence is then processed through the remaining portion of the machine learning core. This remaining portion can include various components, such as self-attention mechanisms, feedforward layers, and output layers, depending on the specific architecture of the LCM. The machine learning core learns to map the combined input sequence to the desired output, capturing the relationships and interactions between the different input modalities.

In a step 2350, the machine learning core generates an output based on the processed combined input sequence. The output can be in the form of codewords, which are then mapped back to the corresponding sourceblocks or tokens using the codebook. Alternatively, the output can be directly generated in the target modality, such as text, images, or any other desired format, depending on the specific application.

The method provides a framework for using a modified LCM architecture with multiple embedding layers to handle diverse input modalities. By employing separate embedding layers for each input type, the LCM can learn specialized representations that capture the unique characteristics and patterns of each modality. The concatenation of these embeddings allows for a unified processing of the multi-modal input, enabling the LCM to learn and generate outputs that leverage the combined information from all input sources.

The specific implementation details of the embedding layers and the remaining portion of the machine learning core can be adapted based on the requirements of the application and the characteristics of the input data. The modular nature of this modified LCM architecture allows for customization and extension to incorporate additional input modalities or processing components as needed.

By leveraging the power of multiple embedding layers and the combined processing of multi-modal inputs, this modified LCM architecture opens up new possibilities for building deep learning models that can handle diverse data types and generate rich, multi-modal outputs. It has potential applications in various domains, such as multimedia content generation, cross-modal retrieval, and multi-modal reasoning, among others.

Figure 24:
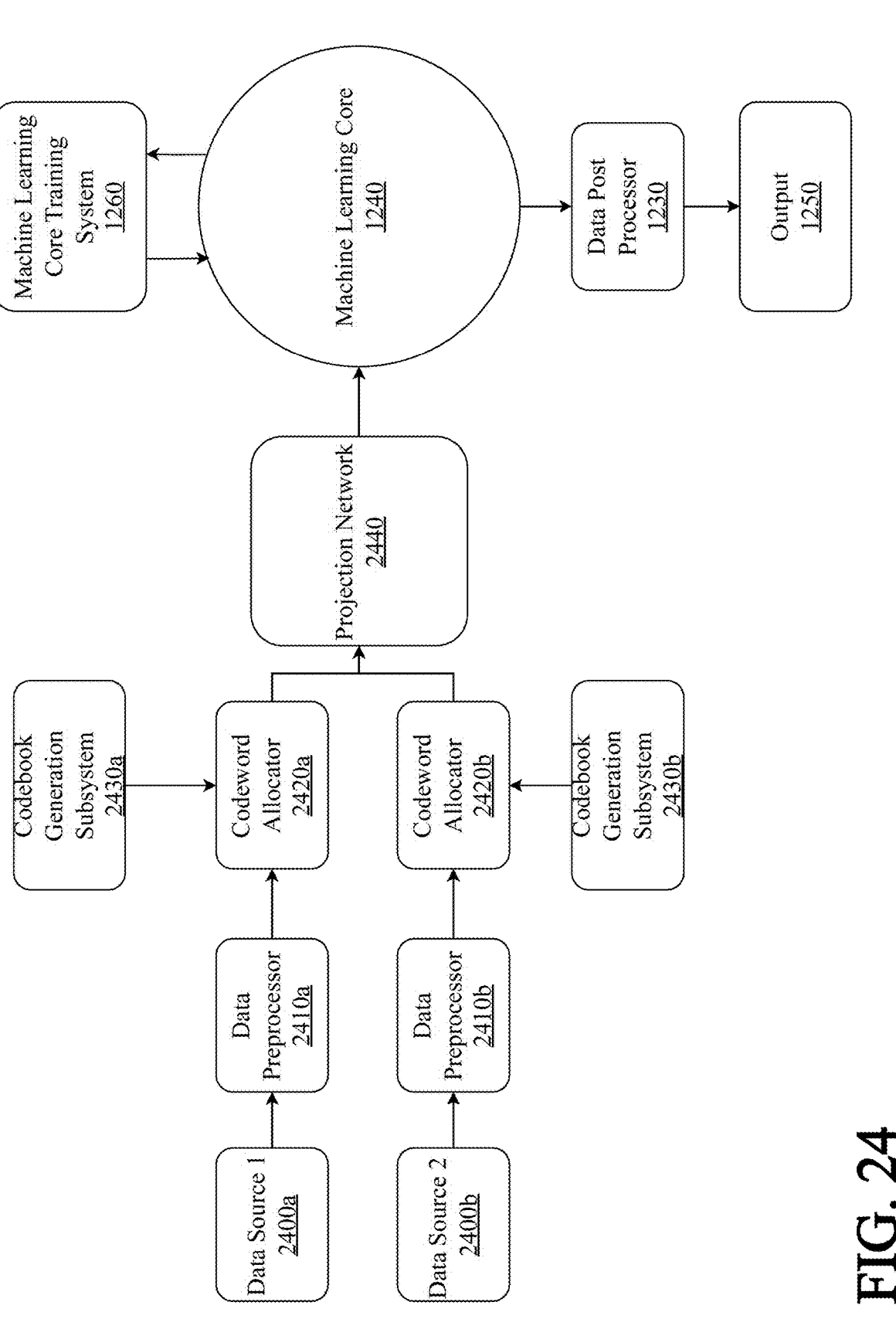
FIG. 24 is a block diagram illustrating an exemplary system architecture for a compound large codeword model.

FIG. 24 is a block diagram illustrating an exemplary system architecture for a compound large codeword model. The system begins with a plurality of data sources. In the illustrated example, data source 1 2400a and data source 2 2400b, may represent different types of financial information. Each data source feeds into its own data preprocessor (2410a and 2410b respectively), where the raw data is cleaned, normalized, and prepared for further processing. This preprocessing stage important for handling the diverse nature of financial data, ensuring that both textual news data and numerical trading data are appropriately formatted for the subsequent stages.

Following preprocessing, the data from each source is passed through separate codebook generation subsystems (2430a and 2430b). These subsystems are responsible for creating and maintaining codebooks that map the preprocessed data to unique codewords. The codebook generation process may be adaptive, where codebooks are continuously updating to reflect changing market conditions and emerging patterns in the financial data. This adaptive nature allows the system to remain responsive to new trends and shifts in the market, ensuring that the codewords used are always relevant and informative.

The preprocessed data, along with the generated codebooks, is then fed into codeword allocators (2420a and 2420b). These allocators assign appropriate codewords to the incoming data based on the current codebooks. This effectively compresses the complex financial information into discrete, efficient representations that capture the essential characteristics of the data.

A key component of this compound LCM is a projection network 2440, which serves as a fusion mechanism for the different types of codewords. Projection network 2440 is designed to process and combine codewords from both textual and numerical data, creating a unified representation that captures the interrelationships between these different data types. Projection network 2440 allows the system to leverage both the sentiment and factual information from news alongside the quantitative data from trading, providing a more comprehensive view of the financial landscape.

The fused data from the projection network is then processed by machine learning core 1240. It's important to note that this core can be implemented as a latent transformer core, as described in FIG. 1C. The latent transformer architecture is particularly well-suited for this task as it can efficiently handle the compressed codeword representations without the need for embedding or positional encoding layers. Machine learning core 1240 is responsible for learning complex patterns and relationships within the fused data, enabling the system to make accurate predictions and insights about future market behavior.

The system also includes a machine learning core training system 1260, which continuously optimizes the performance of machine learning core 1240. Machine learning core training system 1260 allows the model to adapt to changing market dynamics and improve its predictive capabilities over time. It may employ techniques such as multi-horizon prediction to forecast prices over various time frames simultaneously.

After processing by the machine learning core, the data passes through a data post processor 1230. This component is responsible for interpreting the output of the machine learning core, potentially incorporating uncertainty quantification to provide confidence intervals for predictions. It may also implement explainable AI features to provide insights into the model's decision-making process.

The system produces an output 1250, which could include short-term price predictions for relevant securities, along with associated confidence levels. This output is designed to be actionable for financial decision-makers, providing them with comprehensive, data-driven insights that combine information from both news and trading data sources. Financial information is just one example of the kind of data a compound large codeword model can synthesize into accurate, real-time time series predictions. Through the use of projection network 2440, various data types can be synthesized together allowing machine learning core 1240 to make more accurate insights.

Throughout the entire process, the system maintains the ability to handle cross-asset interactions, capturing relationships between different securities or asset classes. It also employs dynamic feature importance, adjusting the weighting of news versus trading data based on current market conditions. This compound LCM system represents a sophisticated approach to financial data analysis, capable of processing diverse data types and producing nuanced, context-aware predictions in real-time.

Figure 25:
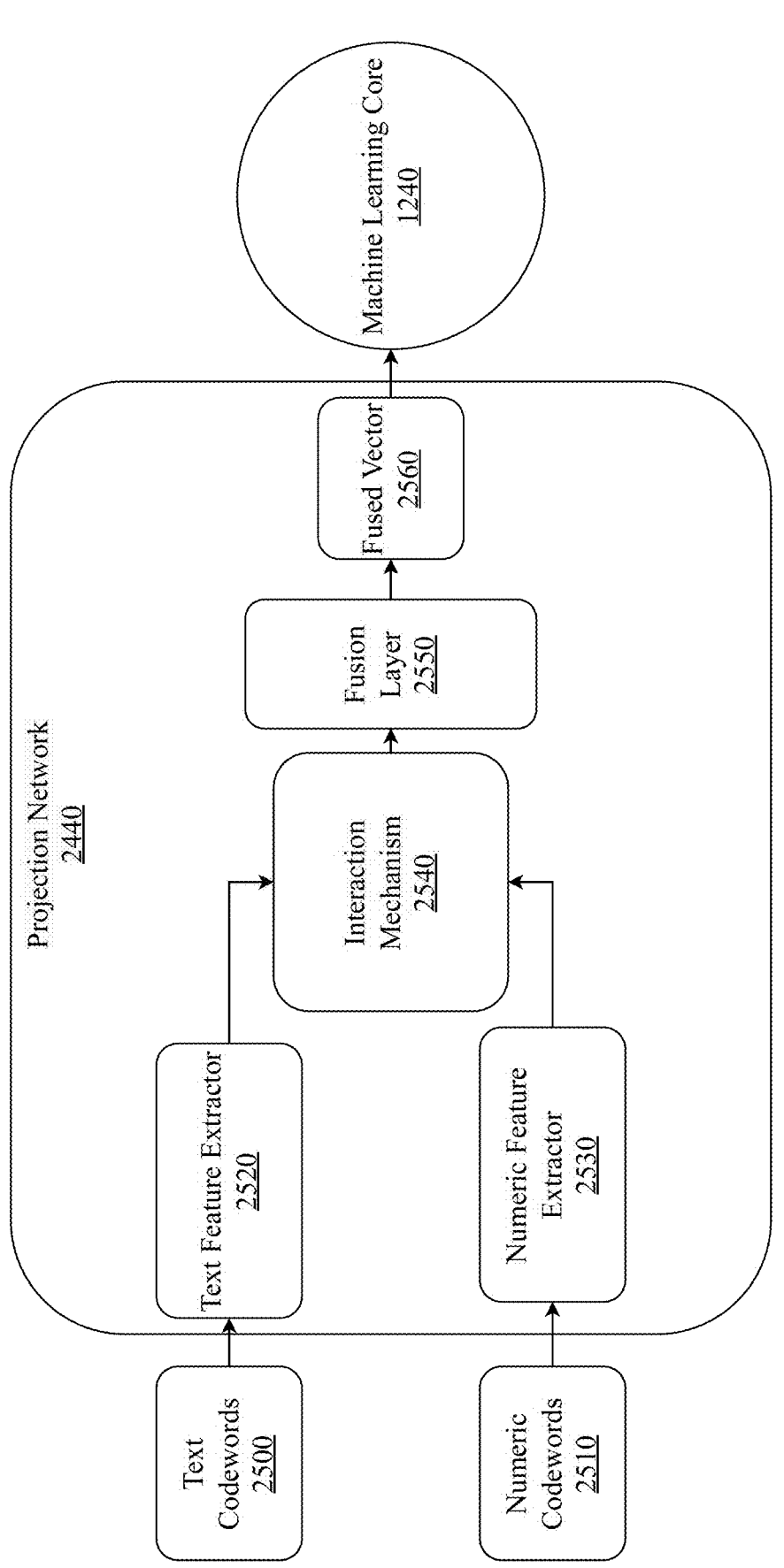
FIG. 25 is a block diagram illustrating an exemplary component of a system for real-time time series forecasting using a compound large codeword model, a projection network.

FIG. 25 is a block diagram illustrating an exemplary component of a system for real-time time series forececasting using a compound large codeword model, a projection network. Projection network 2440 serves as the bridge between the codeword allocators and machine learning core 1240, which may be implemented as a latent transformer core as described in FIG. 1C. Projection network 2440 is specifically designed to handle and fuse multiple different types of data inputs, for example, text inputs and numeric inputs.

Text codewords 2500 enter the network and are first processed by a text feature extractor 2520. Text feature extractor 2520 may be tailored to extract relevant features from the compressed representations of textual data, capturing semantic and sentiment information from the data source. Concurrently, numeric codewords 2510 are fed into a numeric feature extractor 2530, which is optimized to identify patterns and trends from numerical data sources. These feature extractors operate directly on the codeword representations, maintaining the efficiency and compactness of the LCM approach without reverting to deep embeddings.

An interaction mechanism 2540 allows for direct interplay between the text and numeric features. This mechanism enables the system to capture complex relationships between text and numeric data, a crucial capability in areas such as, but not limited to financial forecasting. For instance, interaction mechanism 2540 may learn how specific types of news events correlate with particular trading patterns across various assets or sectors.

The outputs from both feature extractors and the interaction mechanism are then combined in the fusion layer 2550.

Fusion layer 2550 is responsible for synthesizing all the extracted information into a unified representation. The fusion process is adaptive, potentially giving different weights to news and trading data based on current market conditions or the specific prediction task at hand. The result of this multi-step process is a fused vector 2560, which serves as the input to machine learning core 1240. This fused vector 2560 is a rich, compact representation that encapsulates both the textual and numerical aspects of the various input data types, along with their interactions. By providing this comprehensive input to the machine learning core 1240, the projection network enables the system to make nuanced, context-aware predictions.

The utilization of projection network 2440 offers a variety of enhanced real world applications. For example, projection network 2440 effectively handles the synchronization of news snippets and trading data, ensuring that relevant information from both sources is correctly aligned and integrated. The network's ability to process both text and numeric codewords simultaneously allows for efficient multi-modal learning, capturing the full spectrum of available financial information. Additionally, projection network's 2440 architecture supports the system's ability to predict future prices for all securities included in the training dataset within a short-term time window. During inference, as new financial news and trading data feed into the system, they are processed through this projection network, allowing the trained latent transformer model to generate near-term price action predictions for all relevant securities.

In another example, interaction mechanism 2540 could be extended to incorporate attention visualization, providing insights into which news snippets and trading data points are most influential for each prediction. The fusion layer could be designed to support multi-horizon prediction, enabling the system to forecast prices over multiple time frames simultaneously.

By serving as an intelligent intermediary between the raw codeword inputs and the sophisticated machine learning core, projection network 2440 plays a role in the compound LCM's ability to process and analyze complex financial data. It enables the system to leverage the strengths of both textual and numerical data, creating a unified representation that captures the intricate dynamics of financial markets. This approach positions the compound LCM as a powerful tool for real-time financial analysis and prediction, capable of adapting to the ever-changing landscape of global markets.

Figure 26:
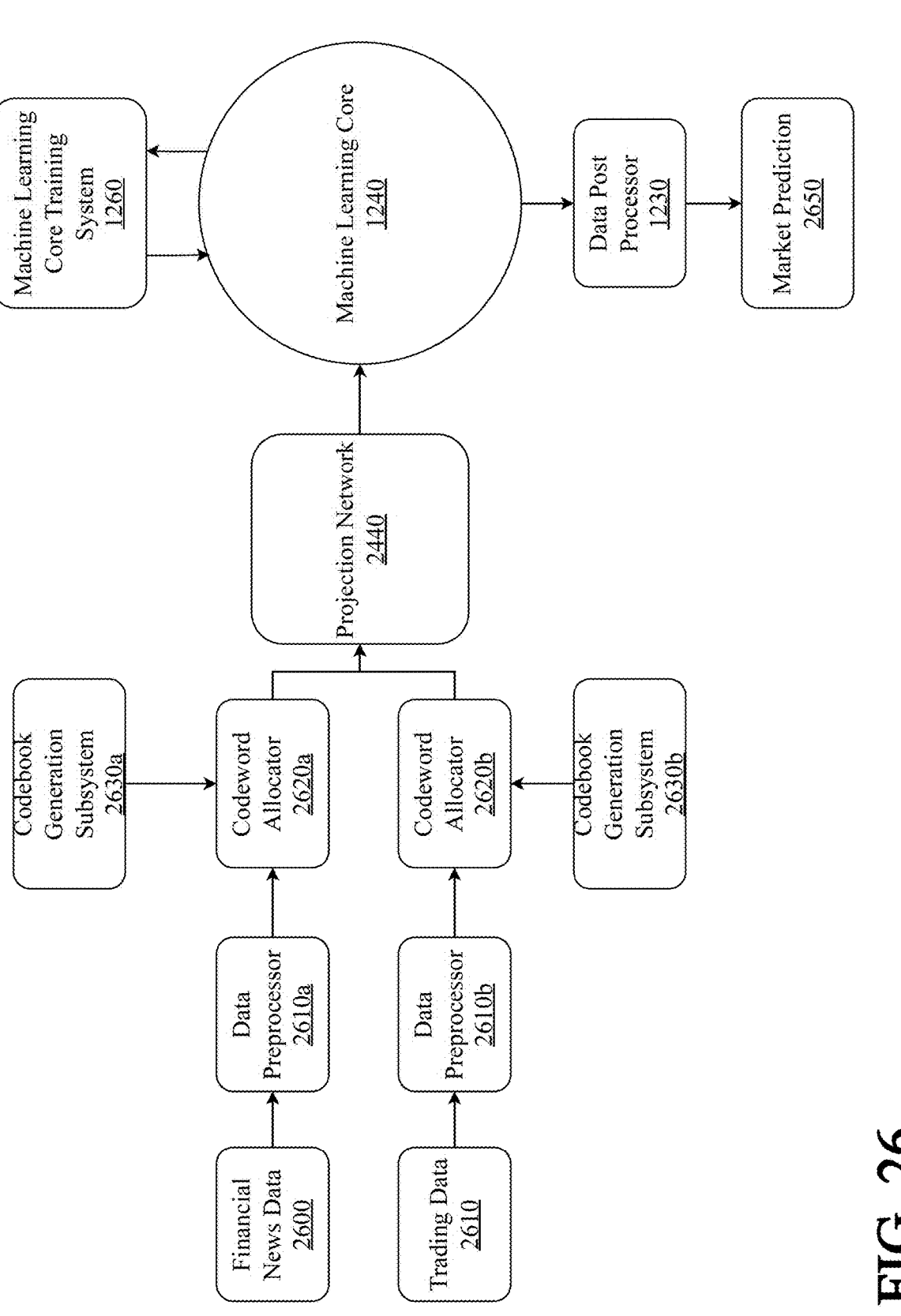
FIG. 26 is a block diagram illustrating an exemplary system architecture for a compound large codeword model that processes financial data.

FIG. 26 is a block diagram illustrating an exemplary system architecture for a compound large codeword model that processes financial data. The system may ingest a plurality of various data types, including but not limited to financial news data 2600 and trading data 2610, representing the dual nature of information that influences financial markets.

Financial news data 2600 encompasses a wide range of textual information, including real-time news snippets, financial reports, and social media sentiment related to markets and specific securities. This data first passes through data preprocessor 2610a which cleanses the text, performs sentiment analysis, and extracts key financial entities and events. Simultaneously, the trading data 2610, which includes time series of price movements, volume information, and other quantitative market indicators, is processed through its own data preprocessor 2610b. This preprocessing stage normalizes the numerical data, handles missing values, and potentially creates derived features such as moving averages or volatility measures.

Both preprocessed data streams then flow into their respective codebook generation subsystems (2630*a* and 2630*b*). For the news data 2600, the codebook might encode common financial phrases, sentiment indicators, or event types. The trading data codebook could represent different market patterns, trend indicators, or volatility regimes. These codebooks may be continuously updated to reflect emerging market trends, new financial products, or shifts in trading behavior.

Codeword allocators (2620*a* and 2620*b*) then assign appropriate codewords to the incoming preprocessed data. This step effectively compresses the complex financial information into discrete, efficient representations. For instance, a series of positive news articles about a company's earnings might be encoded into a single codeword representing "strong positive earnings sentiment," while a particular pattern in a stock's price movement could be encoded as "bullish breakout pattern."

Projection network 2440 serves as a fusion mechanism, combining the codewords from both news and trading data. This network is designed to capture the intricate relationships between market sentiment derived from news and actual market behaviors observed in trading data. For example, it might learn how certain types of news events typically precede specific market movements, or how the impact of news varies depending on the current market regime.

The fused data from the projection network is then processed by machine learning core 1240, which can be implemented as a latent transformer core. This core is specially trained to identify complex patterns in financial data and make predictions about future market behavior. It might recognize, for instance, how a combination of positive sentiment in news, increased trading volume, and a particular price pattern often precedes a market rally. Machine learning core training system 1260 continuously optimizes the core's performance using historical market data and the outcomes of past predictions. This allows the system to adapt to changing market dynamics, such as shifts in the relationships between news sentiment and price movements during different economic cycles.

After processing by the machine learning core, the data passes through a data post processor 1230. In the context of financial predictions, this component might apply risk adjustments, incorporate market-specific constraints (such as trading hours or circuit breakers), or align the predictions with specific trading strategies. The system produces market predictions 2650. These could include short-term price forecasts for individual securities, predictions of market-wide movements, or alerts for potential significant events. The predictions might also include confidence intervals, providing traders or investors with a sense of the forecast's reliability.

Throughout this process, the system leverages its ability to handle cross-asset interactions, capturing how events in one market sector might influence others. For instance, it could recognize how currency fluctuations might impact export-oriented stocks, or how commodity price changes could affect related industries.

The compound LCM's architecture allows it to process vast amounts of financial data in real-time, continuously updating its predictions as new information becomes available. This makes it particularly suited for high-frequency trading environments or for providing real-time market insights to financial analysts. The system's use of codewords and the latent transformer architecture enables it to efficiently handle the high dimensionality and complexity of financial data. It can capture subtle patterns and relationships that might be overlooked by traditional analysis methods, potentially identifying novel predictive signals in the market. By fusing textual and numerical financial data in this sophisticated manner, the compound LCM system aims to provide a more comprehensive and nuanced view of market dynamics, enabling more accurate and timely market predictions. This approach positions the system as a powerful tool for financial decision-making in the fast-paced and complex world of modern financial markets.

Figure 27:
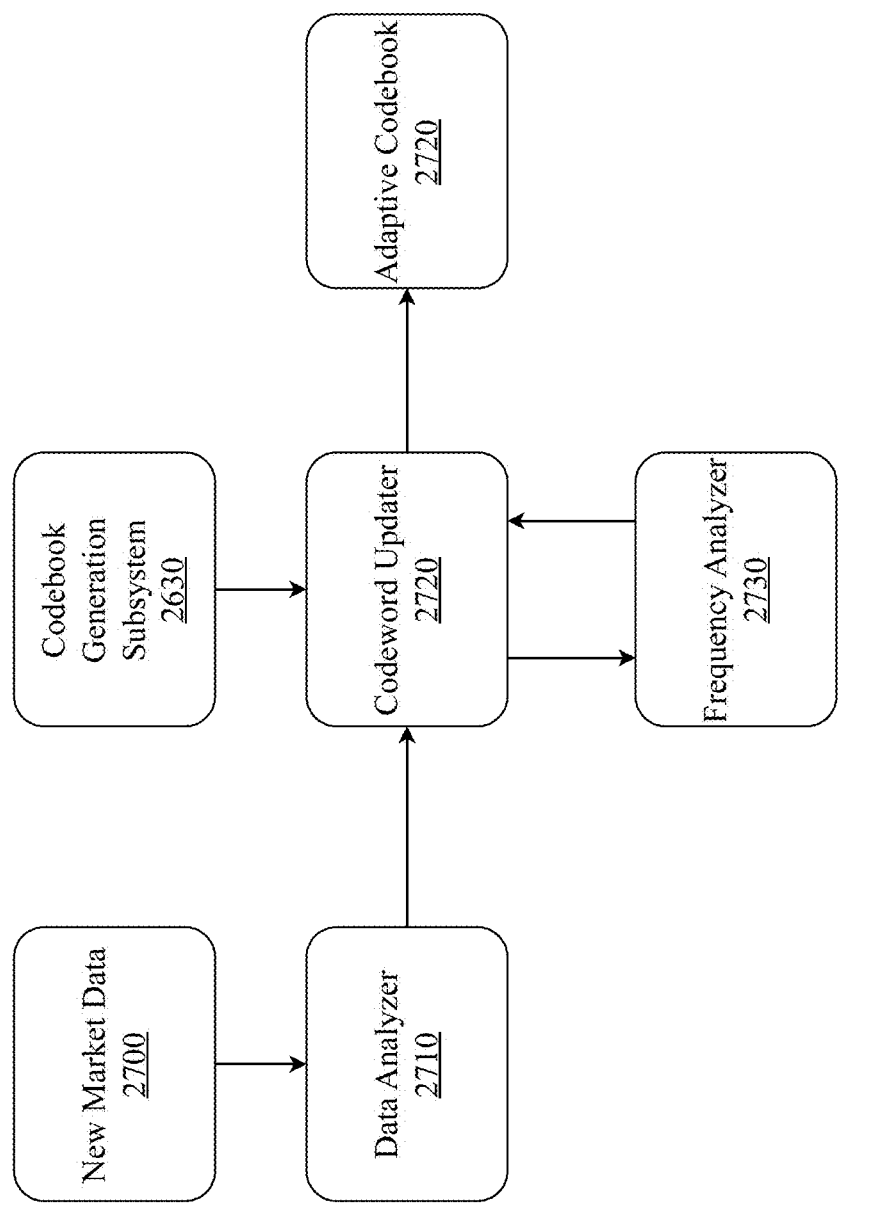
FIG. 27 is a block diagram illustrating an exemplary system architecture for a compound large codeword model with adaptive codeword generation.

FIG. 27 is a block diagram illustrating an exemplary system architecture for a compound large codeword model with adaptive codeword generation. In one embodiment, an adaptive codebook generation system improves the model's ability to maintain relevance and accuracy in the fast-paced and ever-evolving financial markets. The system receives new market data 2700, which could encompass a wide range of financial information including real-time trading data, breaking news, economic indicators, and social media sentiment related to financial markets. This continuous stream of data is essential for keeping the model attuned to the latest market trends and events.

The new market data is first processed by the data analyzer 2710. This component is responsible for identifying significant changes or emerging patterns in the incoming data. For financial markets, this could involve detecting new trading patterns, recognizing shifts in market sentiment, or identifying the emergence of new financial instruments or market sectors. The data analyzer employs sophisticated algorithms to distinguish between noise and meaningful market signals, ensuring that only relevant information influences the codebook. Concurrently, a frequency analyzer 2730 monitors the usage patterns of existing codewords within the system. In the context of financial data, this component tracks how often certain market patterns, news topics, or trading signals are being represented by the current set of codewords. This analysis is crucial for identifying which codewords are most relevant to current market conditions and which may have become obsolete.

The outputs from both the data analyzer and the frequency analyzer feed into the codeword updater 2720. This is where the adaptive nature of the system truly comes into play. The codeword updater performs a plurality of functions. It generates new codewords to represent emerging market patterns or financial events that are not adequately captured by the existing codebook. For instance, if a new type of cryptocurrency gains prominence, or if a novel trading strategy becomes popular, new codewords would be created to represent these phenomena.

Codeword updater 2720 modifies existing codewords to better reflect evolving market dynamics. This could involve adjusting the parameters of a codeword representing a particular market trend to account for changes in its typical duration or intensity. Additionally, the codeword updated 2720 prunes outdated or rarely used codewords from the codebook. In rapidly changing financial markets, certain patterns or indicators may lose their relevance over time. Removing these obsolete codewords helps maintain the efficiency and relevance of the codebook.

The result of this process is an adaptive codebook 2720 that evolves in real-time to reflect the current state of financial markets. This adaptive codebook 2720 is then used by the broader compound LCM system to encode incoming financial data, ensuring that the machine learning core always works with the most up-to-date and relevant representations of market conditions.

The adaptive nature of this codebook generation subsystem is particularly valuable in financial contexts where new factors can quickly become significant market drivers. For example, during a financial crisis, the system could rapidly develop new codewords to represent emergency policy measures or unusual market behaviors. Similarly, it could quickly adapt to represent the market impact of global events, emerging technologies, or shifts in investor behavior. By continuously updating the codebook based on new market data, this subsystem enables the compound LCM to maintain high predictive accuracy even as market conditions change. It allows the model to capture nuanced and evolving relationships between various financial indicators and market outcomes, potentially identifying predictive signals that might be missed by more static analysis methods.

Moreover, adaptive codebook 2720 serves as a form of dimensionality reduction, compressing the vast and complex world of financial data into a more manageable set of codewords. This not only makes the subsequent machine learning processes more efficient but also potentially more interpretable, as each codeword represents a meaningful financial concept or pattern. In the context of the broader compound LCM system, this adaptive codebook generation subsystem ensures that the model remains responsive to the dynamic nature of financial markets. It enables the system to continuously refine its understanding of market dynamics, potentially leading to more accurate and timely financial predictions. This adaptive capability is crucial for any system aiming to provide reliable insights in the complex and rapidly changing landscape of global financial markets.

FIG. 28 is a flow diagram illustrating an exemplary method for a compound large codeword model. In a first step 2800, the system collects data from multiple sources. This step is crucial for gathering a diverse range of financial information, including real-time financial news snippets and trading data. The inclusion of both textual and numerical data allows the system to capture a holistic view of the market, considering both sentiment-driven factors and quantitative market indicators.

In a step 2810, the collected data is preprocessed separately for each source, depending on the data type. This step involves cleaning, normalizing, and formatting the data to ensure it's suitable for further processing. For financial news data, this might include natural language processing techniques to extract key information and sentiment. For trading data, it could involve normalizing price data, calculating technical indicators, or handling missing values. In a step 2820, the system generates codebooks for each data type using a specialized codebook generator. This step is critical for creating efficient, compressed representations of the financial data. The codebook generator is adaptive, continuously updating to reflect changing market conditions and emerging patterns. This ensures that the codewords used are always relevant and informative, capturing the latest trends in both news sentiment and market behavior.

In a step 2830, codewords are allocated to the preprocessed data. This step effectively compresses the complex financial information into discrete, efficient representations. For instance, a series of positive news articles about a company's earnings might be encoded into a single codeword, while a particular pattern in a stock's price movement could be encoded as another codeword.

In a step 2840, the allocated codewords from each data type are processed through a projection network to create a single vector representing each data type. The projection network allows for the integration of textual data (from news) and numerical data (from trading), creating a unified representation that captures the interrelationships between these different data types.

In a step 2850, the projected data is processed through a machine learning core. This core can be implemented as a latent transformer, as mentioned in FIG. 1C. The latent transformer architecture is particularly well-suited for this task as it can efficiently handle the compressed codeword representations without the need for embedding or positional encoding layers. This step involves learning complex patterns and relationships within the fused data, enabling the system to make accurate predictions about future market behavior.

In a step 2860, the system outputs the generated results. These results could include short-term price predictions for relevant securities, along with associated confidence levels. The output is designed to be actionable for financial decision-makers, providing comprehensive, data-driven insights that combine information from both news and trading data sources. This method enables the compound LCM system to process vast amounts of diverse financial data in real-time, continuously updating its predictions as new information becomes available. By fusing textual and numerical financial data in this sophisticated manner, the system aims to provide a more comprehensive and nuanced view of market dynamics, enabling more accurate and timely market predictions.

FIG. 29 is a flow diagram illustrating an exemplary method for a compound large codeword model that processes financial data. In a first step 2900, the system collects real-time financial news snippets and trading data. This step is crucial for capturing the dual nature of information that influences financial markets. The financial news snippets provide qualitative, sentiment-driven data that can affect market behavior, while the trading data offers quantitative insights into actual market movements. By collecting both types of data in real-time, the system ensures it has the most up-to-date information for making predictions.

In a step 2910, the system preprocesses the news data (text) and trading data (numeric) separately. For the news data, preprocessing might involve natural language processing techniques such as tokenization, sentiment analysis, and entity recognition to extract key financial information from the text. For the trading data, preprocessing could include normalization of price data, calculation of technical indicators, and handling of any missing values or outliers.

In a step 2920, the system generates and updates codebooks for both the news and trading data. The codebooks may be continuously updated to reflect emerging market trends, new financial products, or shifts in trading behavior. For news data, the codebook might encode common financial phrases, sentiment indicators, or event types. For trading data, it could represent different market patterns, trend indicators, or volatility regimes.

In a step 2930, codewords are allocated to the preprocessed news and trading data. This step effectively compresses the complex financial information into discrete, efficient representations. For instance, a series of positive news articles about a company's earnings might be encoded into a single codeword representing "strong positive earnings sentiment," while a particular pattern in a stock's price movement could be encoded as "bullish breakout pattern."

In a step 2940, the allocated codewords from each data type are processed through a projection network to create a single vector representing each data type. The projection network allows for the integration of news sentiment and trading patterns, creating a unified representation that captures the interrelationships between these different data types. This fusion enables the system to understand how news events might correlate with or influence trading patterns.

In a step 2950, the projected data is processed through a machine learning core. This core, which can be implemented as a latent transformer as described in FIG. 1C, is specially trained to identify complex patterns in financial data. It leverages the fused representations to recognize intricate relationships between news sentiment, trading patterns, and market outcomes. The latent transformer architecture is particularly effective at processing these compressed codeword representations efficiently.

In a step 2960, the system generates short-term predictions based on the processed market and trading data. These predictions could include price forecasts for individual securities, predictions of market-wide movements, or alerts for potential significant events. The predictions are designed to be actionable for traders or investors, potentially including confidence intervals to provide a sense of the forecast's reliability. This method enables the compound LCM system to process vast amounts of diverse financial data in real-time, continuously updating its predictions as new information becomes available. By fusing textual news data with numerical trading data in this sophisticated manner, the system aims to provide a more comprehensive and nuanced view of market dynamics. This approach positions the system as a powerful tool for making accurate and timely short-term market predictions, capable of capturing subtle patterns and relationships that might be overlooked by traditional analysis methods.

Figure 30:
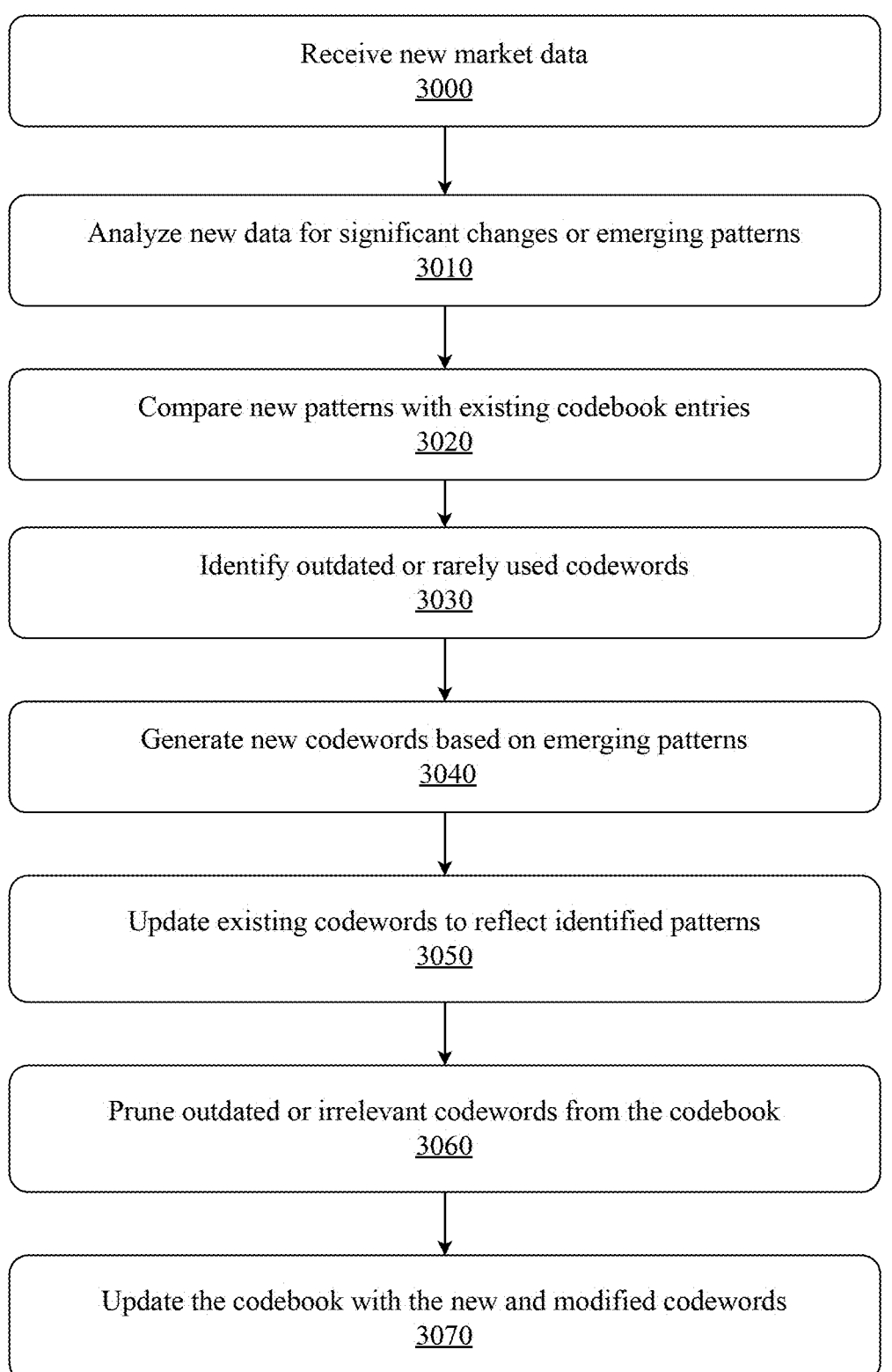
FIG. 30 is a flow diagram illustrating an exemplary method for a compound large codeword model with adaptive codeword generation.

FIG. 30 is a flow diagram illustrating an exemplary method for a compound large codeword model with adaptive codeword generation. In a first step 3000, the system receives new market data. This step is the entry point for the adaptive process, where fresh financial information flows into the system. This data could include real-time trading information, breaking news, economic indicators, or social media sentiment related to financial markets. The continuous influx of new data is essential for keeping the model attuned to the latest market trends and events.

In a step 3010, the system analyzes the new data for significant changes or emerging patterns. This step involves sophisticated data analysis techniques to distinguish between noise and meaningful market signals. For financial markets, this could mean detecting new trading patterns, recognizing shifts in market sentiment, or identifying the emergence of new financial instruments or market sectors. This analysis is crucial for determining which aspects of the new data warrant updates to the codebook.

In a step 3020, the system compares the newly identified patterns with existing codebook entries. This comparison helps determine whether the new patterns are truly novel or if they can be adequately represented by existing codewords. This step is essential for maintaining the efficiency of the codebook by avoiding redundant entries while ensuring comprehensive coverage of market phenomena.

In a step 3030, the system identifies outdated or rarely used codewords. This step involves analyzing the frequency and recency of codeword usage within the system. In the context of financial data, this could mean identifying codewords that represent market patterns or events that are no longer relevant or frequent in current market conditions. This process is crucial for maintaining the codebook's efficiency and relevance.

In a step 3040, the system generates new codewords based on emerging patterns. When the analysis identifies truly novel patterns or significant market events that cannot be adequately represented by existing codewords, this step creates new entries in the codebook. For instance, if a new type of financial instrument gains prominence or if a novel trading strategy becomes popular, new codewords would be created to represent these phenomena.

In a step 3050, the system updates existing codewords to reflect identified patterns. This step modifies the parameters or definitions of existing codewords to better capture evolving market dynamics. For example, a codeword representing a particular market trend might be adjusted to account for changes in its typical duration or intensity. This ensures that existing codewords remain accurate and relevant.

In a step 3060, the system prunes outdated or irrelevant codewords from the codebook. This step removes codewords that have been identified as no longer relevant or useful. Pruning helps maintain the efficiency of the codebook and prevents the system from being influenced by outdated market patterns or events.

In a step 3070, the system updates the codebook with the new and modified codewords. This final step consolidates all the changes made in the previous steps, resulting in an updated codebook that reflects the current state of the financial markets. This updated codebook is then used by the broader compound LCM system to encode incoming financial data, ensuring that the machine learning core always works with the most up-to-date and relevant representations of market conditions.

This adaptive codebook generation method is particularly valuable in financial contexts where new factors can quickly become significant market drivers. It allows the compound LCM system to rapidly adapt to represent the market impact of global events, emerging technologies, or shifts in investor behavior. By continuously updating the codebook based on new market data, this method enables the system to maintain high predictive accuracy even as market conditions change. It captures nuanced and evolving relationships between various financial indicators and market outcomes, potentially identifying predictive signals that might be missed by more static analysis methods. This adaptive capability is crucial for any system aiming to provide reliable insights in the complex and rapidly changing landscape of global financial markets.

Supervisory Neuron Architecture

Figure 31A:
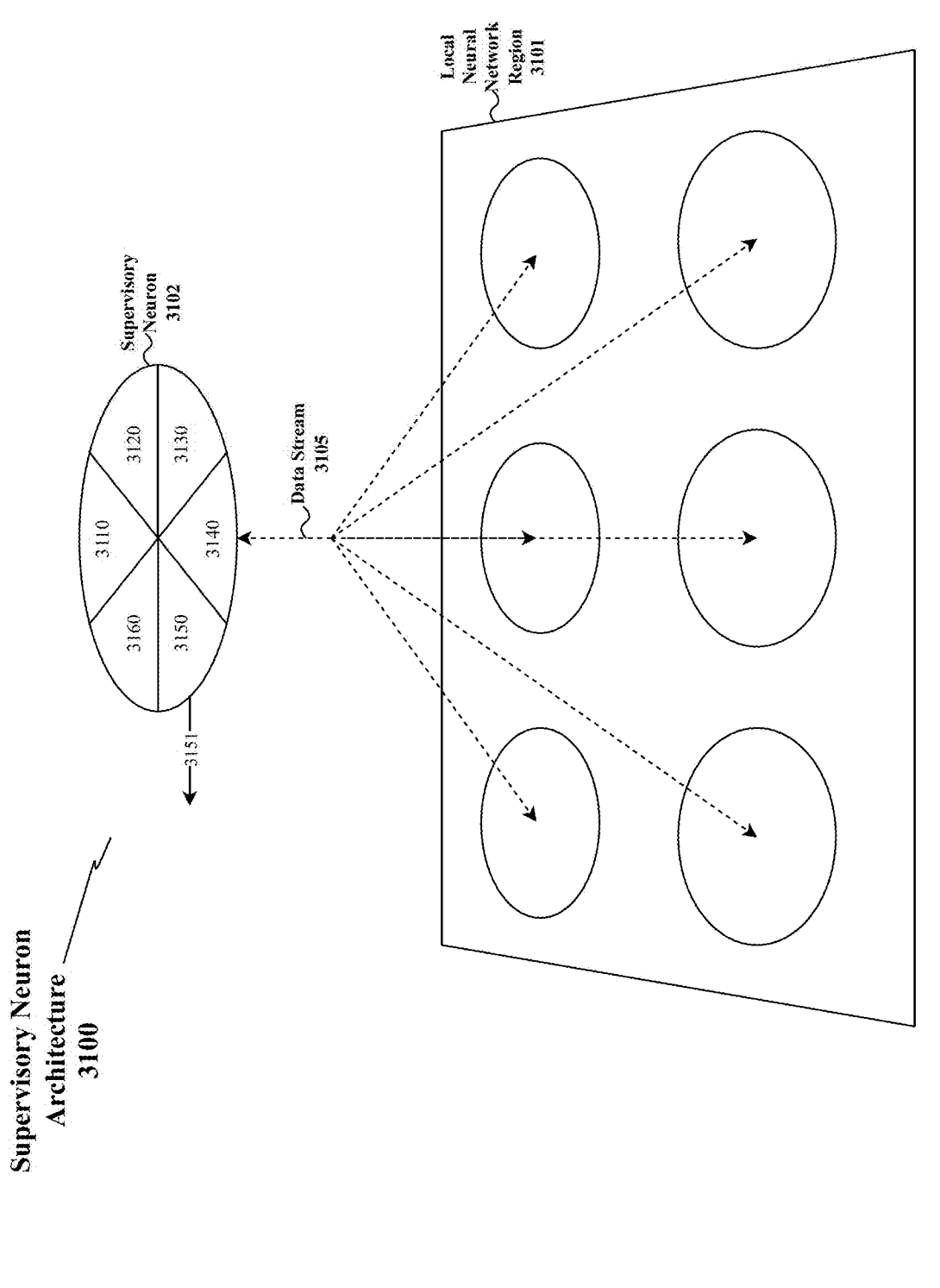
FIG. 31A is a block diagram illustrating exemplary supervisory neuron system architecture.

FIG. 31A is a block diagram illustrating exemplary architecture of supervisory neuron architecture 3100. Supervisory neuron architecture 3100 comprises local neural network region 3100, which is part of machine learning core 1240. Local neural network region 3100 contains multiple operational neurons 3101, which perform basic computational tasks within local neural network region 3100. Supervisory neuron 3102 is operatively connected to local neural network region 3100 by data stream 3105 and is responsible for monitoring and modifying its structure and function.

Activation data collector 3110 interfaces with operational neurons 3101 via data stream 3105 to gather activation data, including weights, biases, inputs, and outputs from each monitored neuron. This data is collected over multiple time cycles to allow for temporal analysis. Statistical analysis subsystem 3120 performs various analyses on the collected data, such as computing temporal and spatial spectra of the outputs, identifying different frequency components, and detecting patterns or anomalies in activation patterns.

Historical record database 3125 stores past activation patterns and analysis results for comparison and trend identification. This allows supervisory neuron 3102 to track changes over time and identify long-term patterns or shifts in network behavior.

Structural modification planner 3130 uses the outputs from statistical analysis subsystem 3120 and historical record database 3125 to determine necessary structural changes in local neural network region 3100. These planned modifications may include neuron splitting, neuron pruning, or connection adjustments based on the identified patterns and anomalies.

Network modification implementer 3135 executes the planned modifications, directly interacting with local neural network region 3100 to adjust weights, biases, or network structure. These modifications are implemented gradually to maintain network stability.

Performance monitor 3140 evaluates the impact of structural modifications on network performance, comparing pre- and post-modification outputs to ensure changes improve overall functionality.

Inter-neuron communication subsystem 3150 facilitates communication between supervisory neuron 3102 and other supervisory neurons in larger neural networks, allowing for coordinated adaptations across multiple local neural network regions.

Parameter adjustment subsystem 3160 fine-tunes parameters of operational neurons 3101 based on the analysis results and feedback from performance monitor 3140. This subsystem can implement more subtle adjustments, such as dampening high-frequency temporal fluctuations or smoothing out spatial noise across the monitored region.

Supervisory neuron architecture 3100 enables continuous, localized adaptations during inference, helping the system handle evolving data patterns and changing task requirements. This architecture integrates with existing systems in the patent document, enhancing the adaptability and performance of machine learning core 1240 while potentially mitigating issues like catastrophic forgetting.

The dataflow in supervisory neuron architecture 3100 begins with operational neurons 3101 in local neural network region 3100. These neurons process input data and generate outputs as part of the normal operation of machine learning core 1240. Activation data collector 3110 continuously gathers data from operational neurons 3101 through data stream 3105, including weights, biases, inputs, and outputs from each monitored neuron over multiple time cycles.

This collected data flows into statistical analysis subsystem 3120, where various analyses are performed. These include computation of temporal and spatial spectra of the outputs, identification of frequency components, and detection of patterns or anomalies in activation patterns. Results from statistical analysis subsystem 3120 are then sent to historical record database 3125 for storage, accumulating data over time to allow for trend analysis and long-term pattern recognition.

Structural modification planner 3130 receives input from both statistical analysis subsystem 3120 and historical record database 3125, using this information to determine if and what structural changes are needed in local neural network region 3100. The planned modifications flow to network modification implementer 3135, which executes these changes in local neural network region 3100. This might involve adjusting weights, modifying neuron connections, or altering the network structure.

Performance monitor 3140 observes the effects of these modifications on local neural network region 3100, comparing pre- and post-modification performance metrics. Feedback from performance monitor 3140 flows back to structural modification planner 3130, informing future modification decisions. Parameter adjustment subsystem 3160 receives input from statistical analysis subsystem 3120 and performance monitor 3140, using this information to make finer adjustments to operational neurons 3101.

Throughout this process, inter-neuron communication subsystem 3150 exchanges information with other supervisory neurons in the broader network via data stream 3151, allowing for coordinated adaptations. This dataflow forms a continuous feedback loop, enabling supervisory neuron 3102 to constantly monitor, analyze, and adapt local neural network region 3100 based on its performance and changing conditions.

Figure 31B:
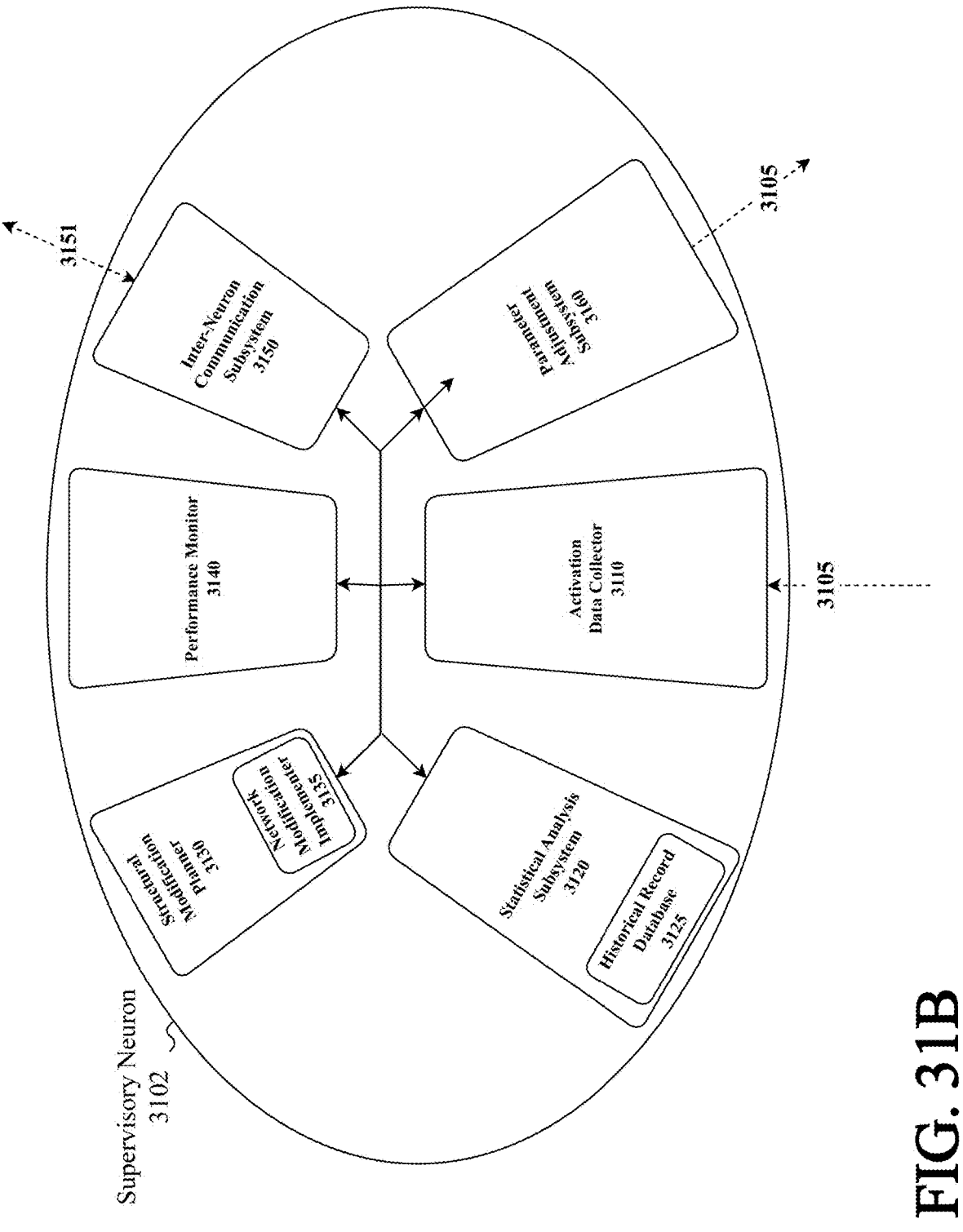
FIG. 31B is a block diagram illustrating exemplary architecture of supervisory neuron.

FIG. 31B is a block diagram illustrating exemplary architecture of supervisory neuron 3102. At the core of supervisory neuron 3102 is the activation data collector 3110, which interfaces with the operational neurons in the local neural network region via multiple data channels. These channels capture weights, biases, inputs, and outputs from each monitored neuron at high temporal resolution, allowing for detailed analysis of neuron behavior over time.

A key feature of supervisory neuron 3102 is its ability to collect and analyze data across both spatial and temporal dimensions of the neural network. The activation data collector 3110 interfaces with multiple operational neurons in the local neural network region, capturing data not only from many neurons "in the plane" but also over several or even many time steps of the inference model. This multi-dimensional data collection allows supervisory neuron 3102 to observe how signals propagate through the planar core over time. Each input to the network propagates "down the plane" or "through the planar core" one time step (neuron layer) at a time, with subsequent inputs entering at layer 0 on each time step.

Supervisory neuron 3102 also monitors the sparsity of activations within local neural network region 3100. Sparsity in this context refers to the prevalence of zero or near-zero activations among the monitored neurons. Maintaining an appropriate level of sparsity can contribute to computational efficiency and help prevent overfitting.

The statistical analysis subsystem 3120 leverages this rich spatiotemporal data to perform sophisticated analyses. It conducts time-domain, spatial-domain, and transform-domain spectral analysis of the dynamic flow of signals through the planar core. This comprehensive analysis occurs in real-time during inference, allowing supervisory neuron 3102 to make informed decisions about network modifications on-the-fly. While the system can also operate during training, its primary focus is on adapting the network during inference to handle evolving data patterns and changing task requirements. This capability enables supervisory neuron 3102 to capture and respond to complex patterns in network activity that unfold across both space and time, significantly enhancing its ability to optimize network performance during operation.

The statistical analysis subsystem 3120 within supervisory neuron 3102 employs advanced signal processing techniques to analyze the collected data. It computes both temporal and spatial Fourier transforms to identify frequency components in neuron activations. Additionally, it utilizes wavelet analysis for multi-scale examination of activation patterns, enabling the detection of both short-term fluctuations and long-term trends. Subsystem 3120 also incorporates dimensionality reduction techniques like principal component analysis (PCA) to identify the most significant patterns in high-dimensional activation data.

The statistical analysis subsystem 3120 employs a suite of advanced algorithms to process the collected activation data. For frequency analysis, it utilizes, for example, the Cooley-Tukey Fast Fourier Transform (FFT) algorithm, enabling efficient computation of both temporal and spatial frequency spectra. Multi-scale analysis of activation patterns is performed using, for example, the Discrete Wavelet Transform (DWT) with Daubechies wavelets, allowing for the detection of both short-term fluctuations and long-term trends. For dimensionality reduction, the subsystem implements, for example, the NIPALS (Nonlinear Iterative Partial Least Squares) algorithm for Principal Component Analysis (PCA), which is particularly effective for the high-dimensional data typical of neural networks. Anomaly detection within activation patterns is handled by, as an example, the Isolation Forest algorithm, known for its efficiency with high-dimensional data and robustness to outliers. For temporal trend analysis, the subsystem employs for example the ARIMA (AutoRegressive Integrated Moving Average) model, capable of capturing complex temporal dependencies in neuron activations. This comprehensive suite of algorithms enables supervisory neuron 3102 to perform thorough and nuanced analysis of network behavior across multiple dimensions and scales.

Statistical analysis subsystem 3120 includes mechanisms for analyzing the sparsity of activations in local neural network region 3100. It computes metrics such as the percentage of neurons with activations below a certain threshold and the distribution of activation magnitudes across the monitored neurons.

Connected to the statistical analysis subsystem 3120 is the historical record database 3125, implemented as a circular buffer to efficiently store and manage temporal data. Database 3125 employs techniques from time series databases to compress and index the historical activation patterns, allowing for rapid retrieval and comparison of past states. It also implements a forgetting mechanism to gradually phase out older, less relevant data while retaining important long-term trends.

The structural modification planner 3130 within supervisory neuron 3102 uses reinforcement learning techniques to determine optimal network modifications. It maintains a state-action value function, updated based on the performance impact of past modifications. Planner 3130 also incorporates a multi-armed bandit algorithm to balance exploration of new modification strategies with exploitation of known effective changes. Structural modification planner 3130 considers sparsity analysis when determining appropriate modifications. If the sparsity level is too low, indicating that most neurons are actively firing for most inputs, planner 3130 may initiate changes to increase sparsity. Conversely, if sparsity is too high, potentially limiting the network's capacity, planner 3130 may take actions to reduce sparsity.

The network modification implementer 3135 translates the high-level plans from the structural modification planner 3130 into specific weight and connectivity adjustments. It uses gradient-based optimization techniques to smoothly transition the network structure, ensuring stability during modifications. Implementer 3135 also includes safeguards to prevent catastrophic changes, such as limiting the magnitude of weight updates and gradually introducing new neurons or connections. Network modification implementer 3135 can adjust the sparsity of local neural network region 3100 through various means. These may include modifying activation functions of specific neurons to encourage sparsity (e.g., implementing ReLU activation), adjusting connection weights to reduce the number of strong connections, or even removing connections that consistently contribute little to the network's output.

The performance monitor 3140 in supervisory neuron 3102 employs online learning algorithms to continuously evaluate the impact of structural modifications. It computes various metrics such as local loss gradients, activation sparsity, and representational similarity to assess the effectiveness of changes. Monitor 3140 also uses change point detection algorithms to identify significant shifts in network behavior following modifications.

The inter-neuron communication subsystem 3150 utilizes a message-passing protocol to exchange information with other supervisory neurons. It implements a distributed consensus algorithm to coordinate actions across multiple local network regions, ensuring coherent global behavior. Subsystem 3150 also includes a prioritization mechanism to focus communication on the most critical information, optimizing bandwidth usage.

Lastly, the parameter adjustment subsystem 3160 in supervisory neuron 3102 uses adaptive learning rate techniques to fine-tune operational neuron parameters. It employs methods like Adam or RMSprop to dynamically adjust learning rates based on the statistics of recent gradients. Subsystem 3160 also includes regularization techniques such as L1/L2 regularization or dropout to prevent overfitting in the local network region.

Supervisory neuron 3102 incorporates robust error handling and fault tolerance mechanisms to ensure reliable operation. A redundancy system is implemented where multiple supervisory neurons monitor overlapping regions, providing backup in case of individual neuron failure. The system employs regular checkpointing, saving the state of the network and supervisory neurons to allow rollback to a stable state if errors occur. Structural modifications are implemented gradually, with constant performance monitoring; if performance degrades, changes are immediately rolled back. An error detection algorithm continuously monitors the behavior of supervisory neurons themselves, identifying anomalies such as sudden large changes in modification patterns or persistent oscillations in network structure. For significant structural changes, a consensus algorithm is employed among nearby supervisory neurons, reducing the impact of a single malfunctioning unit. These mechanisms collectively ensure the stability and reliability of the supervisory system, even in the face of unexpected behaviors or failures.

Together, these components enable supervisory neuron 3102 to perform sophisticated, real-time analysis and adaptation of the local neural network region, enhancing the overall system's ability to handle complex, dynamic data patterns and task requirements.

The data flow through supervisory neuron 3102 begins with the activation data collector 3110. This component interfaces with the operational neurons 3101 in the local neural network region, gathering data 3105 across both spatial and temporal dimensions. It collects weights, biases, inputs, and outputs from multiple neurons over several time steps, capturing how signals propagate through the planar core of the network.

From the activation data collector 3110, this multi-dimensional data flows to the statistical analysis subsystem 3120. Here, advanced signal processing techniques are applied to analyze the collected data. This subsystem performs time-domain, spatial-domain, and transform-domain spectral analysis, including Fourier transforms and wavelet analysis.

It also employs dimensionality reduction techniques like PCA to identify significant patterns in the high-dimensional, time-varying activation data.

The results of this analysis are then sent in two directions. First, they flow to the historical record database 3125, where they are stored for future reference and long-term trend analysis. This database uses efficient storage and indexing techniques to manage temporal data.

Secondly, the analysis results flow to the structural modification planner 3130. This component uses the insights gained from the spatiotemporal analysis to determine what modifications, if any, should be made to the network. It employs reinforcement learning techniques and maintains a state-action value function to make these decisions.

The plans generated by the structural modification planner 3130 are then passed to the network modification implementer 3135. This component translates the high-level plans into specific weight and connectivity adjustments, implementing them in the local neural network region 3101.

As modifications are made, data about these changes flows to performance monitor 3140. This component evaluates the impact of the modifications by analyzing changes in the spatiotemporal patterns of network activity before and after the adjustments.

The results of this performance monitoring then flow back to the structural modification planner 3130, creating a feedback loop that informs future modification decisions.

Throughout this process, the inter-neuron communication subsystem 3150 is exchanging data 3151 with other supervisory neurons in the broader network. It sends out data about local observations and modifications and receives similar information from other supervisory neurons, allowing for coordinated adaptations across the entire network.

Supervisory neuron architecture 3100 is designed for scalability, allowing it to efficiently manage neural networks of varying sizes. In an embodiment, a multi-level hierarchy of supervisory neurons is implemented, where higher-level supervisory neurons oversee and coordinate lower-level ones. This hierarchical structure enables the system to scale to very large networks while maintaining effective local control. The system dynamically adjusts the number and distribution of supervisory neurons based on network size and available computational resources. Supervisory neuron computations are distributed across multiple processing units, allowing for parallel operation in large-scale systems. The granularity of monitoring, including sampling rate and the number of monitored neurons, is adaptively adjusted based on available computational resources and network size. Inter-neuron communication utilizes a gossip protocol that remains efficient as the number of supervisory neurons increases. For very large networks, activation data is compressed or summarized using techniques such as random projections or sketch algorithms, enabling efficient storage and analysis. These scalability features ensure that the supervisory neuron architecture can be effectively applied to neural networks of any size, from small, specialized models to large, general-purpose systems.

Finally, based on the comprehensive analysis and performance monitoring, the parameter adjustment subsystem 3160 fine-tunes operational neuron parameters. It uses adaptive learning rate techniques to make these adjustments, with the resulting changes being implemented in the local neural network region.

This data flow forms a continuous cycle of observation, analysis, modification, and evaluation, allowing the supervisory neuron to adapt the local neural network region in real-time during inference, optimizing its performance for evolving data patterns and task requirements.

Figure 31C:
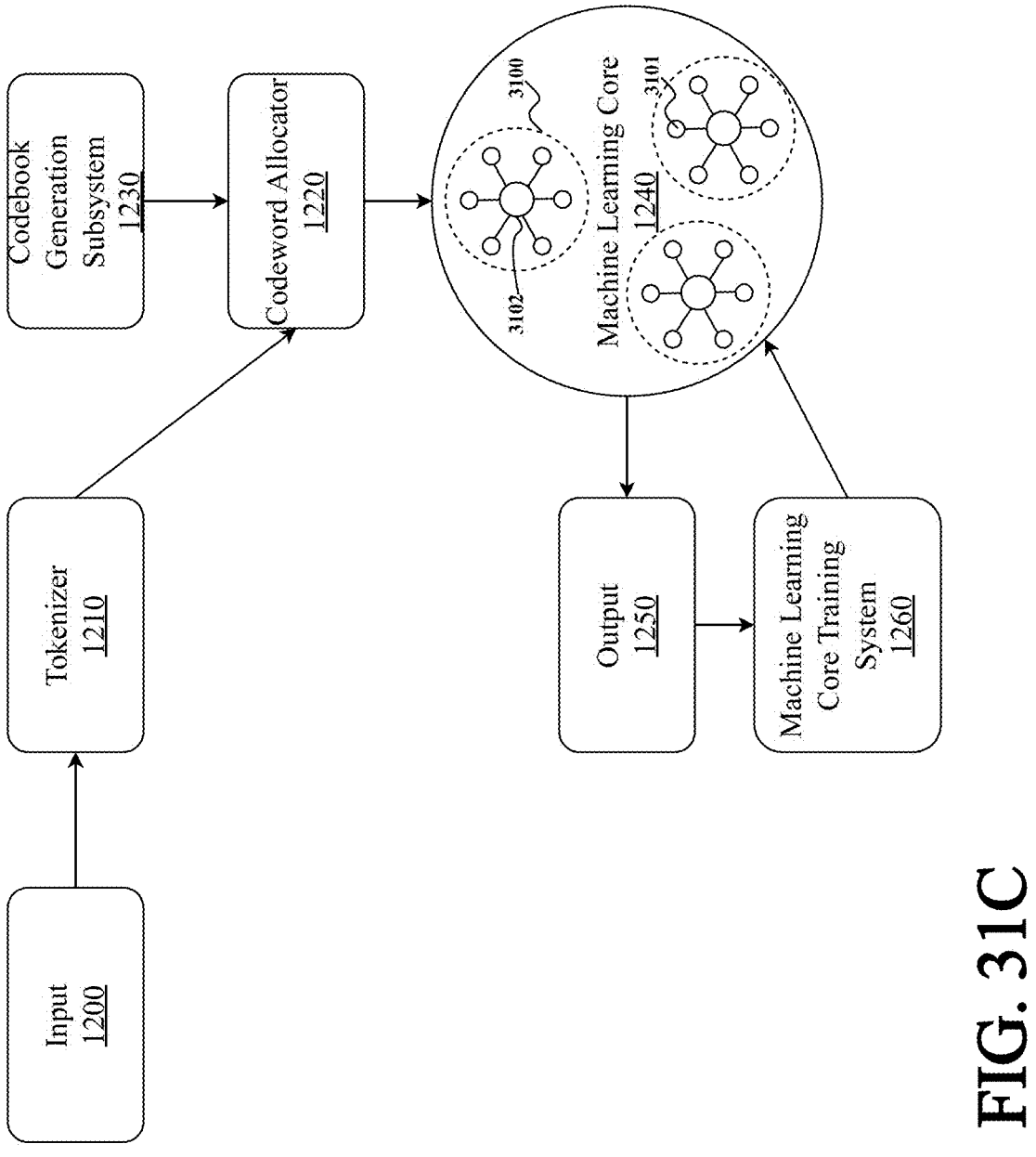
FIG. 31C is a block diagram illustrating an exemplary system architecture for a large codeword model for deep learning with integrated supervisory neurons.

FIG. 31C is a block diagram illustrating an exemplary system architecture for a large codeword model for deep learning with integrated supervisory neurons. The system comprises several key components from the original architecture, now enhanced with supervisory neuron capabilities.

The process begins with input 1200, which represents raw data in various modalities such as text, images, audio, or time series. This input is fed into tokenizer 1210, which splits the data into meaningful semantic units called sourceblocks. Tokenizer 1210 may employ techniques like Huffman coding for efficient and semantically meaningful splitting.

The sourceblocks are then passed to codeword allocator 120, which assigns unique codewords to each sourceblock. These codewords are discrete, compressed representations designed to capture essential information in a compact form. Codebook generation subsystem 130 works in conjunction with codeword allocator 120, creating and maintaining a collection of all unique codewords used by the system.

Machine learning core 1240 is the central component where learning and processing of codewords take place. It comprises multiple layers of operational neurons 3101 arranged in a planar configuration. These operational neurons 3101 are organized into various layers and structures depending on the specific implementation (e.g., Transformer-based, VAE-based, or RNN-based).

Integrated within machine learning core 1240 are one or more local neural network regions 3100. Each local neural network region 3100 consists of a group of operational neurons 3101, typically around 100, that form a subset of the larger network.

Supervisory neuron 3102 is positioned above the planar arrangement of machine learning core 1240, connected to a specific local neural network region 3100. Supervisory neuron 3102 collects activation data from operational neurons 3101 within its assigned region via data stream 3105. This data includes weights, biases, inputs, and outputs from each monitored neuron.

Within supervisory neuron 3102, various subsystems analyze the collected data and determine necessary structural modifications. These subsystems include an activation data collector, statistical analysis subsystem, structural modification planner, and network modification implementer. A performance monitor within supervisory neuron 3102 evaluates the impact of modifications on network performance.

Multiple supervisory neurons 3102 are present in an embodiment, each monitoring its own local neural network region 3100 within machine learning core 1240. These supervisory neurons can communicate with each other, allowing for coordinated adaptations across the entire network. The enhanced machine learning core 1240 processes the codewords, learning to manipulate and generate new representations based on the input data and the adaptive modifications implemented by supervisory neurons 3102. Finally, the system produces output 150, which can be in the form of codewords (to be mapped back to sourceblocks) or directly in the target modality, depending on the specific application.

This integrated architecture combines the efficient codeword representation of the original LCM design with the adaptive capabilities of supervisory neurons, potentially improving the system's ability to learn and generalize across various tasks and data types.

In a non-limiting use case example, the large codeword model is used for a natural language processing task, such as language translation. The machine learning core 1240 is implemented as a transformer-based architecture.

Input 1200 consists of sentences in the source language. Tokenizer 1210 splits these sentences into sourceblocks, which might be words or subwords. Codeword allocator 120 assigns unique codewords to each sourceblock, using the codebook maintained by codebook generation subsystem 130.

The transformer-based machine learning core 1240 processes these codewords through its multi-head attention mechanisms and feed-forward networks. Specifically, the core first applies self-attention to the input sequence, allowing each position to attend to all positions in the previous layer. This self-attention is performed in parallel by multiple attention heads, each focusing on different aspects of the input. The outputs of these attention heads are concatenated and linearly transformed. Following the attention layer, a position-wise feed-forward network is applied to each position separately and identically. This process is repeated for several layers, allowing the model to build up a rich, contextual representation of the input sequence.

Supervisory neuron 3102 monitors a local neural network region 3100 within one of the transformer's encoder or decoder layers. It collects activation data from the operational neurons in this region, including attention weights and outputs from the feed-forward networks. The supervisory neuron performs statistical analysis on this data, such as computing the frequency spectrum of neuron activations and analyzing the distribution of attention weights. Based on this analysis, it may implement structural modifications. For example, if it detects that certain attention heads are consistently focusing on similar patterns, it might merge these heads or adjust their parameters to encourage more diverse attention patterns. Similarly, if it identifies neurons in the feed-forward network that are consistently inactive, it might prune these neurons to improve efficiency.

Machine learning training system 1260 fine-tunes the transformer's parameters using parallel corpora of the source and target languages. The system's output 150 is the translated text in the target language.

In another non-limiting use case example the large codeword model is applied to a multi-modal task, such as generating image captions. The machine learning core 1240 is implemented as a latent transformer.

Input 1200 consists of images and their corresponding captions. Tokenizer 1210 processes both the image features (extracted by a separate vision model) and the text captions into sourceblocks. Codeword allocator 120 assigns codewords to these multi-modal sourceblocks.

The latent transformer machine learning core 1240 encodes these codewords into a shared latent space, where both image and text information are represented. This core operates directly on the latent space vectors without needing separate embedding or positional encoding layers. The latent transformer applies self-attention mechanisms to these latent vectors, allowing it to capture dependencies between different parts of the image and different words in the caption. The model learns to align visual and textual information in this shared latent space, enabling it to generate captions that accurately describe the content of input images.

Supervisory neuron 3102 monitors a local neural network region 3100 within the latent space processing layers. It collects data on how different latent dimensions are activated by visual versus textual inputs. Through statistical analysis, it may identify latent dimensions that are under-utilized or overly specialized for one modality. The supervisory neuron might then adjust the network structure to better balance the representation of visual and textual information. For instance, it could introduce new connections to encourage certain latent dimensions to capture cross-modal relationships, or it might adjust the dimensionality of the latent space to optimize information capacity.

Machine learning training system 1260 trains the latent transformer to generate relevant captions given an input image, using a dataset of image-caption pairs. The system's output 150 is a generated caption for a new input image.

In another non-limiting use case example, the large codeword model is used for a generative task, such as creating synthetic time series data. The machine learning core 1240 is implemented as a gradient diffusion model.

Input 1200 consists of historical time series data. Tokenizer 1210 segments this data into appropriate time steps or windows, which become the sourceblocks. Codeword allocator 120 assigns codewords to these temporal sourceblocks.

The gradient diffusion machine learning core 1240 learns the transition probabilities between different states in the time series. It models the data generation process as a gradual denoising of random noise into coherent time series patterns. The core starts with a noise distribution and iteratively refines it, step by step, until it matches the distribution of the real data. At each step, the model predicts the gradient of the log probability density with respect to the data, effectively learning how to gradually denoise the data.

Supervisory neuron 3102 monitors a local neural network region 3100 within the diffusion process layers. It analyzes the activation patterns at different stages of the diffusion process, tracking how the model's predictions evolve as the denoising progresses. The supervisory neuron might identify stages where the denoising process is too aggressive or too conservative. Based on this analysis, it could adjust the network structure to optimize the denoising schedule. For example, it might introduce additional layers or adjust the width of certain layers to allow for more fine-grained control over the denoising process at critical stages.

Machine learning training system 1260 trains the gradient diffusion model on a large corpus of historical time series data. The system's output 150 is newly generated synthetic time series data that maintains the statistical properties of the training data.

FIG. 32 is a block diagram depicting exemplary architecture of structural modification process 3200. Process 3200 illustrates the before and after states of local neural network region 3100 undergoing modifications directed by supervisory neuron 3102. The top of the diagram 3210 shows local neural network region 3100 before modification, while the bottom 3220 demonstrates the same region after structural changes have been implemented.

Supervisory neuron 3102 initiates various modifications to optimize local neural network region 3100. These modifications include addition of new neuron 3201, strengthening of existing connection 3202, weakening of existing connection 3203, and formation of new connections 3204 and 3205. By implementing these changes, structural modification process 3200 alters both the topology and connection strengths within local neural network region 3100, adapting it based on ongoing analysis of activation patterns and historical data.

Structural modification process 3200 is integrated within supervisory neuron 3102 and operates on local neural network region 3100. Process 3200 begins with activation data collector 3110, which gathers data from operational neurons 3101 in local neural network region 3100. This data includes weights, biases, inputs, and outputs from each monitored neuron over multiple time cycles, in addition to data from other supervisory neurons 3151.

Collected data flows to statistical analysis subsystem 3120, which performs various analyses on the activation patterns. This subsystem computes temporal and spatial spectra of the outputs, identifying different frequency components and patterns within the data. Statistical analysis subsystem 3120 also interfaces with historical record database 3125, comparing current activation patterns with past data to identify trends or anomalies over time.

Based on the analysis results, structural modification planner 3130 determines appropriate actions to optimize the local neural network region 3100. Planner 3130 may decide on various modifications, such as adjusting neuron weights, modifying connections, or even adding or removing neurons from the network.

Once modifications are planned, network modification implementer 3135 executes these changes within local neural network region 3100. Implementer 3135 carefully manages the implementation process to maintain network stability during modifications.

After modifications are made, performance monitor 3140 evaluates their impact on the local neural network region 3100. Monitor 3140 compares pre- and post-modification performance metrics to ensure changes have improved overall functionality. This feedback is then used to inform future modification decisions, creating a continuous optimization loop.

Throughout this process, inter-neuron communication subsystem 3150 facilitates communication between supervisory neuron 3102 and other supervisory neurons in the broader network via data stream 3151. This allows for coordinated adaptations across multiple local neural network regions, ensuring coherent global behavior of machine learning core 1240.

In a non-limiting use case example, structural modification process 3200 operates within a natural language processing task, such as sentiment analysis of financial news articles. Local neural network region 3100 represents a subset of neurons within an attention layer of a transformer-based model. As the model processes a stream of financial news articles, supervisory neuron 3102 monitors the activation patterns of the neurons in local neural network region 3100.

Supervisory neuron 3102 collects activation data from the monitored neurons over multiple time cycles, analyzing both temporal and spatial patterns in the data. It detects that certain neurons consistently show low activation levels when processing articles related to cryptocurrency markets, indicating a potential gap in the model's ability to capture relevant features for this topic. Based on this analysis, supervisory neuron 3102 initiates structural modification process 3200.

Process 3200 adds new neuron 3201 to local neural network region 3100, specifically to enhance the network's capacity for processing cryptocurrency-related information. It also strengthens connection 3202 between existing neurons that show correlated activations for relevant features, while weakening connection 3203 that appears to introduce noise in the sentiment analysis for financial articles. New connections 3204 and 3205 are formed to integrate new neuron 3201 into the existing network structure, allowing it to contribute to the overall sentiment analysis task.

These modifications enable local neural network region 3100 to adapt to the changing landscape of financial news, improving its ability to accurately analyze sentiment in articles discussing cryptocurrency alongside traditional financial instruments. The structural changes implemented by process 3200 allow the model to evolve dynamically, enhancing its performance on the sentiment analysis task without requiring a full retraining of the entire network.

FIG. 33 is a method diagram illustrating the use of supervisory neuron architecture 3100. Activation data is collected from operational neurons 3101 in local neural network region 3100 by activation data collector 3110. This data includes weights, biases, inputs, and outputs from each monitored neuron over multiple time cycles, capturing the dynamic behavior of the network during operation 3301. The collected activation data is then analyzed by statistical analysis subsystem 3120. Temporal and spatial spectra of the outputs are computed using advanced signal processing techniques such as Fourier transforms and wavelet analysis. Different frequency components and patterns within the data are identified, revealing both short-term fluctuations and long-term trends in neuron behavior 3302. Results from the statistical analysis are compared with historical data stored in historical record database 3125. This comparison allows the system to identify trends or anomalies over time, providing context for current network behavior and helping to detect significant changes or deviations from expected patterns 3303.

Based on the analysis results and historical comparison, appropriate actions to optimize local neural network region 3100 are determined by structural modification planner 3130. These actions may include adjusting neuron weights, modifying connections, or even adding or removing neurons, depending on the identified patterns and performance requirements 3304. The planned modifications are then executed within local neural network region 3100 by network modification implementer 3135. This component carefully manages the implementation process to maintain network stability during modifications, ensuring that changes are applied gradually and monitored closely 3305.

The impact of the implemented modifications on local neural network region 3100 is evaluated by performance monitor 3140. Pre- and post-modification performance metrics are compared, assessing factors such as accuracy, efficiency, and responsiveness to input patterns 3306. Feedback on the effectiveness of the modifications is provided to structural modification planner 3130, informing future modification decisions. This creates a closed-loop learning process where the system continuously refines its optimization strategies based on observed outcomes 3307.

Throughout the entire process, communication with other supervisory neurons in the broader network is facilitated by inter-neuron communication subsystem 3150 via data stream 3151. This allows for coordinated adaptations across multiple local neural network regions, ensuring that local optimizations contribute to improved global performance of the machine learning core 1240 3308. The entire process is continuously repeated, creating an ongoing optimization loop for local neural network region 3100 within the larger machine learning core 1240. This continuous adaptation enables the network to respond dynamically to changing input patterns, task requirements, and performance demands, potentially mitigating issues like catastrophic forgetting and enhancing the system's overall learning capabilities 3309.

FIG. 34 is a method diagram illustrating the structural modification process of supervisory neuron architecture 3100. The process begins when modification needs are identified by structural modification planner 3130 based on comprehensive analysis results from statistical analysis subsystem 3120 and historical data from database 3125. This identification involves detecting patterns of suboptimal performance or opportunities for enhancement in the neural network's structure 3401. A detailed modification plan is then formulated, specifying the exact changes to be made to local neural network region 3100. These changes may include fine-tuning of neuron weights, restructuring of inter-neuron connections, or even the addition or removal of neurons, depending on the identified needs and potential for improvement 3402.

Before implementation, the proposed modifications undergo a rigorous validation process, where they are checked against predefined stability criteria. This crucial step ensures that the planned changes won't disrupt the overall network performance or lead to unintended consequences in the broader system 3403. Once validated, the approved modifications are prioritized based on their expected impact and the computational resources required for implementation. This prioritization allows the system to focus on the most critical and potentially beneficial changes first 3404.

Network modification implementer 3135 then begins executing the highest-priority modifications in a gradual, controlled manner. This careful approach allows the system to monitor the effects of each change closely and maintain overall network stability 3405. After each modification is implemented, a rapid performance check is conducted to ensure no immediate negative impacts on the network's functionality. This real-time monitoring allows for quick detection of any unforeseen issues 3406.

If any problems are detected during these checks, the modification is immediately rolled back, reverting the network to its previous state. The system then moves on to attempt the next priority modification, ensuring that the optimization process continues even if certain changes prove unsuitable 3407. Successfully implemented modifications are meticulously logged in historical record database 3125. This logging serves multiple purposes: it provides a record for future reference, allows for long-term analysis of modification patterns, and contributes to the system's ability to learn from its own optimization history 3408.

The entire structural modification process repeats continuously, creating an ongoing cycle of optimization for local neural network region 3100. This perpetual refinement allows the network to adapt to changing input patterns, evolving task requirements, and shifting performance demands over time, potentially mitigating issues like catastrophic forgetting and enhancing the system's overall learning capabilities 3409. Through this dynamic and iterative process, supervisory neuron architecture 3100 maintains a state of constant improvement, striving for optimal performance in the face of changing conditions and requirements.

FIG. 35 is a method diagram illustrating inter-neuron communication process of supervisory neuron architecture 3100. The process begins with the inter-neuron communication subsystem 3150 preparing a concise summary of recent local modifications and performance metrics. This summary encapsulates key information about the current state and recent changes in the local neural network region, providing a snapshot of its evolution and performance 3501. To optimize communication efficiency, this information is then encoded into a compact message format. This encoding process reduces communication overhead, allowing for frequent updates without overwhelming the network's communication channels 3502.

The encoded message is then broadcast to neighboring supervisory neurons via data stream 3151. This broadcast mechanism ensures that relevant information is disseminated across the network, allowing for coordinated adaptations and maintaining a degree of global coherence in the larger neural network structure 3503. Simultaneously, the communication subsystem receives and decodes incoming messages from other supervisory neurons. These messages contain similar summaries from other parts of the network, providing a broader context for local decision-making 3504.

Upon reception, the information from other supervisory neurons is carefully analyzed to identify any conflicting modifications or global trends. This analysis is crucial for maintaining consistency across the network and detecting emerging patterns that may not be visible from a purely local perspective 3505. If conflicts are detected between local modifications and those reported by other supervisory neurons, a consensus algorithm is initiated to resolve these differences. This consensus-building process ensures that local optimizations contribute to, rather than detract from, the overall network performance 3506.

Global trends identified through this communication process are then incorporated into the local decision-making process of structural modification planner 3130. This integration allows local modifications to be informed by network-wide patterns and objectives, promoting a more holistic approach to network optimization 3507. In cases where network-wide actions are deemed necessary, these agreed-upon global actions are implemented in coordination with other supervisory neurons. This coordinated implementation ensures that large-scale changes are carried out coherently across the network 3508.

The entire communication cycle repeats at regular intervals to maintain network-wide coherence. This ongoing exchange of information allows the network to adapt dynamically to changing conditions and requirements, balancing local optimizations with global performance objectives 3509. Through this sophisticated inter-neuron communication process, supervisory neuron architecture 3100 achieves a delicate balance between local adaptivity and global coherence, enabling the neural network to evolve as a unified, intelligent system.

FIG. 36 is a method diagram illustrating performance monitoring and feedback loop of supervisory neuron architecture 3100. The process begins with performance monitor 3140 collecting pre-modification performance metrics of local neural network region 3100. These metrics serve as a baseline, capturing the network's performance across various dimensions such as accuracy, processing speed, and resource utilization before any structural changes are implemented 3601. Following the implementation of modifications by network modification implementer 3135, post-modification performance metrics are gathered. This data collection allows for a direct comparison of network performance before and after the structural changes 3602.

The pre- and post-modification metrics are then meticulously compared to quantify the impact of recent changes. This comparison involves statistical analysis to determine if the observed differences are significant and to what extent they align with the intended outcomes of the modifications 3603. Key performance indicators (KPIs) such as accuracy, efficiency, and responsiveness are calculated based on the collected data. These KPIs provide a comprehensive view of how the modifications have affected different aspects of the network's functionality 3604.

The performance results undergo thorough analysis to identify any significant improvements or regressions. This step involves not only examining the overall performance changes but also investigating how different types of inputs or tasks may have been affected differently by the modifications 3605. A detailed performance report is generated based on this analysis and stored in historical record database 3125. This report serves as a permanent record of the network's evolution, allowing for long-term trend analysis and providing valuable data for future optimization decisions 3606.

The performance report is also sent to structural modification planner 3130 as immediate feedback. This direct communication ensures that the latest performance data is quickly incorporated into the decision-making process for future modifications 3607. Upon receiving this feedback, structural modification planner 3130 updates its decision-making strategies. This might involve adjusting the priority of certain types of modifications, refining the criteria for implementing changes, or even developing new categories of structural adaptations based on observed performance patterns 3608.

This feedback loop continues indefinitely, allowing for continuous refinement of the modification process. By constantly evaluating the outcomes of its actions and adjusting its strategies accordingly, supervisory neuron architecture 3100 implements a form of meta-learning, becoming increasingly adept at optimizing the neural network over time 3609. This sophisticated performance monitoring and feedback system enables the neural network to not only adapt to changing conditions but also to improve its own adaptation mechanisms, potentially leading to increasingly efficient and effective learning capabilities.

FIG. 37 is a method diagram illustrating data collection and analysis workflow of supervisory neuron architecture 3100. The process begins with activation data collector 3110 gathering raw data from operational neurons 3101 in local neural network region 3100. This data includes neuron activations, weights, biases, and input-output patterns, providing a comprehensive snapshot of the network's internal state and behavior 3701. Once collected, the raw data undergoes preprocessing to remove noise and normalize values. This crucial step ensures that the subsequent analysis is based on clean, standardized data, minimizing the impact of artifacts or inconsistencies in the raw measurements 3702.

The preprocessed data then undergoes temporal pattern analysis using advanced time series analysis techniques. This step involves examining how neuron activations and network behavior evolve over time, potentially revealing cyclical patterns, trends, or anomalies in the network's dynamic behavior 3703. Concurrently, spatial patterns in the data are examined using dimensionality reduction methods like Principal Component Analysis (PCA). This analysis helps identify correlations between different neurons or network regions, uncovering hidden structures or clusters in the high-dimensional activation space 3704.

To gain insights into the frequency characteristics of the network's behavior, frequency domain analysis is performed using Fourier transforms and wavelet analysis. This step can reveal periodic behaviors at different time scales, potentially uncovering rhythmic patterns in network activations that might not be apparent in the time domain 3705. The system then applies anomaly detection algorithms to identify unusual activation patterns. This process helps flag potential issues or unexpected behaviors in the network, which might require immediate attention or adjustment 3706.

The results from these various analyses are then combined to form a comprehensive view of network behavior. This integration step synthesizes insights from temporal, spatial, and frequency domains, providing a holistic understanding of the network's operation and potential areas for optimization 3707. This integrated analysis is then passed to structural modification planner 3130 for decision-making. The planner uses this rich, multi-faceted view of network behavior to inform its choices about what modifications, if any, should be made to optimize performance 3708.

Finally, both the raw data and the results of the analysis are stored in historical record database 3125 for future reference. This archiving step is crucial for long-term learning and optimization, allowing the system to track changes over time and potentially identify slow-evolving patterns or trends 3709. Through this sophisticated data collection and analysis workflow, supervisory neuron architecture 3100 maintains a detailed, up-to-date understanding of its own operation, enabling informed, data-driven decisions about network optimization and adaptation.

FIG. 38 is a method diagram illustrating the adaptation to new input patterns process of supervisory neuron architecture 3100. The process begins when new or unusual input patterns are detected by statistical analysis subsystem 3120. This detection involves comparing incoming data patterns against historical norms and identifying significant deviations or novel structures in the input 3801. Once a new pattern is identified, the system assesses whether existing network structures can adequately process these new patterns. This assessment involves simulating the propagation of the new input through the current network configuration and evaluating the resulting activations and outputs 3802.

If inadequacies are found in handling the new inputs, structural modification planner 3130 devises adaptations to better handle the new patterns. These adaptations are designed to enhance the network's ability to effectively process and learn from the novel inputs, potentially involving the creation of new pathways or the modification of existing structures 3803. The planned adaptations may include creating new connections between neurons, adjusting synaptic weights, or even generating new neurons specifically tuned to features of the new input patterns. This flexibility allows the network to expand its capabilities in response to changing input distributions 3804.

The proposed adaptations are then implemented gradually by network modification implementer 3135. This gradual implementation helps maintain overall network stability while incorporating the new structures or modifications. It allows the network to smoothly transition to handling the new input patterns without disrupting its performance on existing tasks 3805. As these changes are being implemented, performance monitor 3140 closely tracks the network's response to the new input patterns. This monitoring involves measuring various performance metrics specifically related to the processing of the new inputs, as well as assessing any impact on the network's performance for existing input types 3806.

Based on the observed performance with the new inputs, further refinements are made to the network structure. This step creates a feedback loop where the initial adaptations are fine-tuned based on their actual effectiveness in handling the new patterns 3807. The system's response to the new patterns, including the adaptations made and their outcomes, is meticulously logged for future reference. This logging is crucial for long-term learning and for informing future responses to novel inputs 3808.

The adaptation process continues iteratively until satisfactory performance is achieved with the new input patterns. This ongoing refinement ensures that the network not only becomes capable of processing the new inputs but does so with increasing efficiency and accuracy over time 3809. Through this dynamic adaptation process, supervisory neuron architecture 3100 demonstrates its ability to evolve in response to changing input distributions, potentially mitigating issues like catastrophic forgetting and enabling continuous learning in dynamic environments.

FIG. 39 is a method diagram illustrating error handling and recovery process of supervisory neuron architecture 3100. The process begins when anomalies or errors in local neural network region 3100 are detected by performance monitor 3140. These anomalies could manifest as unexpected output patterns, significant deviations from expected performance metrics, or inconsistencies in internal network states 3901. Once an anomaly is detected, the nature and severity of the error are assessed by statistical analysis subsystem 3120. This assessment involves analyzing the error's impact on network performance, its potential causes, and its implications for overall system stability 3902.

If the error is determined to be minor, local corrective actions are initiated by structural modification planner 3130. These actions might include small adjustments to weights, temporary deactivation of problematic neurons, or localized retraining of specific network segments 3903. For more severe errors that could potentially impact the broader network, an alert is sent to neighboring supervisory neurons via inter-neuron communication subsystem 3150. This alert mechanism ensures that other parts of the network are aware of the issue and can coordinate their responses accordingly 3904.

As a precautionary measure, a snapshot of the current network state is saved to historical record database 3125 as a restoration point. This snapshot captures the network's configuration, weights, and other relevant parameters, providing a fallback option if subsequent recovery attempts are unsuccessful 3905. Depending on the error type and severity, either a rollback to a previous stable state or a forward error correction is attempted. A rollback involves reverting the network to a known good configuration, while forward error correction attempts to resolve the issue by making additional adjustments to the current state 3906.

The effectiveness of the error recovery is then evaluated by performance monitor 3140. This evaluation involves running diagnostic tests and comparing the network's performance post-recovery to its pre-error state and to established performance benchmarks 3907. If the recovery is deemed successful, normal operation of the network resumes. However, if the recovery attempt is unsuccessful, further diagnostic and recovery steps are initiated. This might involve more drastic measures such as larger-scale network restructuring or initiating a deeper analysis to identify root causes 3908.

Finally, the entire error event and recovery process are meticulously logged for future analysis and system improvement. This logging includes details of the error, the recovery steps taken, and their outcomes. This information is crucial for refining the error handling process over time and for identifying patterns that might indicate underlying issues in the network architecture 3909. Through this comprehensive error handling and recovery process, supervisory neuron architecture 3100 demonstrates resilience and adaptability, maintaining robust performance even in the face of unexpected issues or anomalies.

FIG. 40 is a method diagram illustrating integration of supervisory neuron architecture 3100 with Large Codeword Model. The process begins as input data is processed by tokenizer 1210 and codeword allocator 120 of the large codeword model. Tokenizer 1210 splits the input into meaningful semantic units or sourceblocks, while codeword allocator 120 assigns unique codewords to each sourceblock, creating a compressed representation of the input 4001. These resulting codewords are then fed into machine learning core 1240, which contains the supervisory neuron architecture 3100. This step marks the transition from the initial processing stage to the deep learning phase where the supervisory neurons play a crucial role 4002.

As the codewords propagate through various layers of the network within machine learning core 1240, supervisory neurons 3102 vigilantly monitor their processing. This monitoring involves tracking how different neurons and network regions respond to various codeword inputs, observing patterns in activation and information flow 4003. Concurrently, statistical analysis subsystem 3120 within each supervisory neuron 3102 analyzes patterns in codeword processing and interactions. This analysis might involve examining how different codewords co-occur, how they influence network activations, and how effectively they are being utilized in the learning process 4004.

Based on this comprehensive analysis, structural modification planner 3130 may determine that adjustments to the network are necessary to optimize codeword handling. These decisions are made with the goal of improving the network's efficiency and effectiveness in processing the codeword representations 4005. The adjustments implemented could include modifying attention mechanisms to better focus on relevant codewords, fine-tuning codeword embeddings to capture more nuanced relationships, or restructuring network layers to more effectively process the compressed information contained in the codewords 4006.

Following any adjustments, performance monitor 3140 carefully evaluates the impact of these changes on the model's overall performance. This evaluation might involve measuring improvements in task-specific metrics, assessing changes in processing speed, or analyzing how the modifications affect the model's ability to generalize across different types of inputs 4007. Feedback from this monitoring process is then used to inform further refinements to codeword processing. This creates a closed-loop system where the network's handling of codewords is continuously optimized based on observed performance and emerging patterns 4008.

This continuous adaptation process allows the model to optimize its handling of the codeword representations over time. By constantly refining how it processes and utilizes codewords, the system can potentially achieve improved efficiency, better generalization, and enhanced performance across a wide range of tasks 4009. Through this integration, supervisory neuron architecture 3100 enhances the capabilities of the large codeword model, enabling it to dynamically adapt its processing of compressed information representations and potentially leading to more robust and efficient learning in complex, data-rich environments.

Exemplary Computing Environment

FIG. 41 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A deep learning system for real-time time series forecasting using a compound large codeword model, comprising one or more computers with executable instructions that, when executed, cause the deep learning system to:

receive real-time time series data comprising a plurality of data types from a plurality of data sources;

allocate codewords to each data input using a plurality of adaptive codebooks, wherein codewords are mapped to a corresponding codebook specific to each data type;

fuse codewords of dissimilar data types together into a single codeword representation using a projection network that preserves inter-relationships between the dissimilar data types;

process the single codeword representation through a machine learning core comprising a transformer-based architecture, wherein the machine learning core comprises:

a plurality of operational neurons interconnected to form multiple local neural network regions within the machine learning core; and a plurality of supervisory neurons, each supervisory neuron operatively connected to a respective local neural network region and configured to:

receive activation data from the operational neurons in real-time during inference operations, wherein the activation data comprises weights, biases, inputs, and outputs from each monitored neuron collected over multiple time cycles;

perform statistical analysis on the received activation data including temporal and spatial Fourier transforms to identify frequency components in neuron activations and wavelet analysis for multi-scale examination of activation patterns to identify patterns and anomalies in activation patterns over time;

determine, based on the statistical analysis, one or more structural modifications to the respective local neural network regions by maintaining a state-action value function updated based on performance impact of past modifications and comparing current activation patterns against a historical record database implemented as a circular buffer storing past activation pattern;

initiate implementation of the determined structural modifications during operation of the respective local neural network region using gradient-based optimization techniques to smoothly transition the network structure while ensuring stability during modifications;

monitor performance of the respective local neural network region before and after implementing the structural modifications; and revert modifications that do not improve performance;

generate short-term forecasts based on a plurality of single codeword representations; and output the short-term forecasts as a continuously updated time series prediction;

wherein the adaptive codebooks are continuously updated based on the real-time time series data to maintain prediction accuracy as data patterns evolve over time.

2. The system of claim 1, wherein the machine learning core uses a latent transformer-based architecture.

3. The system of claim 1, wherein the supervisory neuron is further configured to:

maintain a historical record of activation patterns in the local neural network region;

compare current activation patterns to the historical record; and determine structural modifications based on identified changes in activation patterns over time.

4. The system of claim 1, wherein the statistical analysis performed by the supervisory neuron comprises calculating at least one of average activation levels, activation frequency, activation patterns, or inter-neuron correlation.

5. The system of claim 1, wherein the supervisory neuron is further configured to adjust parameters of the operational neurons based on the statistical analysis.

6. The system of claim 1, wherein initiating implementation of the determined structural modifications comprises sending control signals to a network modification module.

7. The system of claim 1, wherein the local neural network region is part of a larger neural network, and wherein the supervisory neuron is configured to communicate with other supervisory neurons monitoring other regions of the larger neural network.

8. A method for real-time time series forecasting using a compound large codeword model comprising the steps of:

receiving real-time time series data comprising a plurality of data types from diverse data sources;

allocating codewords to each data input using a plurality of adaptive codebooks, wherein codewords are mapped to a corresponding codebook specific to each data type;

fusing codewords of dissimilar data types together into a single codeword representation using a projection network that preserves inter-relationships between the dissimilar data types;

processing the single codeword representation through a machine learning core comprising a transformer-based architecture, wherein the machine learning core comprises a plurality of operational neurons interconnected to form multiple local neural network regions;

monitoring, by a plurality of supervisory neurons each supervisory neuron operatively connected to a respective local neural network region, activation data from the operational neurons in real-time during inference, the activation data comprising weights, biases, inputs, and outputs collected over multiple time cycle;

performing, by the supervisory neurons, statistical analysis on the monitored activation data including temporal and spatial Fourier transforms to identify frequency components in neuron activations and wavelet analysis for multi-scale examination of activation patterns to identify patterns and anomalies in activation patterns over time;

determining, based on the statistical analysis, one or more structural modifications to the respective local neural network regions to optimize performance for processing the fused codeword representations, wherein determining comprises maintaining a state-action value function updated based on the performance impact of past modifications and comparing current activation patterns against a historical record database implemented as a circular buffer storing past activation patterns, and wherein the structural modifications include at least one of neuron splitting, neuron pruning, neurogenesis, or connection modification;

initiating implementation of the determined structural modifications during operation of the respective local neural network regions using gradient-based optimization techniques to smoothly transition the network structure while ensuring stability during modifications and without interrupting ongoing processing operations;

monitoring performance of the respective local neural network regions before and after implementing the structural modifications;

reverting modifications that do not improve performance;

generating short-term forecasts based on a plurality of single codeword representations;

outputting the short-term forecasts as a continuously updated time series prediction; and continuously updating the adaptive codebooks based on the real-time time series data to maintain prediction accuracy as data patterns evolve over time.

9. The system of claim 8, wherein the machine learning core uses a latent transformer-based architecture.

10. The method of claim 8, further comprising:

tracking changes in activation patterns over time;

identifying trends or anomalies in the activation patterns; and determining structural modifications based on the identified trends or anomalies.

11. The method of claim 8, wherein the structural modifications comprise dynamically adjusting the number of operational neurons in the local neural network region.

12. The method of claim 8, further comprising communicating information about local structural modifications to a higher-level supervisory component of a larger neural network.

* * * * *